(12) United States Patent
Kim et al.

(10) Patent No.: US 12,217,390 B2
(45) Date of Patent: Feb. 4, 2025

(54) METHOD FOR CORRECTING IMAGE BY DEVICE AND DEVICE THEREFOR

(71) Applicant: SAMSUNG ELECTRONICS CO., LTD., Suwon-si (KR)

(72) Inventors: Sung-hoon Kim, Suwon-si (KR); Seong-min Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/571,639

(22) Filed: Jan. 10, 2022

(65) Prior Publication Data

US 2023/0316470 A1     Oct. 5, 2023

Related U.S. Application Data

(63) Continuation of application No. 16/347,330, filed as application No. PCT/KR2017/012592 on Oct. 17, 2017.

(30) Foreign Application Priority Data

Nov. 8, 2016   (KR) .................. 10-2016-0148183
Oct. 17, 2017  (KR) .................. 10-2017-0134807

(51) Int. Cl.
  *G06T 5/20*       (2006.01)
  *G06V 10/82*      (2022.01)
  *H04N 23/63*      (2023.01)
(52) U.S. Cl.
  CPC ................ *G06T 5/20* (2013.01); *G06V 10/82* (2022.01); *H04N 23/632* (2023.01)

(58) Field of Classification Search
  CPC ... G06T 5/20; G06T 5/00; G06T 11/60; G06T 2207/20081; G06T 2207/20084;
  (Continued)

(56) References Cited

U.S. PATENT DOCUMENTS 8,072,505 B2 * 12/2011 Sugita .................. H04N 23/667
                                                        348/222.1
9,355,659 B2    5/2016  Koui et al.
(Continued)

FOREIGN PATENT DOCUMENTS

JP      2016-12387       1/2016
KR   10-2008-0076170     8/2008
(Continued)

OTHER PUBLICATIONS

Office Action issued on Sep. 21, 2023 by Chinese Patent Office in corresponding Chinese Application No. 201780082146.7.
(Continued)

*Primary Examiner* — Michael S Osinski
(74) *Attorney, Agent, or Firm* — Sughrue Mion, PLLC

(57) ABSTRACT

An example device for correcting an image includes a memory storing one or more instructions; and a processor configured to execute the one or more instructions stored in the memory, wherein the processor, by executing the one or more instructions, is further configured to obtain an image including a plurality of objects, identify the plurality of objects in the image based on a result of using one or more neural networks, determine a plurality of correction filters respectively corresponding to the plurality of identified objects, and correct the plurality of objects in the image, respectively, by using the plurality of determined correction filters.

20 Claims, 48 Drawing Sheets

(58) Field of Classification Search
CPC .......... G06T 7/11; G06V 10/82; G06V 20/70;
G06V 20/60; G06V 10/454; G06V 20/10;
G06V 10/764; H04N 23/632; H04N
23/61; H04N 23/611; H04N 23/80; H04N
23/64; H04N 23/62; H04N 23/667; H04N
5/2621; H04N 23/633; H04N 23/661;
G06F 3/0482; G06F 3/04845; G06F
18/213; G06F 3/04842; G06F 18/22;
G06N 3/08; G06N 3/045
See application file for complete search history.

(56) References Cited

U.S. PATENT DOCUMENTS

| | | | |
|---|---|---|---|
| 9,569,697 | B1 | 2/2017 | McNerney |
| 9,830,502 | B2 | 11/2017 | Cohen et al. |
| 10,277,544 | B2* | 4/2019 | Nakamura ............... H04L 51/10 |
| 11,006,045 | B2* | 5/2021 | Lee ....................... G06F 3/0482 |
| 11,622,098 | B2* | 4/2023 | Jeong ....................... G06T 7/536 |
| | | | 348/56 |
| 11,699,213 | B2* | 7/2023 | Ban ............................ G06T 7/80 |
| | | | 382/156 |
| 2007/0065137 | A1* | 3/2007 | Hara .................... H04N 23/632 |
| | | | 396/291 |
| 2007/0081740 | A1* | 4/2007 | Ciudad .............. H04N 1/00453 |
| | | | 382/276 |
| 2009/0073285 | A1* | 3/2009 | Terashima ........... H04N 23/633 |
| | | | 348/222.1 |
| 2009/0102949 | A1 | 4/2009 | Steinberg et al. |
| 2010/0214436 | A1* | 8/2010 | Kim ....................... H04N 23/88 |
| | | | 348/E9.051 |
| 2012/0105678 | A1* | 5/2012 | Haikin ................. H04N 9/8042 |
| | | | 348/E5.031 |
| 2012/0236162 | A1* | 9/2012 | Imamura ................ H04N 23/62 |
| | | | 348/207.99 |
| 2012/0249855 | A1* | 10/2012 | Ciudad .................. H04N 7/142 |
| | | | 348/E5.029 |
| 2012/0268615 | A1* | 10/2012 | Choi .................... H04N 5/2621 |
| | | | 348/240.99 |
| 2012/0307103 | A1* | 12/2012 | Kunishige ............ H04N 5/2621 |
| | | | 348/E5.051 |
| 2012/0307112 | A1* | 12/2012 | Kunishige ............ H04N 5/2621 |
| | | | 348/E5.051 |
| 2014/0176732 | A1* | 6/2014 | Cohen .................. H04N 23/632 |
| | | | 348/207.1 |
| 2014/0267867 | A1* | 9/2014 | Lee .......................... H04N 9/74 |
| | | | 348/333.01 |
| 2014/0375862 | A1* | 12/2014 | Kim ..................... H04N 23/632 |
| | | | 348/333.02 |
| 2015/0172534 | A1* | 6/2015 | Miyakawa ............. H04N 23/61 |
| | | | 348/222.1 |
| 2015/0370907 | A1 | 12/2015 | Cleveland et al. |
| 2016/0073110 | A1 | 3/2016 | Kim et al. |
| 2016/0086078 | A1 | 3/2016 | Ji et al. |
| 2016/0127653 | A1 | 5/2016 | Lee et al. |
| 2016/0357406 | A1 | 12/2016 | Lee |
| 2016/0371815 | A1* | 12/2016 | Patankar ............... G06T 3/4007 |
| 2017/0039417 | A1 | 2/2017 | Saruta |
| 2017/0213112 | A1 | 7/2017 | Sachs |
| 2017/0244907 | A1 | 8/2017 | Lee |
| 2018/0007260 | A1* | 1/2018 | Fukui ................... H04N 23/632 |
| 2018/0047188 | A1 | 2/2018 | Park |
| 2018/0082715 | A1* | 3/2018 | Rymkowski ........... G06V 20/10 |
| 2018/0176641 | A1* | 6/2018 | Yun ........................ H04N 21/84 |
| 2019/0279345 | A1* | 9/2019 | Kim ......................... G06T 5/00 |
| 2020/0021733 | A1* | 1/2020 | Liu ...................... H04N 23/635 |
| 2020/0053293 | A1* | 2/2020 | Lee ...................... H04N 23/632 |
| 2020/0081003 | A1 | 3/2020 | Dent et al. |
| 2021/0390673 | A1* | 12/2021 | Ban .......................... G06T 5/60 |

FOREIGN PATENT DOCUMENTS

| | | |
|---|---|---|
| KR | 10-2014-0134844 | 11/2014 |
| KR | 10-2016-0051390 | 5/2016 |
| KR | 10-2016-0068516 | 6/2016 |
| KR | 10-2016-0078955 | 7/2016 |
| WO | 2007142621 A1 | 12/2007 |
| WO | 2018/182846 | 10/2018 |

OTHER PUBLICATIONS

Communication dated Jan. 5, 2023, issued by the China National Intellectual Property Administration for Chinese Patent Application No. 201780082146.7.
Communication issued on Jan. 11, 2024 by Korean Patent Office in corresponding Korean Patent Application No. 10-2023-0126399.
Communication issued on Dec. 28, 2023 by China National Intellectual Property Administration in corresponding Chinese Patent Application No. 201780082146.7.
Communication issued on Jan. 18, 2024 by European Patent Office in corresponding European Patent Application No. 21165385.2.
Communication dated Sep. 23, 2021 issued by the Intellectual Property India in application No. 201927022289.
Communication dated Apr. 20, 2021 issued by the Korean Intellectual Property Office in application No. 10-2017-0134807.
Communication dated Jun. 30, 2021 issued by the European Patent Office in application No. 21165385.2.
Communication dated Jan. 18, 2021, from the European Patent Office in European Application No. 17868708.3.
Liad Kaufman et al., "Content-Aware Automatic Photo Enhancement", Computer Graphics forum, 2012, vol. 31, No. 8, pp. 2528-2540 (13 pages total).
Communication Pursuant to Article 94(3) EPC dated Aug. 7, 2020 in counterpart EP Application No. 17868708.3.
Yan et al. "Automatic Photo Adjustment Using Deep Neural Networks", ACM Transactions on Graphics, May 16, 2015, pp. 1-15.
Extended Search Report mailed Aug. 30, 2019 in counterpart European Patent Application No. 17868708.3.
Search Report dated Apr. 12, 2018 in counterpart International Patent Application No. PCT/KR2017/012592 and English-language translation thereof.
Written Opinion of the International Searching Authority dated Apr. 12, 2018 in counterpart International Patent Application No. PCT/KR2017/012592 and English-language translation thereof.

* cited by examiner

FIG. 6

```
600
   {
      "requests":[
         {
            "image":{
               "content":"1.jpg"      —610
            }
            "features":[
               {
                  "type":"Object_recog",  —622
                  "maxResult":10          —624    —620
               },
            ]
         },
      ]
   },
```

FIG. 19

```
1900
{
    "requests":[
        {
            "image":{
                "content":1.jpg"          ──1912
                "region":[x1, y1]-[xn, yn] ──1914
            }                                        ──1910

"features":[
                {
                    "type":"Object_recog",           ──1920
                },
            ]
        },
    ]
},
```

FIG. 22

```
2200
  "requests":[
    {
      "image":{
        "content":1.jpg"              ─2210
      }
      "features":[                                  ─2220
        {
          "type":"Object_reg",        ─2222
          "option":"relationshop_base",  ─2224
          "maxResult":10
        },
      ]
    },
  ]
},
```

METHOD FOR CORRECTING IMAGE BY DEVICE AND DEVICE THEREFOR

CROSS-REFERENCE TO RELATED APPLICATIONS

This application is a continuation application of U.S. patent application Ser. No. 16/347,330, filed on May 3, 2019, which is a National Stage of International Application No. PCT/KR2017/012592, filed on Nov. 8, 2017, and claims the benefits of Korean Patent Application No. 10-2017-0134807, filed on Oct. 17, 2017, and Korean Patent Application No. 10-2016-0148183, filed on Nov. 8, 2016, in the Korean Intellectual Property Office, the disclosures of which are incorporated herein in their entirety by reference.

TECHNICAL FIELD

The present disclosure relates to a method and device for correcting an image, and more particularly, to a method and device for correcting each of objects included in an image.

The present disclosure also relates to an artificial intelligence (AI) system that simulates functions such as recognition and determination of the human brain by using a machine learning algorithm such as deep learning, and an application of the AI system.

BACKGROUND ART

As data traffic increases in the form of an exponential function with the development of computer technology, artificial intelligence (AI) has become an important trend to lead future innovation. AI is a way to mimic the way that people think, and thus AI is infinitely applicable to almost all industries.

Representative technologies of AI include pattern recognition, machine learning, expert systems, neural networks, natural language processing, etc. AI has been developed with the aim of causing devices to make reasonable decisions through machine learning and artificial neural network technologies, which enable a probabilistic increase in the recognition rate of big data through self learning.

The field of AI which started to open in the mid-1950s aimed to develop general AI beyond human intelligence by the year 2000, but such optimism gradually declined. However, since the 1990s, as a large amount of data has been continuously accumulated, performance of related hardware, such as CPUs, has been improved, and self-learning algorithms such as deep learning have been developed, there is a growing interest in devices that utilize machine learning and artificial neural networks.

An AI system is a computer system with human level intelligence. Also, unlike an existing rule based smart system, the AI system is a system that trains itself, decides, and becomes increasingly smarter. According to use of the AI system, since the recognition rate of the AI system may improve and thus the AI system may more accurately understand a user preference, an existing rule based smart system has been gradually replaced by a deep learning based AI system.

AI technology refers to machine learning (deep learning) and element technologies that utilize the machine learning.

Machine learning is an algorithm technology that classifies/learns the features of input data by itself. Element technology is a technology that simulates functions such as recognition and judgment of the human brain by using machine learning algorithms and consists of technical fields such as linguistic understanding, visual comprehension, reasoning/prediction, knowledge representation, and motion control.

AI technology is applied to various fields such as linguistic understanding, which is a technology to recognize and apply/process human language/characters and includes natural language processing, machine translation, dialogue systems, query response, speech recognition/synthesis, and the like, visual comprehension, which is a technology to recognize and process objects as in human vision and includes object recognition, object tracking, image search, human recognition, scene understanding, spatial understanding, image enhancement, and the like, reasoning prediction, which is a technology to obtain and logically infer and predict information and includes knowledge/probability based reasoning, optimization prediction, preference base planning, recommendation, etc, knowledge representation, which is a technology to automate human experience information into knowledge data and includes knowledge building (data generation/classification), knowledge management (data utilization), etc., motion control, which is a technology to control autonomous traveling of a vehicle and motion of a robot, and includes motion control (navigation, collision, and traveling), operation control (behavior control), etc., and the like.

SUMMARY

Provided are a method of performing image correction corresponding to each of objects by determining correction filters corresponding to the objects respectively in an image based on a result of analyzing image attributes using a neural network, and a device therefor.

According to an aspect of the present disclosure, a device may identify a plurality of objects and use a rule-based or artificial intelligence (AI) algorithm when determining a correction filter corresponding to each of the plurality of identified objects. When identifying the plurality of objects using the AI algorithm and determining the correction filter corresponding to each of the plurality of identified objects, the device may use machine learning, a neural network or a deep learning algorithm.

According to an embodiment of the present disclosure, a plurality of objects included in an image may be identified, and a correction corresponding to each of the plurality of identified objects is performed, thereby achieving an expression effect of the image and generating the image that matches an intention of a user.

BRIEF DESCRIPTION OF THE DRAWINGS

FIG. 6 is a diagram illustrating information included in an object identification request transmitted from a first processor to a second processor for identification of an object included in an image, according to an embodiment.

FIG. 19 is a diagram illustrating information included in an object identification request transmitted from a first processor to a second processor in an image for identification of an object selected based on a user input, according to an embodiment.

FIG. 22 is a diagram illustrating information included in an object identification request transmitted from a first processor to a second processor for identification of an object related to a user in an image, according to an embodiment.

DETAILED DESCRIPTION OF EXAMPLE EMBODIMENTS

Figure 1:
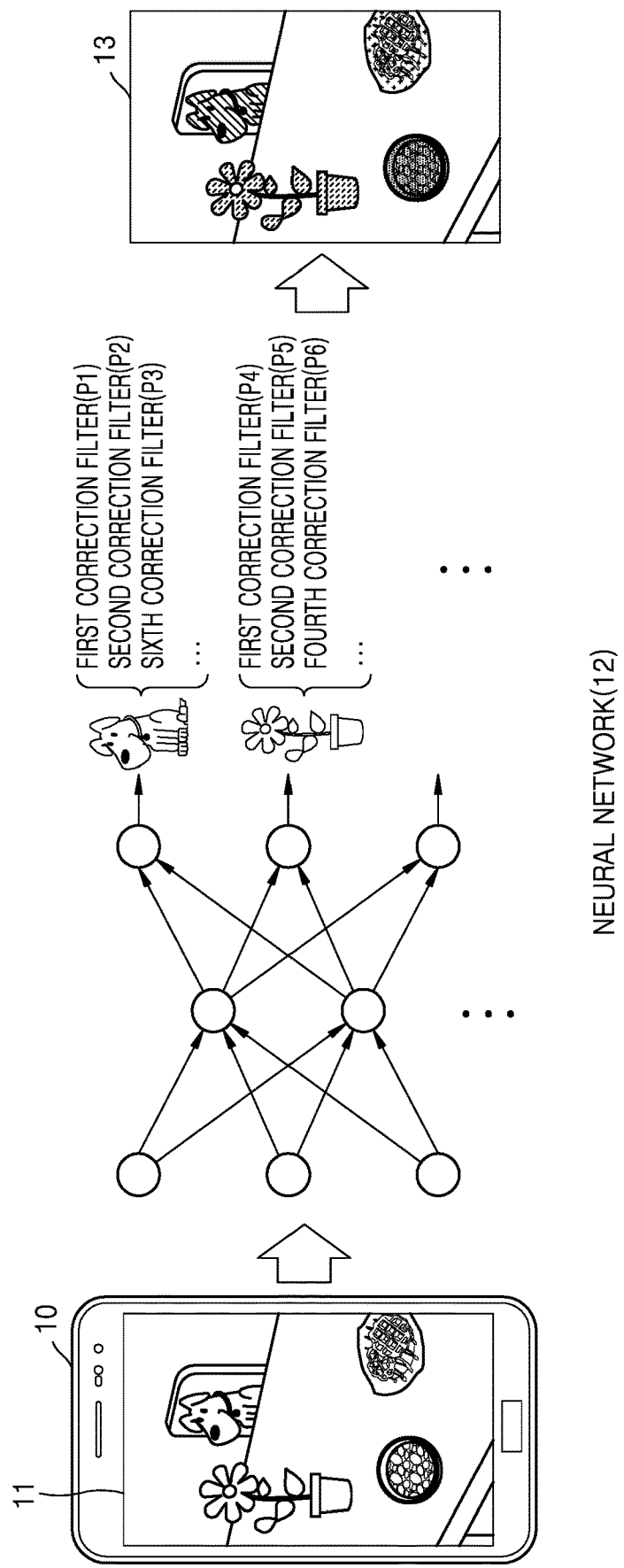
FIG. 1 is a schematic diagram illustrating an example in which a device corrects an image, according to an embodiment.

According to a first aspect of the present disclosure, a device for correcting an image includes a memory storing one or more instructions; and a processor configured to execute the one or more instructions stored in the memory, wherein the processor, by executing the one or more instructions, is further configured to obtain an image including a plurality of objects, identify the plurality of objects in the image based on a result of using one or more neural networks, determine a plurality of correction filters respectively corresponding to the plurality of identified objects, and correct the plurality of objects in the image, respectively, by using the plurality of determined correction filters.

The processor, by executing the one or more instructions, may be further configured to identify the plurality of objects and determine the plurality of correction filters, based on a training result of using a predetermined plurality of image attributes used for identifying the plurality of objects and a predetermined plurality of display attributes of objects used for determining the plurality of correction filters.

Further, the plurality of image attributes and the display attributes of the plurality of objects may be dynamically selected by the neural network.

Also, the processor, by executing one or more instructions, may obtain category information of each of the plurality of objects in the image in response to an input of the image into the neural network, and obtain information about a plurality of correction filters respectively corresponding to the plurality of objects in response to an input of the category information of each of the plurality of objects to the neural network.

The neural network may also include a plurality of layers for identifying the plurality of objects, and the processor, by executing the one or more instructions, may detect image attributes included in the image from the image using the plurality of layers for identifying the plurality of objects, and determine a category corresponding to each of the plurality of objects based on the detected image attributes.

The neural network may also include a plurality of layers for determining a plurality of correction filters, and the processor, by executing the one or more instructions, may detect display attributes of the object respectively corresponding to the plurality of objects using the plurality of layers for determining the plurality of correction filters, and determine the plurality of correction filters respectively corresponding to the plurality of objects based on the detected display attributes of the object.

The processor, by executing the one or more instructions, may be further configured to learn a criterion for identifying the plurality of objects and determining the plurality of correction filters, by using a first network for determining a category corresponding to each of the plurality of objects in the neural network and a second network for determining the plurality of correction filters respectively corresponding to the plurality of objects.

The device may further include a user interface configured to receive a user input, wherein the processor, by executing the one or more instructions, is further configured to control a display to display the image on a screen of the device, control the user interface to receive the user input that touches one of the plurality of objects in the displayed image, and obtain a correction filter corresponding to an object selected from the plurality of objects when location information touched by the user input is input to the neural network.

The processor, by executing one or more instructions, may also recommend a determined correction filter.

The processor, by executing the one or more instructions, may also control a display to display a preview image representing a corrected image using the recommended correction filter.

According to a second aspect of the present disclosure, a method of correcting an image includes obtaining an image including a plurality of objects; identifying the plurality of objects in the image; determining a plurality of correction filters respectively corresponding to the plurality of identified objects; and correcting the plurality of objects in the image, respectively, by using the plurality of determined correction filters, wherein the identifying of the plurality of objects and the determining of the plurality of correction filters include identifying the plurality of objects and determining the plurality of correction filters based on a result of using one or more neural networks.

According to a third aspect of the present disclosure, a computer-readable recording medium having recorded thereon a program for performing the method of the second aspect in a computer may be provided.

Terms used in this specification will now be briefly described before describing embodiments in detail.

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used. In this case, the meanings of these terms may be described in corresponding parts of the embodiments. Therefore, it is noted that the terms used herein is construed based on practical meanings thereof and the whole content of this specification, rather than being simply construed based on names of the terms.

Terms including ordinals such as first, second, etc. may be used to describe various elements, but the elements are not limited by terms. Terms are used only for the purpose of distinguishing one component from another. For example, without departing from the scope of the disclosure, a first component may be referred to as a second component, and similarly, a second component may also be referred to as a first component. As used herein, the term "and/or" includes any and all combinations of one or more of the associated listed items.

It will be understood that the terms "comprises", "comprising", "includes" and/or "including", when used herein, specify the presence of stated elements, but do not preclude the presence or addition of one or more other elements. The term "part" or "module" is used to denote an entity for performing at least one function or operation, and may be embodied as, but is not limited to, a software element or a hardware element such as a field-programmable gate array (FPGA) or an application-specific integrated circuit (ASIC). A "part" or "module" may be configured to exist in an addressable storage medium or to operate one or more processors. Thus, for example, the "part" or "module" includes elements (e.g., software elements, object-oriented software elements, class elements, and task elements), processes, functions, attributes, procedures, subroutines, segments of program code, drivers, firmware, micro-codes, circuits, data, database, data structures, tables, arrays, and parameters. Functions provided in elements and "parts" or "modules" may be combined to a smaller number of elements and "parts" or "modules" or may be divided into a larger number of elements and "parts" or "modules".

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. In the following description, for clarity, parts or elements that are not related to the embodiments are omitted.

FIG. 1 is a schematic diagram illustrating an example in which a device 10 corrects an image according to an embodiment.

Referring to FIG. 1, the device 10 according to an embodiment may correct the image using a neural network 12. Here, the neural network 12 may be a set of algorithms that identify and/or determine objects in an image, using results of statistical machine training to extract and use various attributes within the image. Further, the neural network 12 may be implemented as software or engine for executing the set of algorithms described above. The neural network 12 embodied in software, engine, or the like may be executed by a processor in the device 10 or by a processor in a server (not shown). The neural network may identify objects in an image by abstracting various attributes included in the image input to the neural network 12. In this case, abstracting the attributes in the image may be detecting the attributes from the image and determining a key attribute among the detected attributes.

According to an embodiment, the device 10 may use the neural network 12 to identify objects in an original image 11 and determine or recommend a correction filter corresponding to each of the identified objects. Also, the device 10 may correct the original image 11 using the determined or recommended correction filter.

According to an embodiment, the device 10 may identify the objects in the image by abstracting various attributes within the image from the original image 11 input to the neural network 12, and obtain information about the correction filter corresponding to each of the identified objects. The device 10 may also apply the obtained correction filter to each of the identified objects using the neural network 12 to obtain a resultant image 13.

Meanwhile, the device 10 may be a smart phone, a tablet PC, a PC, a smart TV, a mobile phone, a personal digital assistant (PDA), a laptop, a media player, a micro server, a global positioning system (GPS) device, an e-book terminal, a digital broadcast terminal, a navigation device, a kiosk, an MP3 player, a digital camera, a consumer electronics, and another mobile or non-mobile computing device but is not limited thereto. Also, the device 10 may be a wearable device, such as a watch, a pair of glasses, a hair band, and a ring having a communication function and a data processing function.

Figure 2:
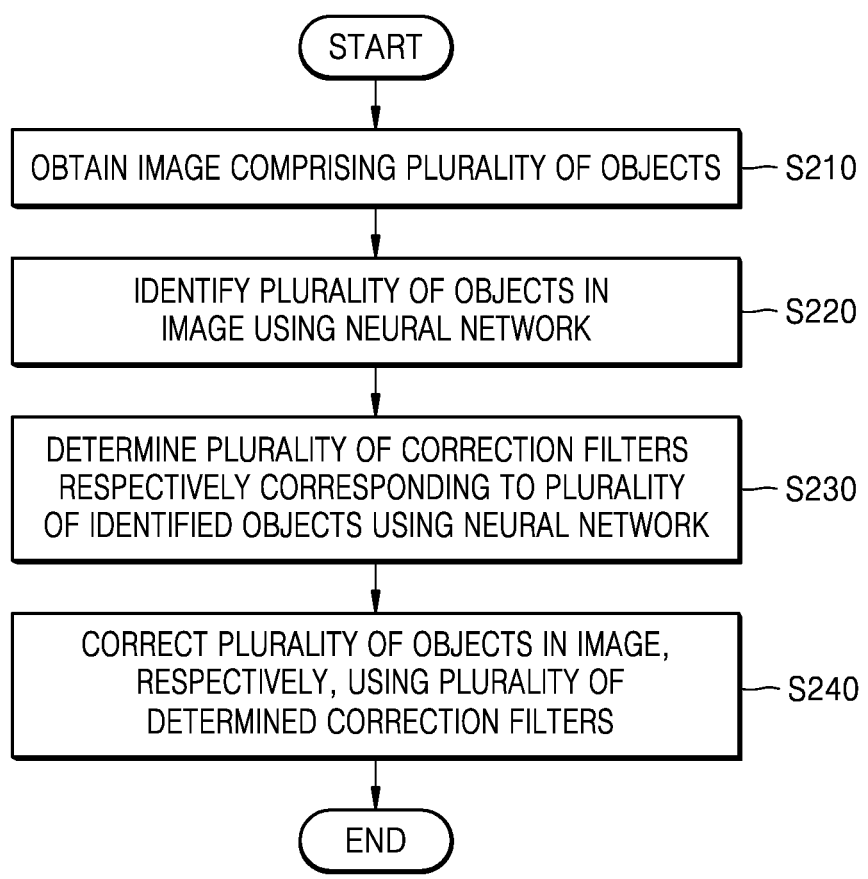
FIG. 2 is a flowchart illustrating a method, performed by a device, of correcting an image using a neural network, according to an embodiment.

FIG. 2 is a flowchart illustrating a method, performed by the device 10, of correcting an image using a neural network according to an embodiment.

In operation S210, the device 10 obtains the image including a plurality of objects.

The device 10 according to an embodiment may obtain the image stored in the device 10. For example, the device 10 may execute a photo album application or the like to obtain a previously stored image.

According to another embodiment, the device 10 may receive the image from an external server or an external device. Here, the external server or the external device may include a social network server, a cloud server, a web server, a content providing server, etc. For example, when at least one of a social network service (SNS) application, a web application, a video playback application, and a search application is executed in the device 10, the device 10 may access the external server or the external device to receive the image. According to another example, the device 10 may receive the image using a short-range wireless network from the external device located around the device 10.

According to another embodiment, the device 10 may obtain a new image through a camera provided in the device 10. For example, when a camera application or the like is executed in the device 10, the device 10 may detect an object located around the device 10 and obtain a preview image. The preview image is an image provided to guide capturing of an object in the camera application or the like, and may be obtained in the device 10 prior to capturing. Also, the device 10 may obtain an image (hereinafter, referred to as a captured image) of the object around the device 10 as a capturing request is input from a user while obtaining the preview image.

On the other hand, the preview image is an image obtained through the camera of the device 10 in real time, and may have a resolution different from that of the captured image. For example, the resolution of the preview image may be set to HD (High Definition), while the resolution of the captured image may be set to UHD (Ultra High Definition). A method, performed by the device 10, of obtaining the image through the camera application will be described in detail later with reference to FIGS. 14 to 16.

In operation S220, the device 10 identifies a plurality of objects in the image. The device 10 may use the neural network 12 to identify the objects in the image from the image. For example, the device 10 may obtain output data such as a location (e.g., coordinates of pixels corresponding to the object) of each of the objects included in the image and/or a category of each of the objects, etc. as a result of applying the image to the neural network 12 as input data.

Specifically, the device 10 may use the neural network 12 to detect predetermined image attributes in the image and to determine, based on the detected image attributes, the location of each of the objects included in the image and/or the category of each of the objects. Here, an image attribute may represent an image intrinsic feature that may be applied as an input parameter of a neural network for identifying an object. For example, the image attribute may include a color, an edge, a polygon, a saturation, a brightness, a color temperature, a blur, a sharpness, a contrast, and the like, but the image attribute is not limited thereto.

Further, in operation S230, the device 10 determines a plurality of correction filters respectively corresponding to the plurality of identified objects.

The device 10 according to an embodiment may determine the correction filters respectively corresponding to the identified objects based on a result of analyzing a display attribute of each of the identified objects using the neural network 12 described above.

Specifically, the device 10 may detect display attributes of the object from an image region corresponding to the identified objects based on the result of using the neural network 12, and based on the detected display attributes of the object to determine corresponding correction filters. Here, the display attribute of the object may be an attribute of an object detected from the image to determine the correction filter corresponding to the object, and may include at least one of a color, an edge, a polygon, a saturation, a brightness, a color temperature, a blur, a sharpness, and a contrast.

On the other hand, that the device 10 determines the correction filter using the neural network 12 may be that the device 100 may obtain a type of a correction filter to be applied to each of the objects in the image and/or a parameter to be input to the correction filter. To this end, the device 10 may further train the neural network 12 such that the neural network 12 described above determines the correction filter corresponding to each of the identified objects. For example, the device 10 may train the neural network 12 by repeatedly performing an operation of analyzing and/or evaluating a result of supervised learning and/or unsupervised learning on the display attribute of the object corresponding to the category of the object in the neural network 12.

On the other hand, the correction filter may be a hardware component and/or a software module included in the device 10 for changing the display attribute of the objects in the image. For example, the correction filter may include a color correction filter, a UV filter, a color temperature conversion filter, a sharpness enhancement filter, a blur filter, and the like.

However, this is only an example, and according to another example, the device 10 may determine the correction filter corresponding to each of the identified objects, based on information about a predetermined correction filter for each category of the object. For example, when the object included in the image is identified as a 'dog', the device 10 may determine a first correction filter as a correction filter for the 'dog', according to the information about the predetermined correction filter.

In operation S240, the device 10 uses the plurality of determined correction filters to correct each of the plurality of objects in the image. The device 10 may apply different correction filters with respect to each of the objects in the image based on locations of the objects in the image output from the neural network 12 and information relating to the correction filter corresponding to each of the objects.

For example, the device 10 may obtain a location of a first object in the image output from the neural network 12, a location of a second object, and information about correction filters corresponding to the first object (and/or parameters input to the correction filters), and correction filters corresponding to the second object. Here, the information about the correction filter may include information about at least one of a type of the correction filter, a type of a parameter applied to the correction filter, and a value of the parameter. Accordingly, the device 10 may apply correction filters corresponding to the first object to a region corresponding to the first object in the image, and apply correction filters corresponding to the second object to a region corresponding to the second object in the image. At this time, the correction filters corresponding to the first and second objects may be different from each other. Also, even when the correction filters corresponding to the first and second objects are the same, different parameters may be input to the correction filters. As such, the device 10 may perform an appropriate correction on each of the objects included in the image by correcting the image region corresponding to each of the objects in the image.

Also, the device 10 may display an image on which a correction operation is completed on a screen of the device 10.

The device 10 according to an embodiment may identify each of the objects included in the image and determine the correction filter suitable for each of the identified objects to perform correction, thereby further improving quality of the image compared to uniformly applying the correction filter to the entire image. In particular, the device 10 may apply a specific filter determined to be appropriate for a specific object to the specific object, rather than to all objects in the image, thereby improving the quality of the image without changing attributes of the other object.

Figure 3:
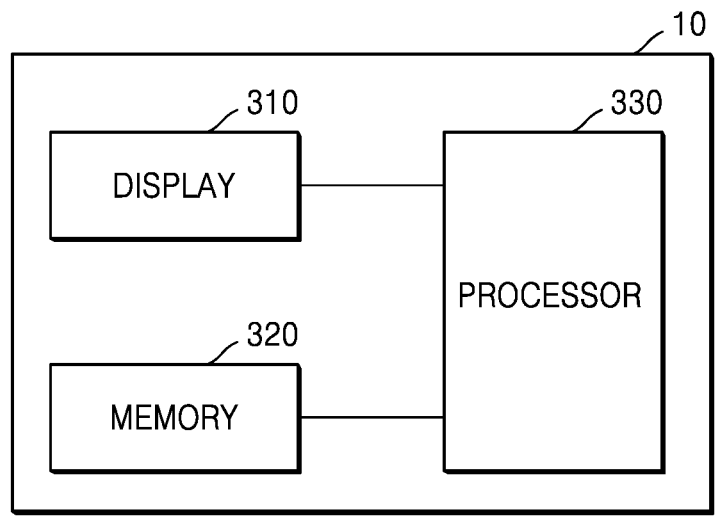
FIG. 3 is a diagram illustrating a configuration of a device according to an embodiment.

FIG. 3 is a diagram illustrating a configuration of the device 10 according to an embodiment.

Referring to FIG. 3, the device 10 includes a display 310, a memory 320, and a processor 330.

The display 310 may display information processed in the processor 330 under the control of the processor 330. The display 310 may output image data processed by the processor 330 to a screen of the device 10. Also, the display 310 may output various graphic user interfaces (GUIs) to the screen of the device 10 under the control of the processor 330.

The memory 320 may store various data, programs, or applications for driving and controlling the device 10. The programs stored in the memory 320 may include one or more instructions. The programs (one or more instructions) or the applications stored in the memory 320 may be executed by the processor 330.

The memory 320 according to an embodiment may include one or more instructions constituting a neural network. The memory 320 may also include one or more instructions to control the neural network. The neural network may include a plurality of layers including one or more instructions for identifying and/or determining objects in an image from an input image, and a plurality of layers including one or more instructions for determining a correction filter corresponding to each of identified objects from the input image. A detailed structure of the memory 320 will be described with reference to FIG. 31.

The processor 330 may execute an operating system (OS) and various applications stored in the memory 320. The processor 330 may include one or more processors including a single core, a dual core, a triple core, a quad core, and multiple cores thereof. Also, for example, the processor 330 may be implemented as a main processor (not shown) and a sub processor (not shown) operating in a sleep mode.

The processor 330 according to an embodiment obtains an image. For example, the processor 330 may read an image stored in the memory 320 by executing a photo album application or the like. Alternatively, the processor 330 may receive an image from an external server (for example, an SNS server, a cloud server, a content providing server, or the like) through a communicator (not shown). Alternatively, the processor 330 may obtain a preview image and a captured image through a camera (not shown).

The processor 330 according to an embodiment may use the instructions constituting the neural network stored in the memory 320 to identify objects in the image and determine correction filters respectively corresponding to the objects. Thereby, the processor 330 may perform image correction that is most suitable for each of the objects in the image.

On the other hand, a method, performed by the processor 330, of identifying an object in the image and determining a correction filter with respect to the identified object may correspond to operations S220 to S230 described above with reference to FIG. 2. Also, the processor 330 may control the memory 320 to store the corrected image.

Figure 4:
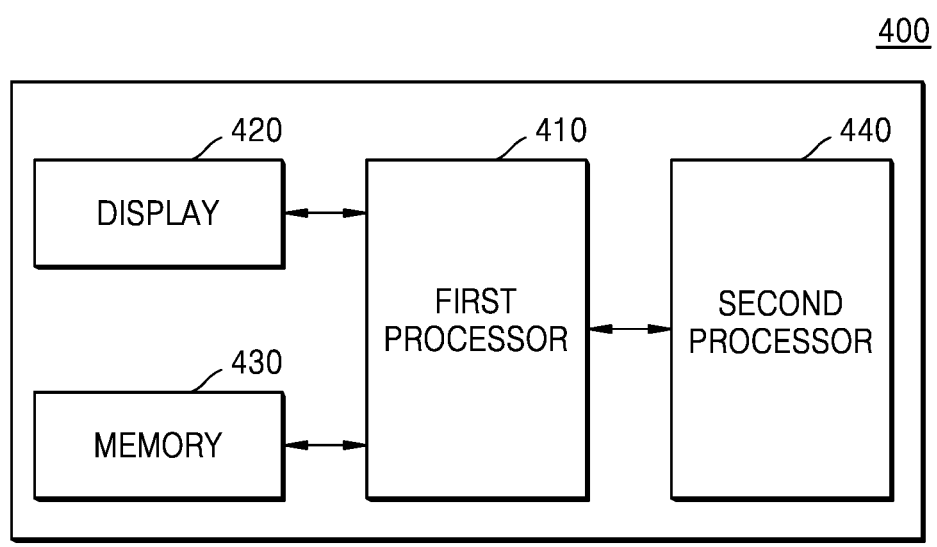
FIG. 4 is a diagram showing a configuration of a device according to another embodiment.

FIG. 4 is a diagram showing a configuration of a device 400 according to another embodiment.

Referring to FIG. 4, the device 400 includes a first processor 410, a display 420, a memory 430, and a second processor 440. However, all illustrated components are not indispensable components. The device 400 may be implemented by more components than the illustrated components, and the device 400 may be implemented by fewer components than the illustrated components. For example, the device 400 may further include a camera (not shown) and a communicator (not shown) in addition to the first processor 410, the display 420, the memory 430, and the second processor 440.

The first processor 410 may control execution of at least one application installed in the device 400 and may perform graphical processing on an image obtained by the device 400. The first processor 410 may be implemented as a system on chip (SoC) in which functions of a central processing unit (CPU), a graphics processing unit (GPU), a communication chip, a sensor, etc. are integrated. Also, the first processor 410 may be described as an application processor (AP) within the specification.

The display 420 and the memory 430 may correspond to the display 310 and the memory 320 described above with reference to FIG. 3 respectively.

The second processor 440 may use the neural network 12 to identify objects in the image from the image. Also, the second processor 440 according to an embodiment may use the neural network 12 to determine correction filters respectively corresponding to the identified objects.

Meanwhile, the second processor 440 may be manufactured as a dedicated hardware chip for artificial intelligence (AI) that performs functions of object identification and correction filter determination using the neural network 12.

According to various embodiments of the present disclosure, functions performed by the first processor 410 may be correspondingly performed by the applications stored in the memory 430 and performing various functions, and functions performed by the second processor 440 may be correspondingly performed by an OS of the device 400.

For example, when a camera application generates an image and transmits the image to the OS, the OS may perform a series of processes to identify the objects included in the image and determine and apply correction filters to each of the identified objects.

According to an embodiment, the first processor 410 and the second processor 440 may cooperate with each another such that the processor 330 described above with reference to FIG. 3 may perform a series of processes to identify a plurality of objects included in the image and apply a correction filter to each of the identified objects. This will be described later in detail with reference to FIGS. 5 to 20.

Figure 5:
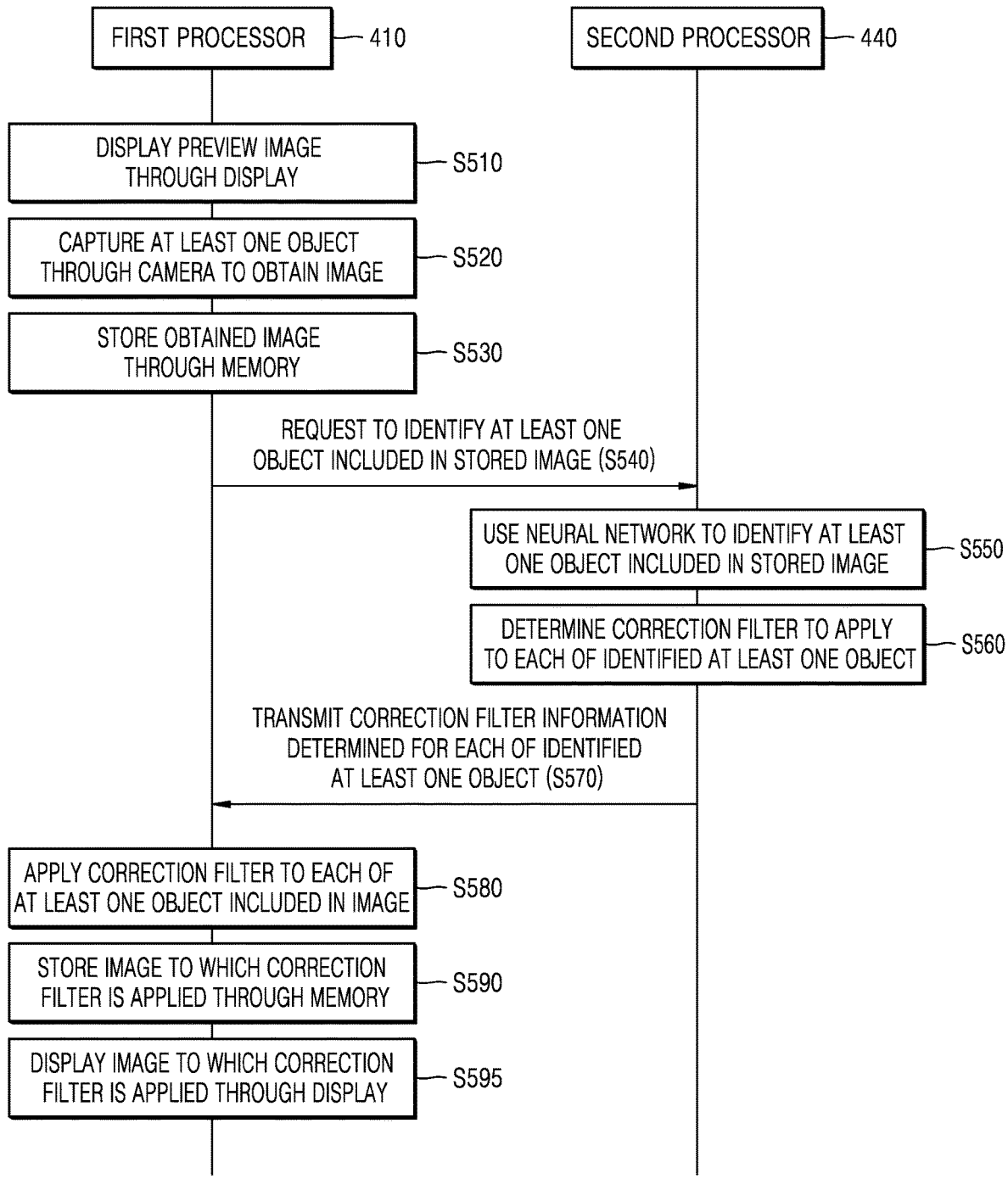
FIG. 5 is a flowchart illustrating a method, performed by a first processor and a second processor, of correcting an object in a captured image, according to an embodiment.

FIG. 5 is a flowchart illustrating a method, performed by the first processor 410 and the second processor 440, of correcting an object in an image obtained upon capturing, according to an embodiment.

In operation S510, the first processor 410 may display a preview image through the display 420.

The first processor 410 may display the preview image including at least one object sensed by the device 400 through the display 420 as a camera application is executed based on a user input. However, this is an embodiment only, and the first processor 410 may display the preview image through the display 420 even when another application accompanying a capturing function is executed in addition to the camera application. Here, also, a resolution of the preview image may be determined according to a resolution set on the display 420 of the device 400.

In operation S520, the first processor 410 may capture at least one object through a camera (not shown) to obtain an image.

The first processor 410 may capture the image including the at least one object sensed at the time when a capturing request is received through the camera (not shown) when the capturing request is received. The captured image may be an image encoded according to a resolution predetermined in the camera.

In operation S530, the first processor 410 may store the obtained image through the memory 430.

In operation S540, the first processor 410 may request the second processor 440 to identify the at least one object included in the stored image.

For example, the first processor 410 may transmit an object identification request signal including an image stored in the second processor 440 to the second processor 440. According to another example, the first processor 410 may transmit an object identification request signal including an identifier of a location of the memory 430 in which the image is stored to the second processor 440.

In operation S550, the second processor 440 may use a neural network to identify at least one object included in the stored image. Here, operation S550 may correspond to operation S220 described above with reference to FIG. 2.

In operation S560, the second processor 440 may determine a correction filter to apply to each of the identified at least one object. Here, operation S560 may correspond to operation S230 described above with reference to FIG. 2.

In operation S570, the second processor 440 may transmit to the first processor 410 correction filter information determined for each of the identified at least one object.

The correction filter information according to an embodiment may include information about location information (for example, pixel coordinates) in which the identified object is displayed on the image, a type of a correction filter corresponding to the identified object, and a parameter value in applying the correction filter, etc.

In operation S580, the first processor 410 may apply the correction filter to each of the at least one object included in the image. Here, operation S580 may correspond to operation S240 described above with reference to FIG. 2.

In operation S590, the first processor 410 may store the image to which the correction filter is applied through the memory 430.

According to an embodiment, the first processor 410 may store an image before the correction filter is applied in a specific field region set in the format of the image to which the correction filter is applied. For example, when the image to which the correction filter is applied is stored in the JPEG file format, the first processor 410 may store the image before the correction filter is applied in a maker note region of a header of the image to which the correction filter is applied. According to another example, the first processor 410 may store in a maker note a link that may be connected with a region of the memory 320 where image before the correction filter is applied is stored or identification information of the region of the memory 320.

Meanwhile, according to another embodiment, the first processor 410 may remove the image before the correction filter is applied from the memory 430 as the image to which the correction filter is applied is stored.

In operation S595, the first processor 410 may display the image to which the correction filter is applied through the display 420. For example, the first processor 410 may display the image to which the correction filter is applied through the display 420, as a photo album application displaying a captured or stored image based on a user input is executed.

Figure 6:
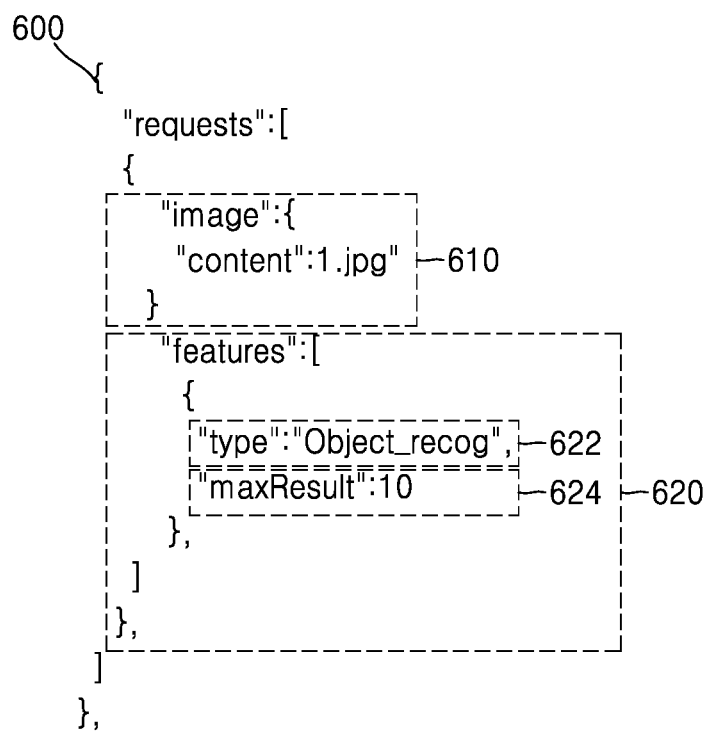

FIG. 6 is a diagram illustrating information included in an object identification request 600 transmitted from the first processor 410 to the second processor 420 for identification of an object included in an image according to an embodiment.

An interface for transmitting/receiving data (e.g., an image to which a correction filter is applied) between the first processor 410 and the second processor 420 may be defined for the object identification request 600.

For example, an application program interface (API) function having data to be input to a neural network as a transfer value may be defined. In this case, when the first processor 410 calls the API function and inputs an image before correction and a request purpose as the data transfer value, the API function may transfer the age before correction and the request purpose as the data to be input to the neural network to the second processor 420.

Referring to FIG. 6, the object identification request 600 may include an image 610 and information 620 about the request purpose. In the present embodiment, the object identification request 600 includes the image 610. However, this is an example only, and an identifier of a location of a memory in which the image 610 is stored may be included in the object identification request 600.

The information 620 about the request purpose may include a type 622 of the request purpose indicating a request target and information about a response condition 624. In the present embodiment, the type 622 of the request purpose may be set to object recognition, and the response condition 624 may be set such that a maximum number of recognized objects is limited to 10.

Figure 7:
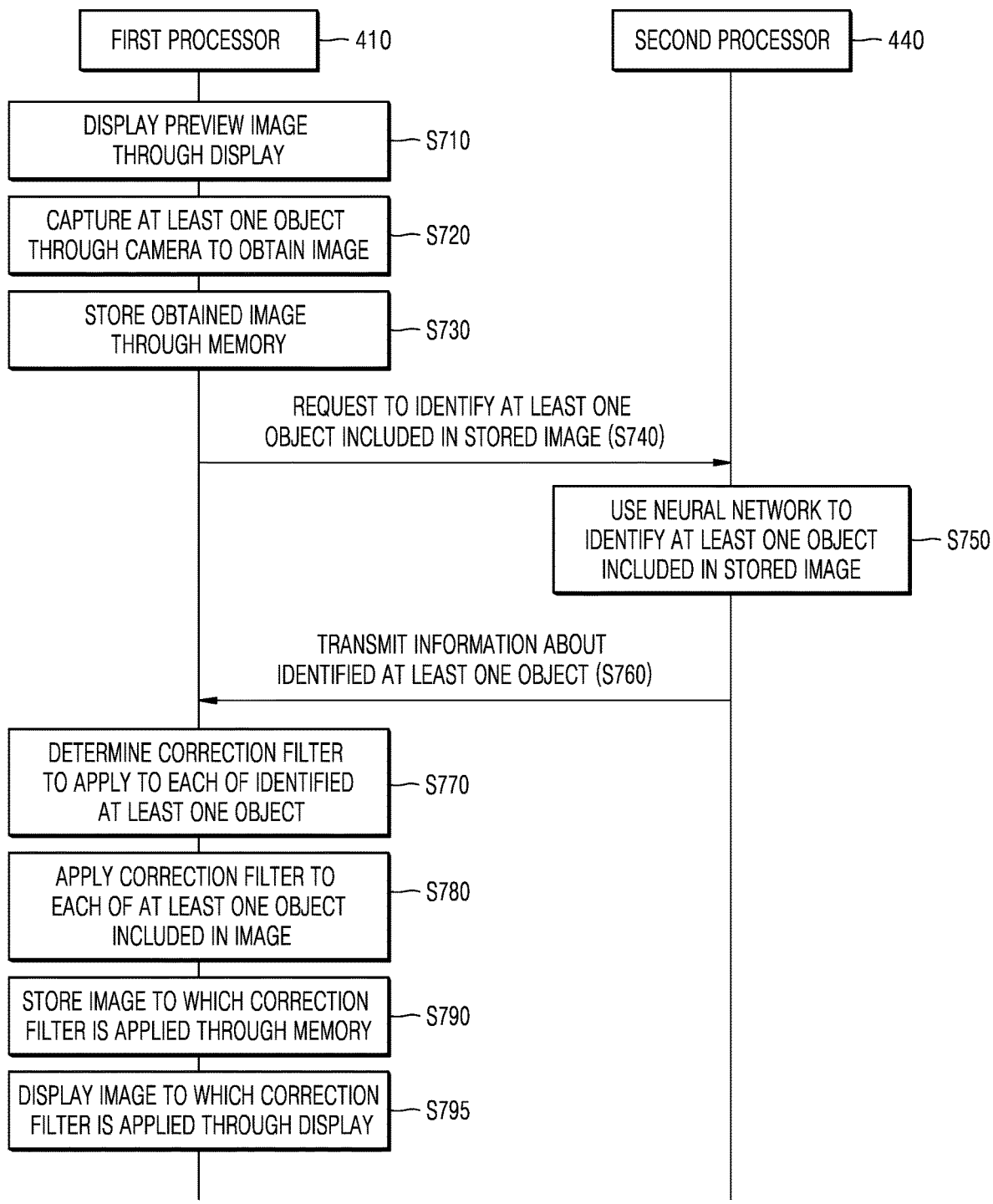
FIG. 7 is a flowchart for explaining a method, performed by a first processor and a second processor, of correcting an object in an image obtained upon capturing, according to another embodiment.

FIG. 7 is a flowchart for explaining a method, performed by the first processor 410 and the second processor 440, of correcting an object in an image obtained upon capturing, according to another embodiment.

In FIG. 7, operations S710 to S750 may correspond to operations S510 to S550 described above with reference to FIG. 5 respectively.

On the other hand, in operation S760, the second processor 440 may transmit information about at least one identified object to the first processor 410.

According to an embodiment, the second processor 440 may transmit to the first processor 410 information including a location of the identified object in the image and identification information of the object corresponding to the location. For example, the second processor 440 may transmit to the first processor 410 information informing that a 'dog' object is included in a region between [x1, y1] and [x2, y2] in the image.

In operation S770, the first processor 410 may determine a correction filter to apply to each of the at least one identified object, based on the information about the at least one identified object. Here, operation S770 may correspond to operation S560 described above with reference to FIG. 5.

Also, operations S780 and s790 may correspond to operations S580 and S590 described above with reference to FIG. 5 respectively.

In operation S795, the first processor 410 may display an image to which the correction filter is applied through the display 420. For example, the first processor 410 may display the image to which the correction filter is applied through the display 420, as a photo album application displaying a captured or stored image based on the user input is executed.

Figure 8:
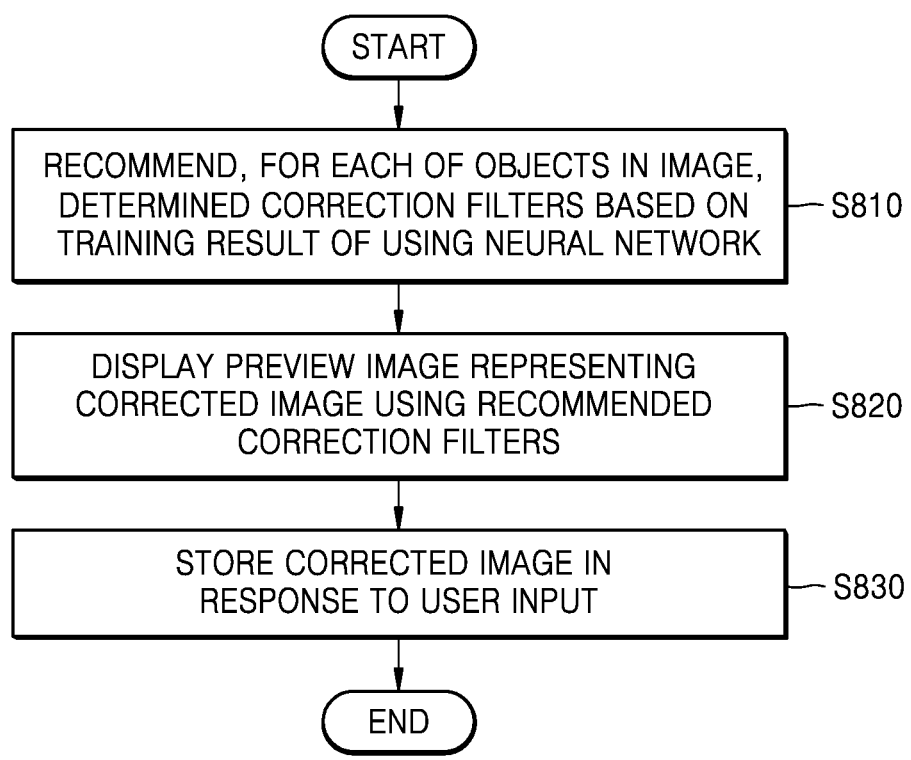
FIG. 8 is a flowchart illustrating a method, performed by a device, of recommending a correction filter that may be applied to each of objects included in an image, according to an embodiment.

FIG. 8 is a flowchart illustrating a method, performed by the device 10, of recommending a correction filter that may be applied to each of objects included in an image, according to an embodiment.

In operation S810, the device 10 may recommend, for each of the objects in the image, determined correction filters according to a training result of using the neural network 12. For example, the device 10 may display a list of the correction filters respectively corresponding to the objects in the image determined using the neural network 12 in a region associated with a corresponding object on the image.

Alternatively, the device 10 may display correction filters for correcting an object corresponding to a location touched by a user input in the image on a region associated with a selected object on the image. For example, the device 10 may display a list of correction filters corresponding to at least one selected object in response to a user input touching at least one object in the image.

In operation S820, the device 10 may display a preview image representing a corrected image using the recommended correction filters.

Figure 11:
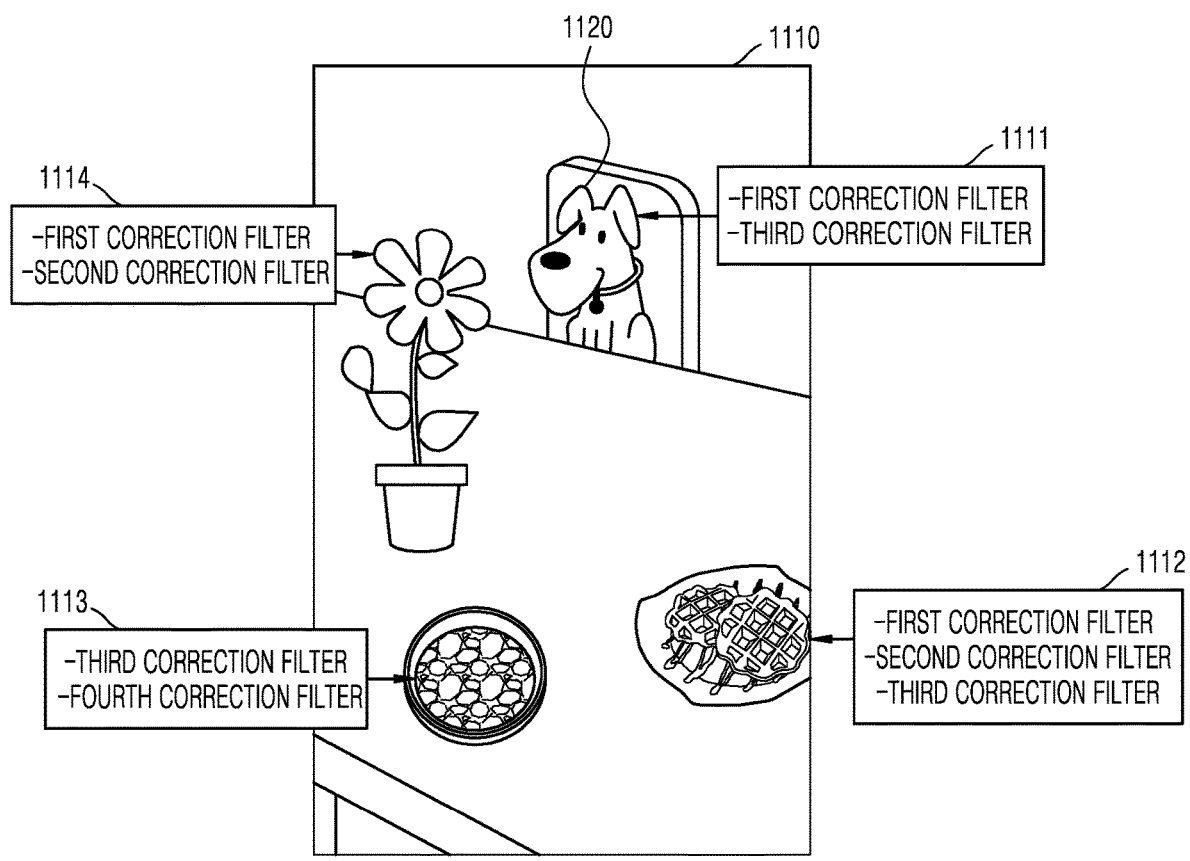
FIG. 11 is an example in which a device recommends correction filters respectively corresponding to objects in an image.

According to an embodiment, the device 10 may display at least one of a first preview image (e.g., a preview image in which a first correction filter is applied to a 'dog' object of FIG. 11, a second correction filter is applied to a 'flower' object, a third correction filter is applied to a 'pizza' object, and the second correction filter is applied to a 'waffle' object) in which at least one of the corresponding recommended correction filters is applied to all the objects included in the image, a second preview image (e.g., a preview image in which the first correction filter is applied to the 'dog' object of FIG. 11) in which at least one of the corresponding recommended correction filters is applied to at least one of the objects included in the image, and a third preview image in which all the corresponding recommended correction filters are applied to all the objects.

At this time, the second preview image is that at least one of preferred correction filters is applied at least one object preferred by a user among the objects included in the image, based on a previous correction history of the device 10.

In operation S830, the device 10 may store the corrected image in response to a user input. The device 10 may store the corrected image corresponding to a selected preview image, in response to a user input selecting one of the first through third preview images. Further, the device 10 may store information about the correction filter applied to the corrected image together with or in association with the corrected image, and may store the corrected image and an original image in association with each other.

For example, the device 10 may store at least one of information about a correction filter applied to a specific field region set in a format of the corrected image, the original image, and an address where the original image is stored.

On the other hand, operation S820 may be omitted. In this case, the device 10 may store an image to which the correction filters selected by the user input are applied, in response to the user input for the correction filters recommended in operation S810.

Figure 9:
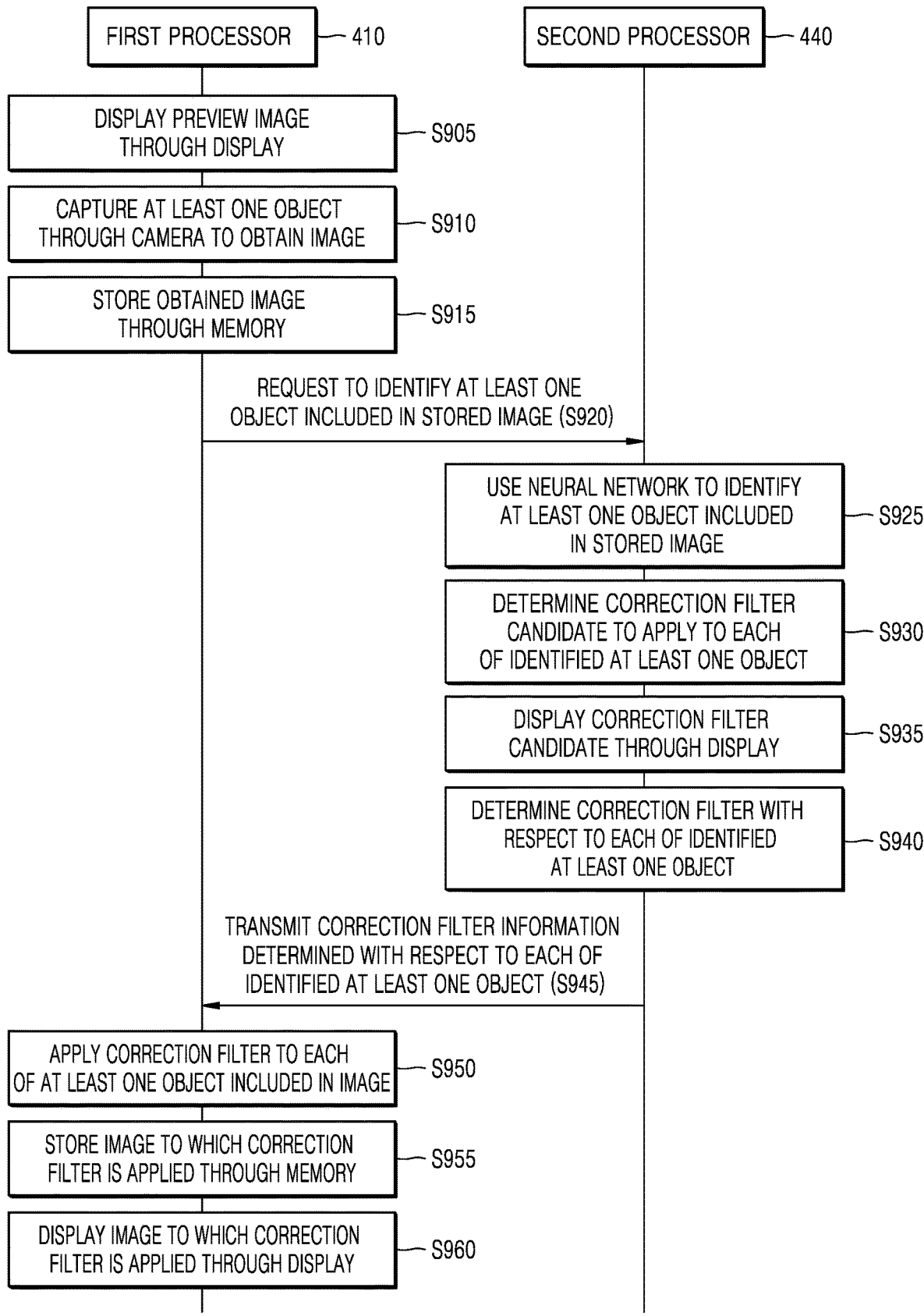
FIG. 9 is a flowchart illustrating a method, performed by a first processor and a second processor, of recommending a correction filter that may be applied to each of objects included in an image, according to an embodiment.

FIG. 9 is a flowchart illustrating a method, performed by the first processor 410 and the second processor 440, of recommending a correction filter that may be applied to each of objects included in an image, according to an embodiment.

In FIG. 9, operations S905 to S925 may correspond to operations S510 to S550 described above with reference to FIG. 5 respectively.

Meanwhile, in operation S930, the second processor 440 may select at least one or more correction filter candidates to apply to an identified object. For example, the second processor 440 may select at least one correction filter that is determined to be suitable to apply to the identified object, according to a result of analyzing a display attribute of the identified object using a neural network. Here, suitability of the correction filter for the identified object may be calculated as a probability value through the neural network. The second processor 440 may select at least one or more correction filters whose probability values are equal to or greater than a predetermined threshold value as the correction filter candidates.

In operation S935, the second processor 440 may display the correction filter candidate to be applied to each of at least one object included in the image through a display.

For example, the second processor 440 may display a correction filter candidate list on a location (e.g., within a predetermined distance range) adjacent to the identified object. Also, the second processor 440 may display a corrected preview image in which the correction filter is applied to each of the at least one object included in the image.

In operation S940, the second processor 440 may determine a correction filter to apply to the identified object. For example, the second processor 440 may select, from the at least one or more correction filter candidates, a correction filter selected by the user as the correction filter to apply to the identified object.

Operations S945 to S960 may correspond to operations S570 to S595 described above with reference to FIG. 5.

Figure 10:
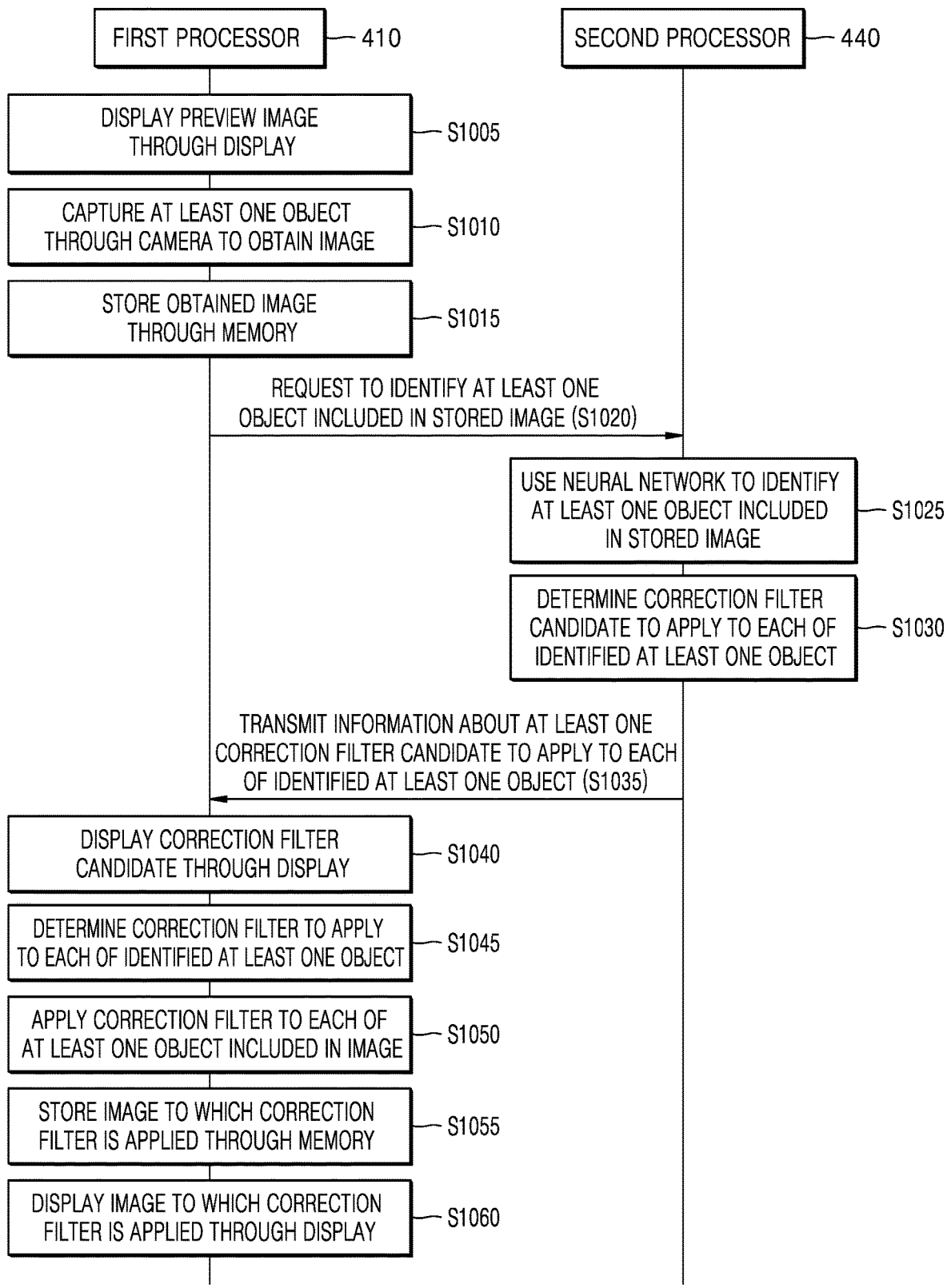
FIG. 10 is a flowchart illustrating a method, performed by a first processor and a second processor, of recommending a correction filter that may be applied to each of objects included in an image, according to another embodiment.

FIG. 10 is a flowchart illustrating a method, performed by the first processor 410 and the second processor 440, of recommending a correction filter that may be applied to each of objects included in an image, according to an embodiment.

In FIG. 10, operations S1005 to S1030 may correspond to operations S905 to S930 described above with reference to FIG. 9.

On the other hand, in operation S1035, the second processor 440 may transmit information about the at least one correction filter candidate to the first processor 410.

The information about the correction filter candidate according to an embodiment may include location information (for example, pixel coordinates) indicating an identified object on the image, and information about a type of a correction filter candidate corresponding to the identified object.

In operation S1040, the first processor 410 may display a correction filter candidate to be applied to each of at least one or more objects included in the image through a display.

For example, the first processor 410 may display a correction filter candidate list on a location (e.g., within a predetermined distance range) adjacent to the identified object. Also, the first processor 410 may display a correction preview image in which a correction filter is applied to each of the at least one or more objects included in the image.

In operation S1045, the first processor 410 may determine a correction filter to apply to the identified object. For example, the first processor 410 may select, from the at least one correction filter candidate, a correction filter selected by a user as the correction filter to apply to the identified object.

Operations S1050 and S1060 may correspond to operations S950 and S960 described above with reference to FIG. 9.

FIG. 11 is an example in which the device 10 recommends correction filters respectively corresponding to objects in an image 1110.

Referring to FIG. 11, the device 10 may display correction filter lists 1111 to 1114 respectively corresponding to the objects in the image 1110, in order to recommend objects identified based on a result of using the neural network 12 and correction filters respectively corresponding to the identified objects.

At this time, the device 10 may display an indicator (shown by an arrow in FIG. 11) indicating the identified object corresponding to the correction filter lists 1111 to 1114. The device 10 may also display information indicating a recognition result of each of the identified objects together with the indicator. When the recognition result is wrong in view of a user, the device 10 may provide an input interface for receiving a user command for re-recognition. For example, when the identified object or identified object recognition result information is touched, the device 10 may provide a re-recognition result through re-recognition.

According to an embodiment, the device 10 may receive a user input with respect to at least one of the correction filter lists 1111 through 1114. The device 10 may perform image correction corresponding to the selected correction filter lists 1111 to 1114 in response to the user input. For example, in response to a user input touching the correction filter list 1111 corresponding to a 'dog' in the image 1110, the device 10 may apply a first correction filter and/or a third correction filter to an image region 1120 on which the 'dog' is displayed, thereby generating and/or storing a corrected image.

The device 10 according to an embodiment may select and apply any one of a plurality of filters determined to be appropriate for the identified object based on a user input, thereby providing information about an appropriate correction filter to an object as well as generating an image in which a quality improvement effect of the image desired by the user is maximized.

Figure 12:
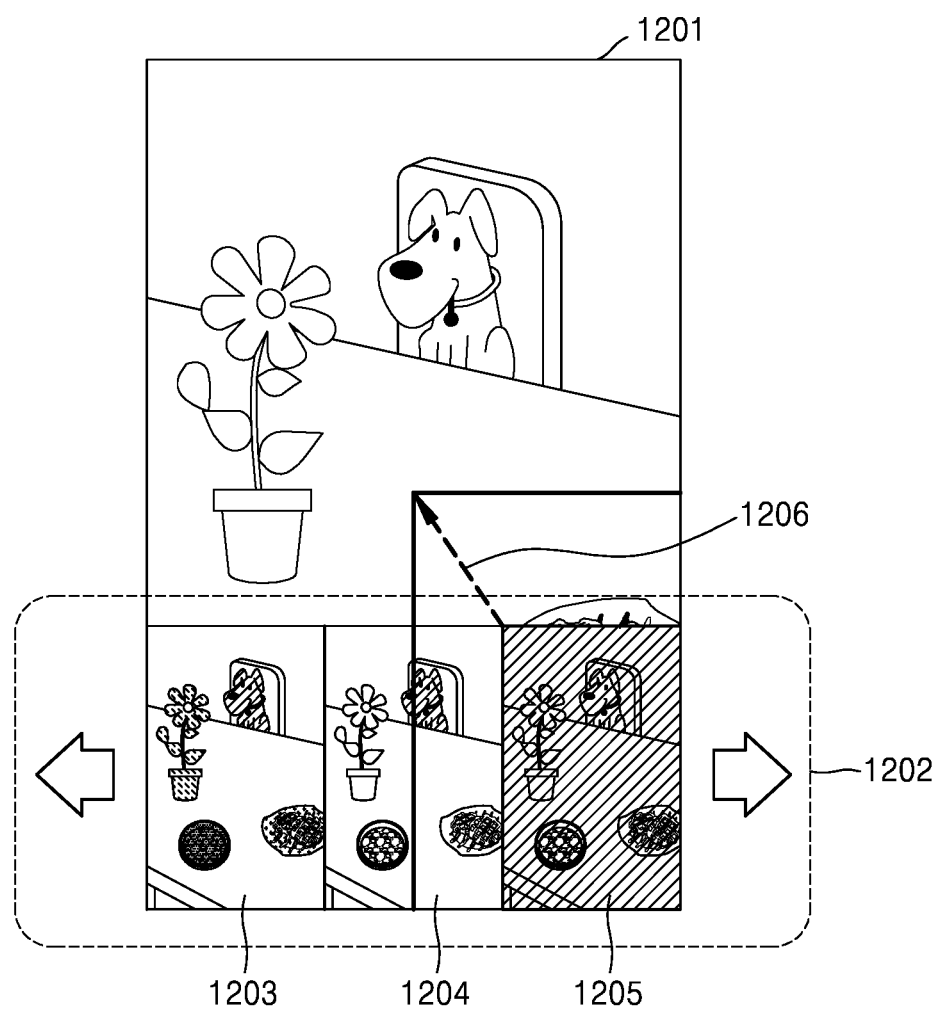
FIG. 12 is an example in which a device displays preview images.

FIG. 12 is an example in which the device 10 displays preview images 1203 through 1205.

Referring to FIG. 12, the device 10 may display the preview images 1203 through 1205 obtained as a result of applying correction filters determined based on a result using of the neural network 12 together with an uncorrected image 1201. Therefore, a user may easily identify an image change before and after correction.

For example, the device 10 may display a first preview image 1203 in which correction filters corresponding to objects included in the image 1201 are applied to the image 1201, a second preview image 1204 in which correction filters are applied to an object (e.g. a 'dog') preferred by the user according to a previous correction history, and a third preview image 1205 in which all correction filters are applied to all the objects included in the image 1201.

On the other hand, the device 10 may receive a user input that slides a first region 1202 on which a plurality of preview images are displayed so as to display the preview images. The device 10 may display a preview image in which different objects in the image 1201 are corrected, in response to the user input that slides the first region 1202.

According to an embodiment, the device 10 may emphasize (e.g., an object flicker, a boundary enhancement of the object) and display an object to which the correction filters are applied in the preview images 1203 through 1205.

According to an embodiment, the device 10 may change a size at which the preview images 1203 through 1205 are displayed on a screen, in response to a user input 1206 dragging and dropping a boundary of the preview images 1203 through 1205.

Figure 13:
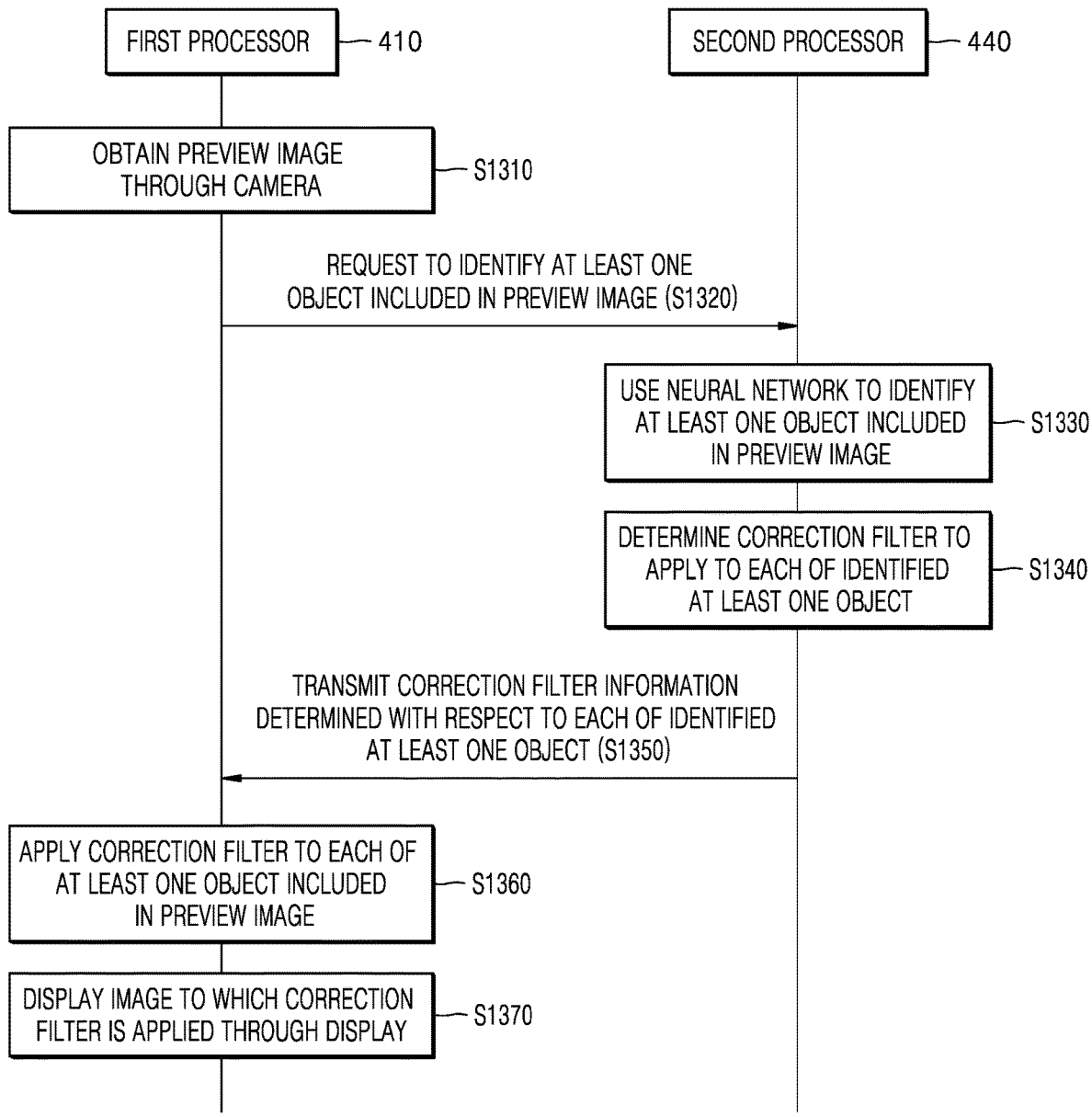
FIG. 13 is a diagram for explaining a method, performed by a first processor and a second processor, of applying a correction filter to an object included in a preview image in real time, according to an embodiment.

FIG. 13 is a diagram for explaining a method, performed by the first processor 410 and the second processor 440, of applying a correction filter to an object included in a preview image in real time, according to an embodiment.

In operation S1310, the first processor 410 may obtain the preview image through a camera (not shown).

The first processor 410 may obtain the preview image including at least one object sensed by the device 400 through the camera (not shown) as a camera application is executed. Here, the first processor 410 may obtain the preview image in real time according to a predetermined frame rate. For example, when the frame rate is set to 30 fps, the first processor 410 may obtain 30 preview images per second.

On the other hand, when a user requests a correction of the preview image, the first processor 410 may change the frame rate in consideration of a time required in a series of correction processes to be described later. For example, the first processor 410 may change the frame rate from 30 fps to 24 fps.

In operation S1320, the first processor 410 may request the second processor 440 to identify at least one object included in the preview image.

For example, the first processor 410 may transmit an object identification request signal including the preview image to the second processor 440 to the second processor 440.

In operation S1330, the second processor 440 may use a neural network to identify the at least one object included in the preview image. Here, operation S1330 may correspond to a method of identifying at least one object included in an image in operation S220 described above with reference to FIG. 2.

In operation S1340, the second processor 440 may determine the correction filter to apply to each of the identified at least one object.

Meanwhile, according to another example, the second processor 440 may determine at least one correction filter candidate to apply to each of the identified at least one object.

In operation S1350, the second processor 440 may transmit to the first processor 410 correction filter information determined for each of the identified at least one object.

On the other hand, according to another example, in operation S1340, when the at least one correction filter candidate is determined, the second processor 440 may transmit information about the at least one correction filter candidate to the first processor 410.

In operation S1360, the first processor 410 may apply the correction filter to the at least one object included in the preview image based on the received correction filter information.

On the other hand, according to another example, when the first processor 410 receives the information about the at least one correction filter candidate from the second processor 440, the first processor 410 may select any one of the at least one correction filter candidate, based on a user input.

In operation S1370, the first processor 410 may display the preview image to which the correction filter is applied through a display. The first processor 410 according to an embodiment may display an image to which the correction filter is applied according to the predetermined frame rate in real time.

Figure 14:
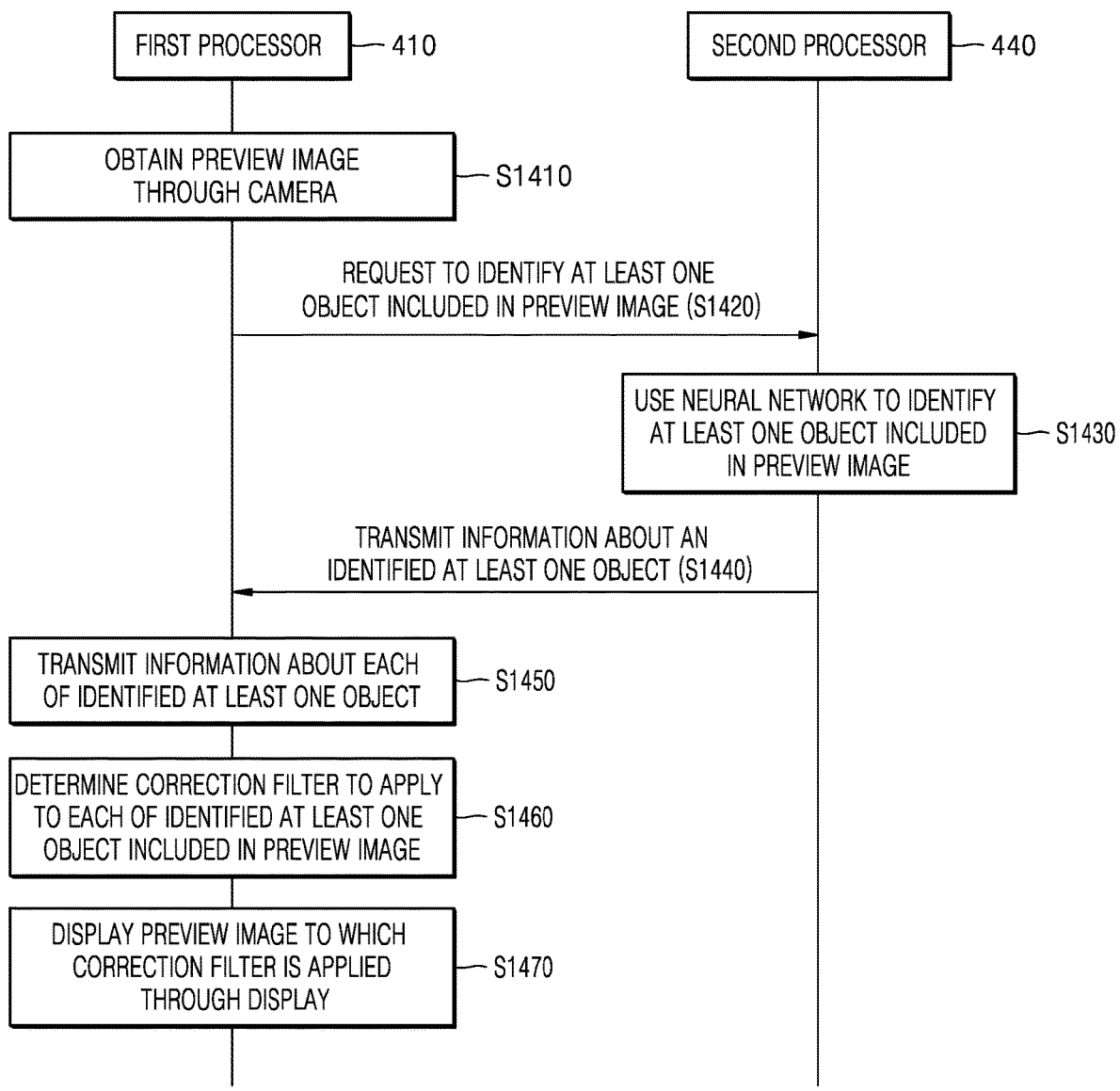
FIG. 14 is a diagram for explaining a method, performed by a first processor and a second processor, of applying a correction filter to an object included in a preview image in real time, according to another embodiment.

FIG. 14 is a diagram for explaining a method, performed by the first processor 410 and the second processor 440, of applying a correction filter to an object included in a preview image in real time, according to another embodiment.

In FIG. 14, operations S1410 to S1430 may correspond to operations S1310 to S1330 described above with reference to FIG. 13.

On the other hand, in operation S1440, the second processor 440 may transmit information about an identified at least one object to the first processor 410.

The information about the identified at least one object according to an embodiment may include information about a location of the object in an image and identification information of the object.

In operation S1450, the first processor 410 may determine a correction filter to apply to each identified at least one object.

Meanwhile, according to another example, the second processor 440 may determine at least one correction filter candidate to apply to each identified at least one object.

Operations S1460 and S1470 may correspond to operations S1360 and S1370 described above with reference to FIG. 13.

Figure 15:
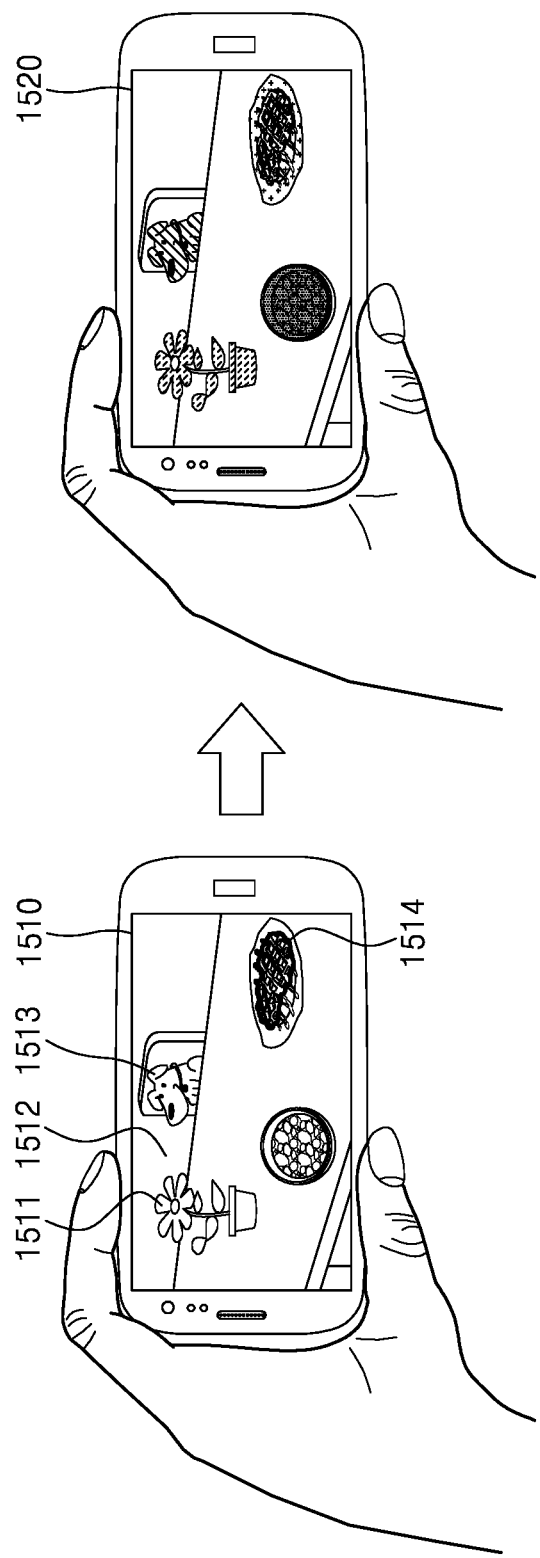
FIG. 15 is a diagram for explaining a method, performed by a device, of applying a correction filter to each of a plurality of objects included in a preview image in real time.

FIG. 15 is a diagram for explaining a method, performed by the device 10, of applying a correction filter to each of a plurality of objects 1511, 1512, 1513, and 1514 included in a preview image 1510 in real time.

Referring to FIG. 15, the device 10 may identify the plurality of preview images 1511, 1512, 1513, and 1514 included in the preview image 1510 sensed by the device 10 as an application for obtaining the preview image 1510 in real time, such as a camera application installed in the device 10 is executed. For example, the device 10 may identify a plurality of objects included in an image that is visible on a screen before capturing a moving image or taking a photograph. Also, the device 10 may apply the correction filter to a region corresponding to each of the plurality of objects 1511, 1512, 1513, and 1514 identified from the preview image 1510 to display the plurality of objects 1511, 1512, 1513, and 1514 on the screen. The device 10 may apply the correction filter corresponding to each of the plurality of identified objects 1511, 1512, 1513 and 1514, thereby improving the quality of an image obtained in real time.

Also, the device 10 may store a preview image 1520 to which the correction filter is applied when a user input to request capturing a moving image or taking a photograph is received.

Meanwhile, in the present embodiment, the method of applying the correction filter to each of the plurality of objects 1511, 1512, 1513, and 1514 included in the preview image 1510 in real time may correspond to a method described above with reference to FIG. 2.

Figure 16:
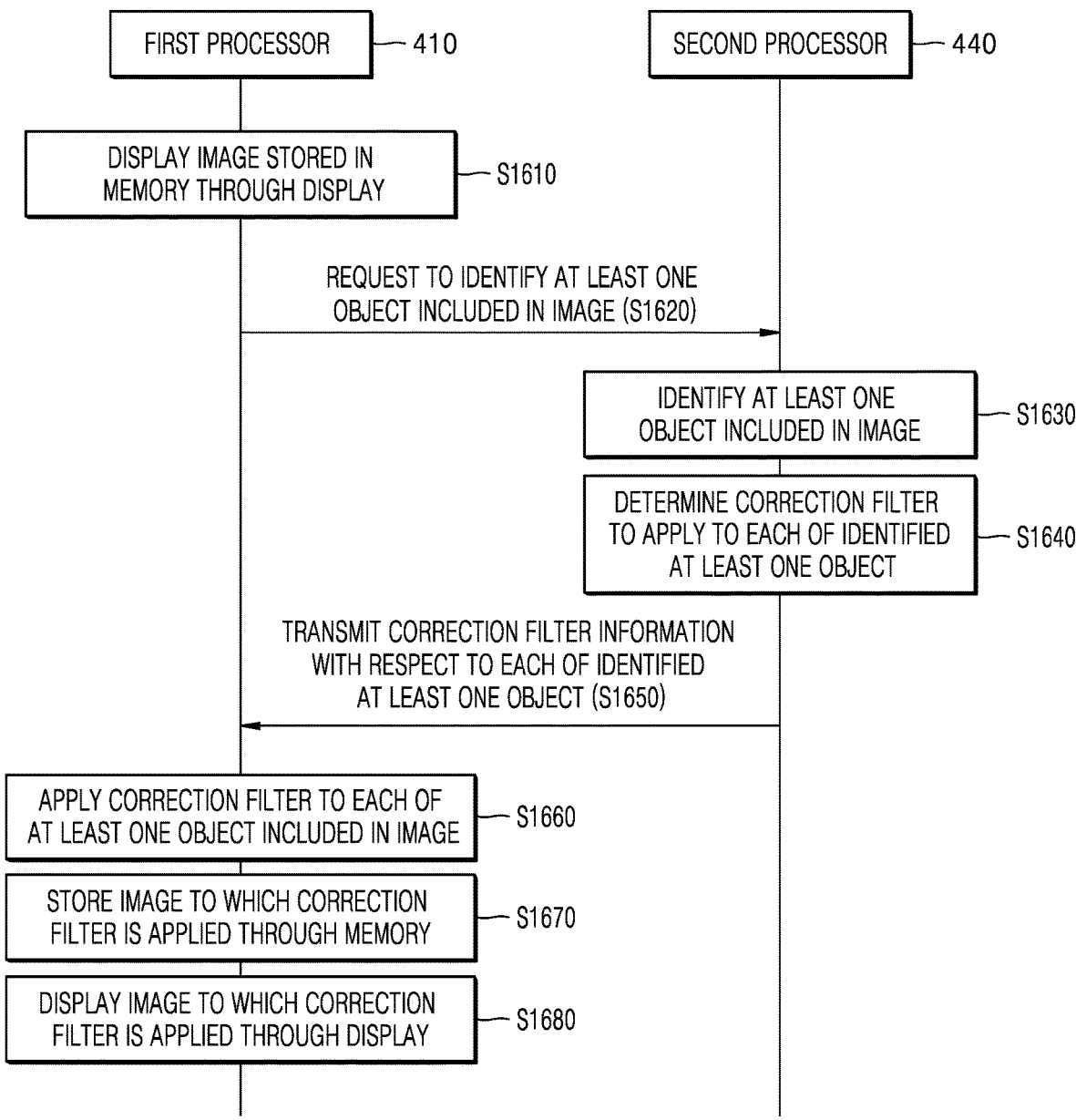
FIG. 16 is a diagram for explaining a method, performed by a first processor and a second processor, of applying a correction filter to an object included in an image stored in a memory, according to an embodiment.

FIG. 16 is a diagram for explaining a method, performed by the first processor 410 and the second processor 440, of applying a correction filter to an object included in an image stored in the memory 430, according to an embodiment.

In operation S1610, the first processor 410 may display the image stored in the memory 430 through a display.

The first processor 410 may receive a user input to request execution of a photo album application. As the user input is received, the first processor 410 may display a list of at least one image stored in the memory 430 through the display. Also, as a specific image is selected from the list of displayed at least one image, the first processor 410 may display the selected image.

In operation S1620, the first processor 410 may request the second processor 440 to identify the at least one object included in the stored image.

For example, the first processor 410 may transmit an object identification request signal including the stored image to the second processor 440 to the second processor 440. According to another example, the first processor 410 may transmit an object identification request signal including an identifier for a location of the memory 430 in which the image is stored to the second processor 440.

On the other hand, operations S1630 to S1660 may correspond to operations S550 to S580 described above with reference to FIG. 5 respectively.

In operation S1670, the first processor 410 may store the image to which the correction filter is applied through the memory 430.

In operation S1680, the first processor 410 may display the image to which the correction filter is applied through the display.

For example, the first processor 410 may display the image to which a correction filter is applied using a photo album application that is being executed.

According to another example, the first processor 410 may display the image to which the correction filter is applied using an image editing application when a user input to request execution of the image editing application is received. For example, the first processor 410 may display the image to which the correction filter is applied, which is stored in the memory 430, on an image list provided in the image editing application.

Figure 17:
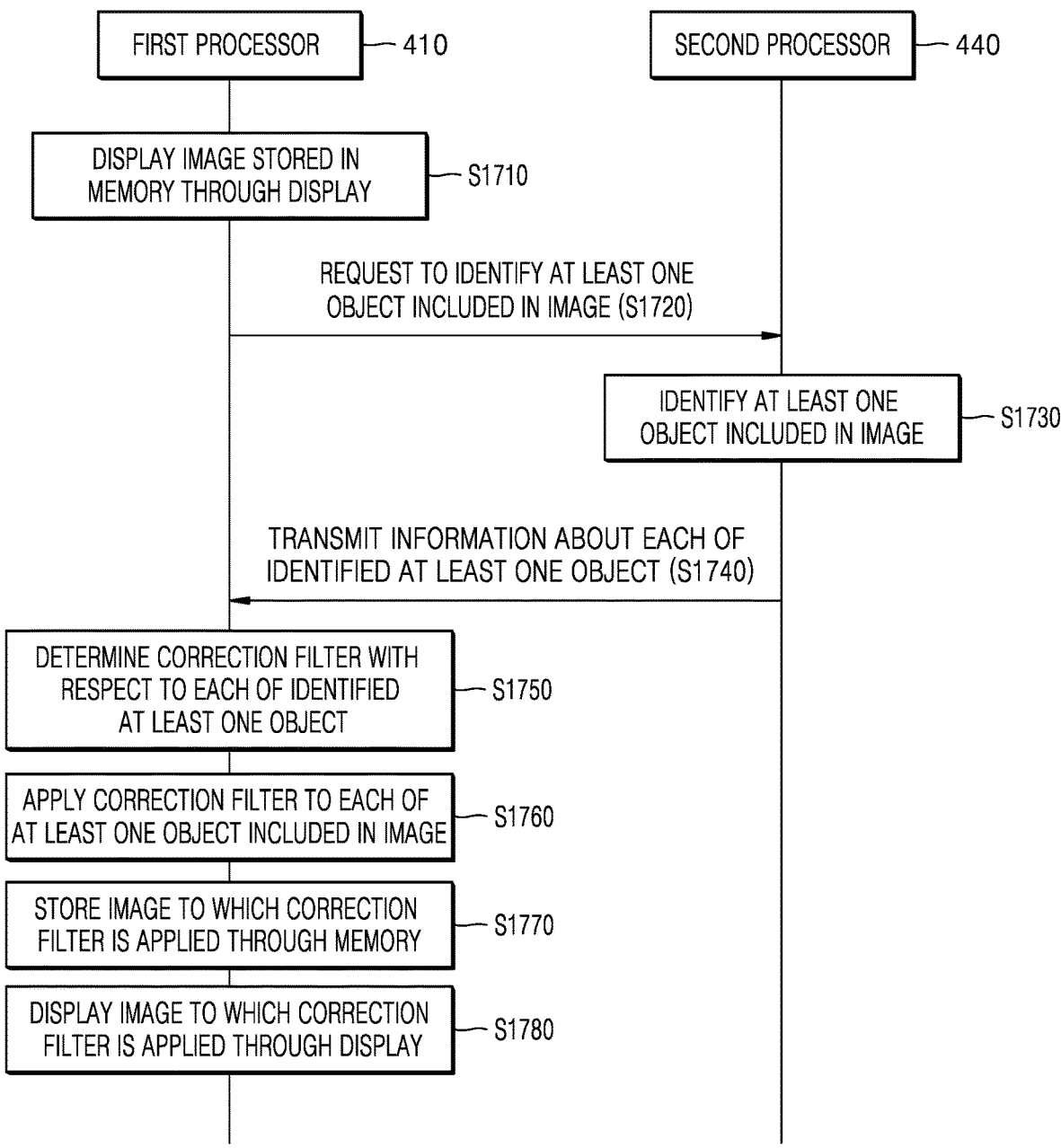
FIG. 17 is a diagram for explaining a method, performed by a first processor and a second processor, of applying a correction filter to an object included in an image stored in a memory, according to another embodiment.

FIG. 17 is a diagram for explaining a method, performed by the first processor 410 and the second processor 440, of applying a correction filter to an object included in an image stored in the memory 430, according to another embodiment.

In FIG. 17, operations S1710 to S1730 may correspond to operations S1610 to S1630 described above with reference to FIG. 16.

In operation S1740, the second processor 440 may transmit information about identified at least one object to the first processor 410. According to an embodiment, the second processor 440 may transmit information including a location of the identified object in the image and identity information of the object corresponding to the location to the first processor 410.

In operation S1750, the first processor 410 may determine the correction filter with respect to each identified at least one object. On the other hand, operation S1750 may correspond to a method of determining a correction filter in operation S230 described above with reference to FIG. 2.

On the other hand, operations S1760 to S1780 may correspond to operations S1660 to S1680 described above with reference to FIG. 16.

Figure 18:
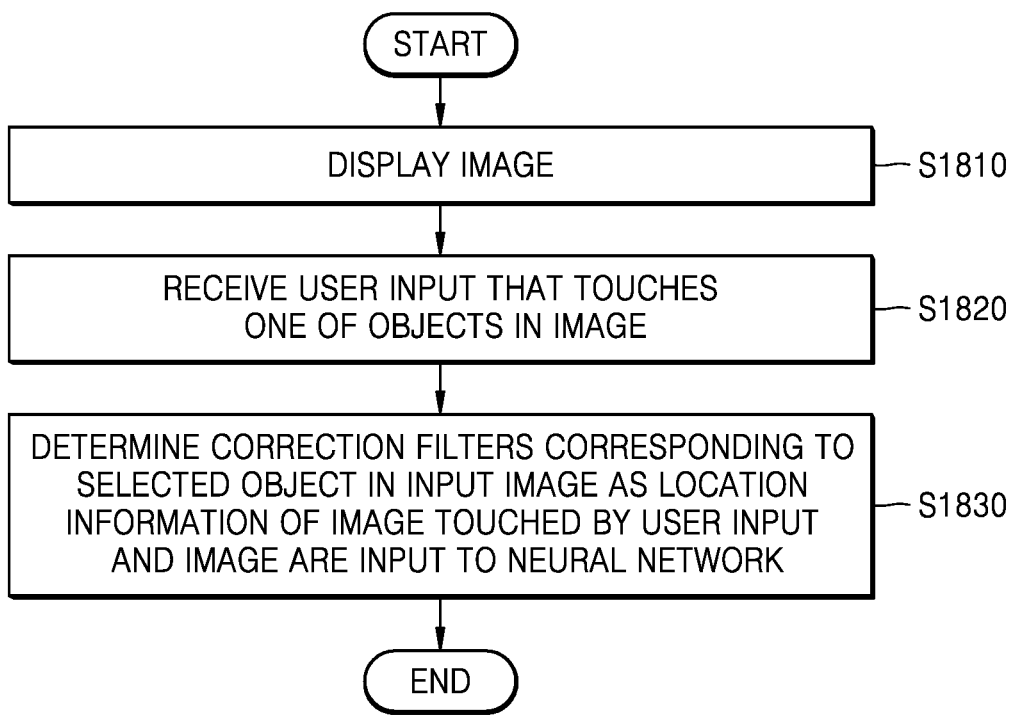
FIG. 18 is a flowchart illustrating a method, performed by a device, of correcting an object in an image in response to a user input, according to an embodiment.

FIG. 18 is a flowchart illustrating a method, performed by the device 10, of correcting an object in an image in response to a user input, according to an embodiment.

Referring to FIG. 18, in operation S1810, the device 10 may display the image. The device 10 may display an uncorrected image.

In operation S1820, the device 10 may receive the user input that touches one of objects in the image. However, a method of selecting one of the objects in the image is not limited to a touch. For example, when the device 10 provides a separate input apparatus, a user may select one of the objects in the image using the provided input apparatus.

In operation S1830, the device 10 may determine correction filters corresponding to the selected object in the input image as location information of the image touched by the user input and the image are input to the neural network 12. Also, the device 10 may identify the object in the image corresponding to the location information and determine a correction filter corresponding to the identified object, based on a result of using the neural network 12.

Alternatively, the device 10 may extract image information of a partial region corresponding to a location touched by the user from the image and input only image information of the extracted image region to the neural network 12. Here, the image information may be image data related to at least partial region of the image.

According to an embodiment, the device 10 may identify the object selected by the user and apply the correction filter corresponding to the identified object, thereby selectively correcting an object wanted by the user, without analyzing the entire image using the neural network 12, and thus an effect of improving the image quality may be maximized while reducing consumption of resources (for example, computing resources) used for object identification.

FIG. 19 is a diagram illustrating information included in an object identification request 1900 transmitted from the first processor 410 to the second processor 440 in an image for identification of an object selected based on a user input, according to an embodiment.

The first processor 410 according to an embodiment may display the image through the display 420 as at least one application including a photo album application, a camera application, an image editing application, and a web application is executed. The first processor 410 may receive a user input that selects an object in the displayed image. Also, the first processor 410 may transmit the identification request 1900 for the selected object to the second processor 440.

An interface for transmitting/receiving data (e.g., an image before applying a correction filter) between the first processor 410 and the second processor 420 may be defined for the object identification request 1900.

For example, an application program interface (API) function having data to be input to a neural network as a transfer value may be defined. In this case, when the first processor 410 calls the API function and inputs an image before correction and a request purpose as the data transfer value, the API function may transfer the image before correction and the request purpose to the second processor 420 as the data to be input to the neural network.

Referring to FIG. 19, the identification request 1900 for the selected object may include information 1910 about a correction target and information 1920 about the request purpose. The information 1910 about the correction target may include information about an image 1912 and a region 1914 of a selected object in the image 1912. Also, the information 1920 about the request purpose may include information indicating that the request purpose is object recognition.

Figure 20:
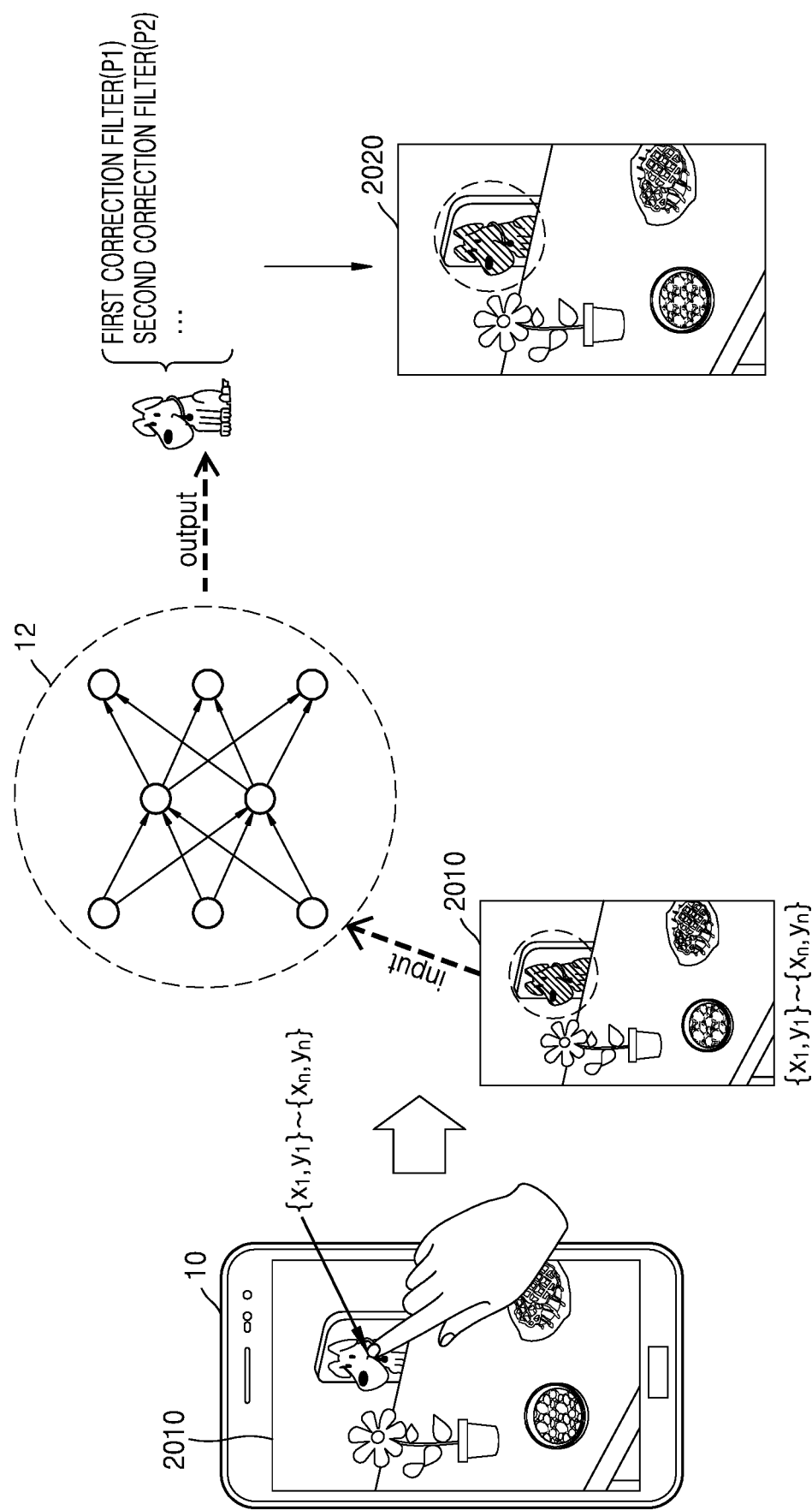
FIG. 20 is an example in which a device corrects an object in an image in response to a user input.

FIG. 20 is an example in which the device 10 corrects an object in an image in response to a user input.

Referring to FIG. 20, the device 10 may input an image 2010 displayed on a screen and first location information (i.e., a location {x1, y1} or a predetermined region such as {xn, yn} from {x1, y1}) touched by a user input to the neural network 12. The device 10 may obtain, from the neural network 12, information about an object corresponding to the first location information and a first correction filter to be applied to the object, a parameter value P1 to be input to the first correction filter, a second correction filter, and a parameter value P2 to be input to the second correction filter.

The device 10 may correct the image 2010 based on the values obtained from the neural network 12. Thus, the device 10 may perform image correction only on a 'dog' touched by the user input in the image 2010. As image correction is performed, the device 10 may display a corrected image 2020 in which a region corresponding to the 'dog' is corrected through a display.

Figure 21:
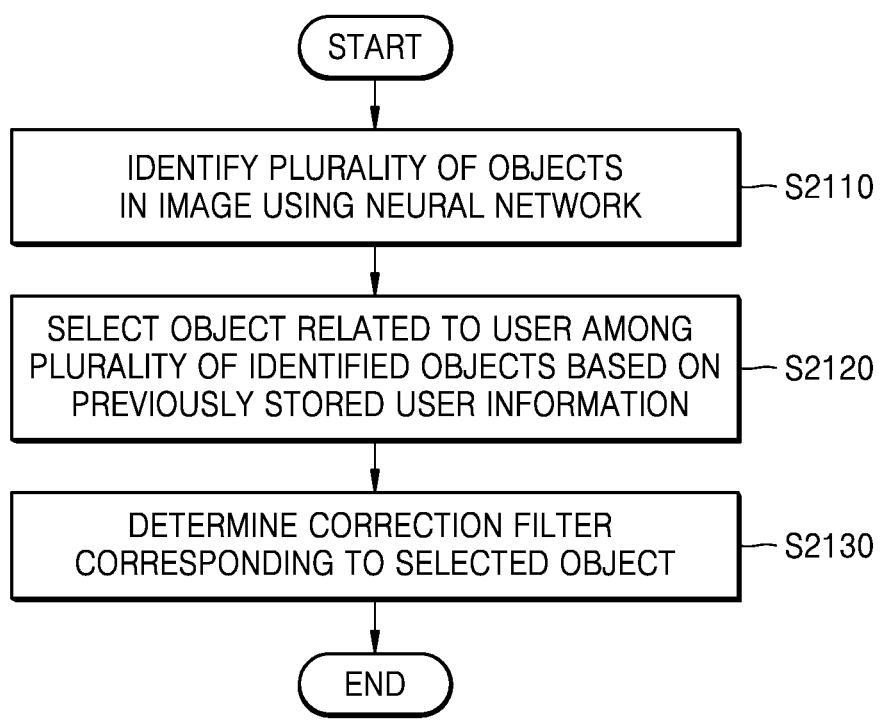
FIG. 21 is a flowchart illustrating a method, performed by a device, of determining a correction filter with respect to an object related to a user among a plurality of objects identified based on user information.

FIG. 21 is a flowchart illustrating a method, performed by the device 10, of determining a correction filter with respect to an object related to a user among a plurality of objects identified based on user information.

In operation S2110, the device 10 may identify the plurality of objects in an image using a neural network.

Meanwhile, operation S2110 may correspond to operation S230 described above with reference to FIG. 2.

In operation S2120, the device 10 may select the object related to the user among the plurality of identified objects based on the previously stored user information.

Here, the user information represents information that may identify the user and the object related to the user. For example, an image of the user, an image of a family or friend of the user, an image of a user's pet, etc. may be included in the user information. The device 10 may also obtain the user information through a memory of the device 10 or through at least one application installed in the device 10. For example, the device 10 may obtain the user information through a photo album application or obtain the user information stored in an external server of an SNS application.

The device 10 may compare the plurality of identified objects with the user information to select the object related to the user among the plurality of identified objects. For example, when a plurality of persons are included in the image, the device 10 may compare the user information with the plurality of persons to select the user and a friend of the user from the plurality of persons.

In operation S2130, the device 10 may determine a correction filter corresponding to the selected object.

On the other hand, the method performed by the device 10 of determining the correction filter corresponding to the selected object may correspond to a method described above with reference to S230 of FIG. 2. The device 10 according to an embodiment may perform correction only on the object related to the user without correcting all the objects included in the image, thereby more efficiently using resources such as a time and memory required for correction.

FIG. 22 is a diagram illustrating information included in an object identification request 2200 transmitted from the first processor 410 to the second processor 440 for identification of an object related to a user in an image, according to an embodiment.

An interface for transmitting/receiving data (e.g., an image before applying a correction filter) between the first processor 410 and the second processor 420 may be defined for the object identification request 2200.

For example, an application program interface (API) function having data to be input to a neural network as a transfer value may be defined. In this case, when the first processor 410 calls the API function and inputs an image before correction and a request purpose as the data transfer value, the API function may transfer the image before correction and the request purpose to the second processor 420 as the data to be input to the neural network.

Referring to FIG. 22, the object identification request 2200 may include an image 2210 and information 2220 about the request purpose. In the embodiment, the object identification request 2200 includes the image 2210. However, this is a merely embodiment, and an identifier for a location of a memory in which the image 2210 is stored may be stored in the object identification request 2200.

Also, the information 2220 about the request purpose may include a type 2222 of the request purpose indicating a request target and information about a response condition 2224. In the embodiment, the type 2222 of the request purpose may be set to object recognition, and the response condition 2224 may be set to recognize the object related to the user and be limited to 10 as the maximum number of recognized objects.

Figure 23:
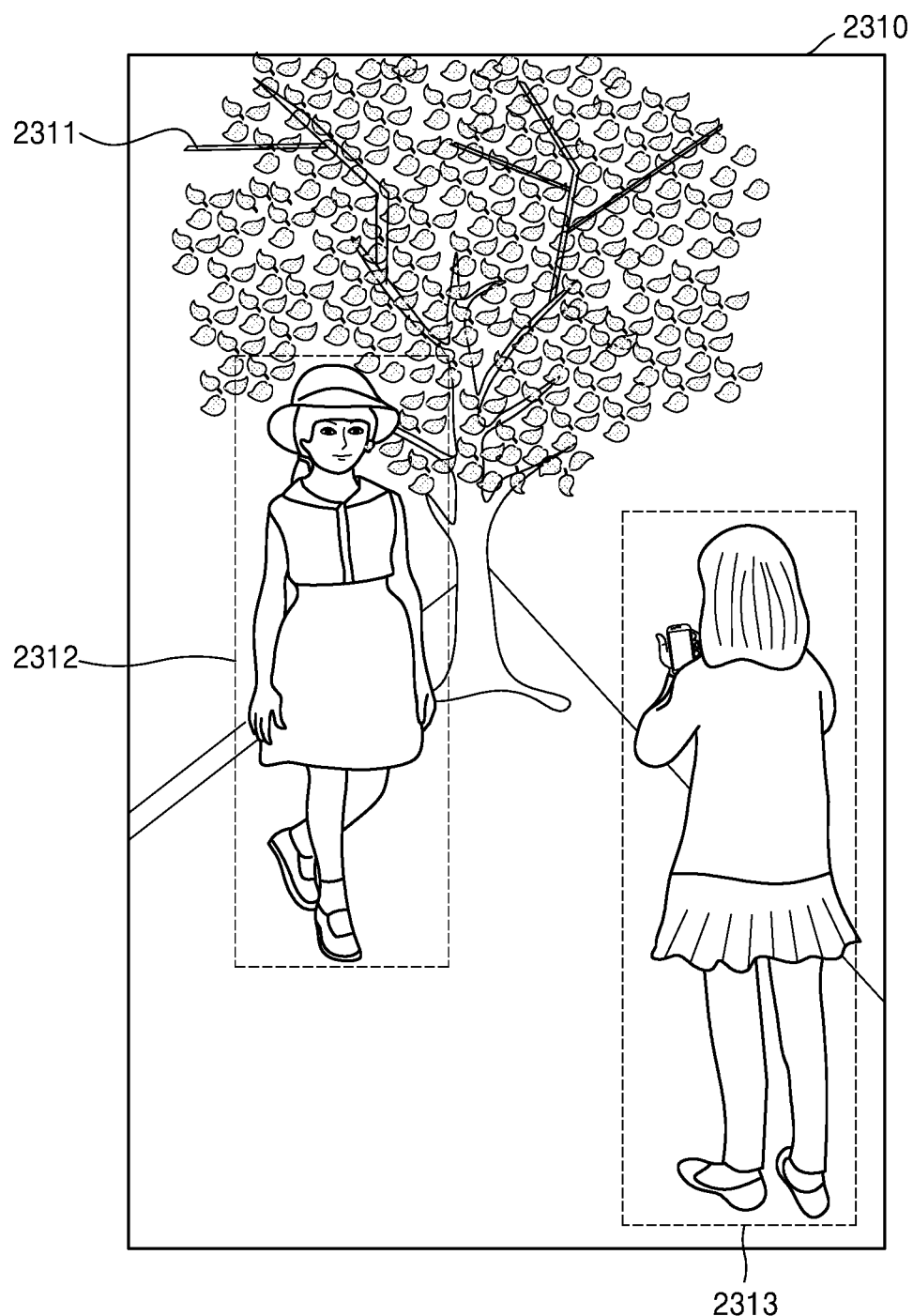
FIG. 23 is a diagram illustrating a method, performed by a device, of determining a correction filter for an object related to a user among a plurality of objects identified based on user information.

FIG. 23 is a diagram illustrating a method, performed by the device 10, of determining a correction filter for an object related to a user among a plurality of objects identified based on user information.

Referring to FIG. 23, the device 10 may identify a plurality of objects 2311, 2312, and 2313 in an image 2310 using a neural network. Specifically, the device 10 may identify the cherry tree 2311, the person 1 2312 and the person 2 2313 included in the image 2310 using the neural network.

The device 10 according to an embodiment may obtain previously stored user information from a server associated with a memory or an application. The device 10 may, for example, obtain a plurality of photos stored in a photo book application.

The device 10 may compare the identified person 1 2312 and person 2 2313 with a plurality of previously obtained photos as the plurality of persons 2312 and 2313 are included in the image 2310. The device 10 may determine that the person 1 2312 is a user of the device 10 and the person 2 2313 is a person who is not related to the user as a result of comparison.

Accordingly, the device 10 may select the cherry tree 2311 and the person 1 2312 from among the plurality of objects 2311, 2312, and 2313. The device 10 may determine a correction filter corresponding to each of the selected cherry tree 2311 and the person 1 2312 and correct the cherry tree 2311 and the person 1 2312 included in the image 2310 using the determined correction filter.

Figure 24:
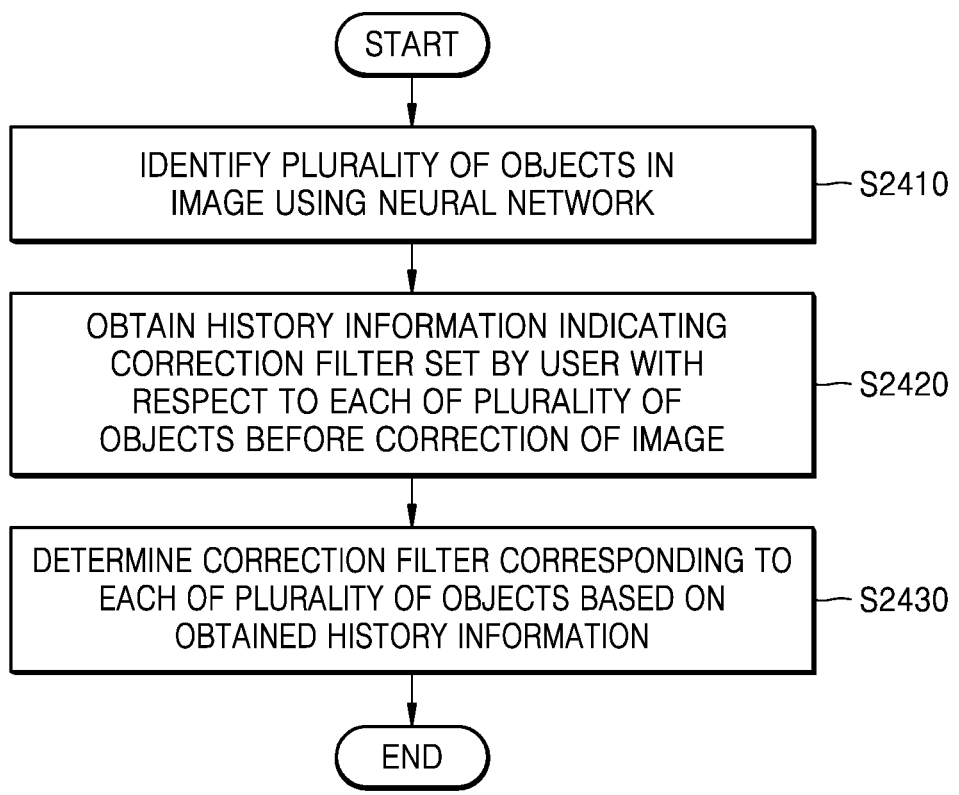
FIG. 24 is a flowchart illustrating a method, performed by a device, of determining a correction filter corresponding to an object based on history information about a correction filter of an object.

FIG. 24 is a flowchart illustrating a method, performed by the device 10, of determining a correction filter corresponding to an object based on history information about a correction filter of an object.

In operation S2410, the device 10 may identify a plurality of objects in an image using a neural network.

On the other hand, operation S2410 may correspond to operation S230 described above with reference to FIG. 2.

In operation S2420, the device 10 may obtain the history information indicating the correction filter set by a user with respect to each of the plurality of objects before a correction of the image.

The device 10 may store information of the correction filter set with respect to each of the plurality of objects identified from at least one image obtained before the correction of the image. For example, the device 10 may store a correction filter corresponding to a first object as a first correction filter when the user selects the first correction filter for the first object.

The device 10 may also store information about the number of times of setting for each type of correction filters when there is a history in which the user has set various types of correction filters with respect to the first object.

In operation S2430, the device 10 may determine the correction filter corresponding to each of the plurality of objects based on the obtained history information.

For example, when the device 10 has selected the correction filter selected by the user with respect to the first object in the history information as the first correction filter, the device 10 may determine the correction filter corresponding to the first object among the plurality of objects as the first correction filter.

Also, when there is a history in which the user has set various types of correction filters with respect to the first object, the device 10 may weight the number of times of settings for each correction filter based on the history to set the correction filter corresponding to the first object.

The device 10 according to an embodiment may set the correction filter with respect to the object by reflecting a user's taste or the like using the history information indicating the correction filter set by the user with respect to the object.

Figure 25:
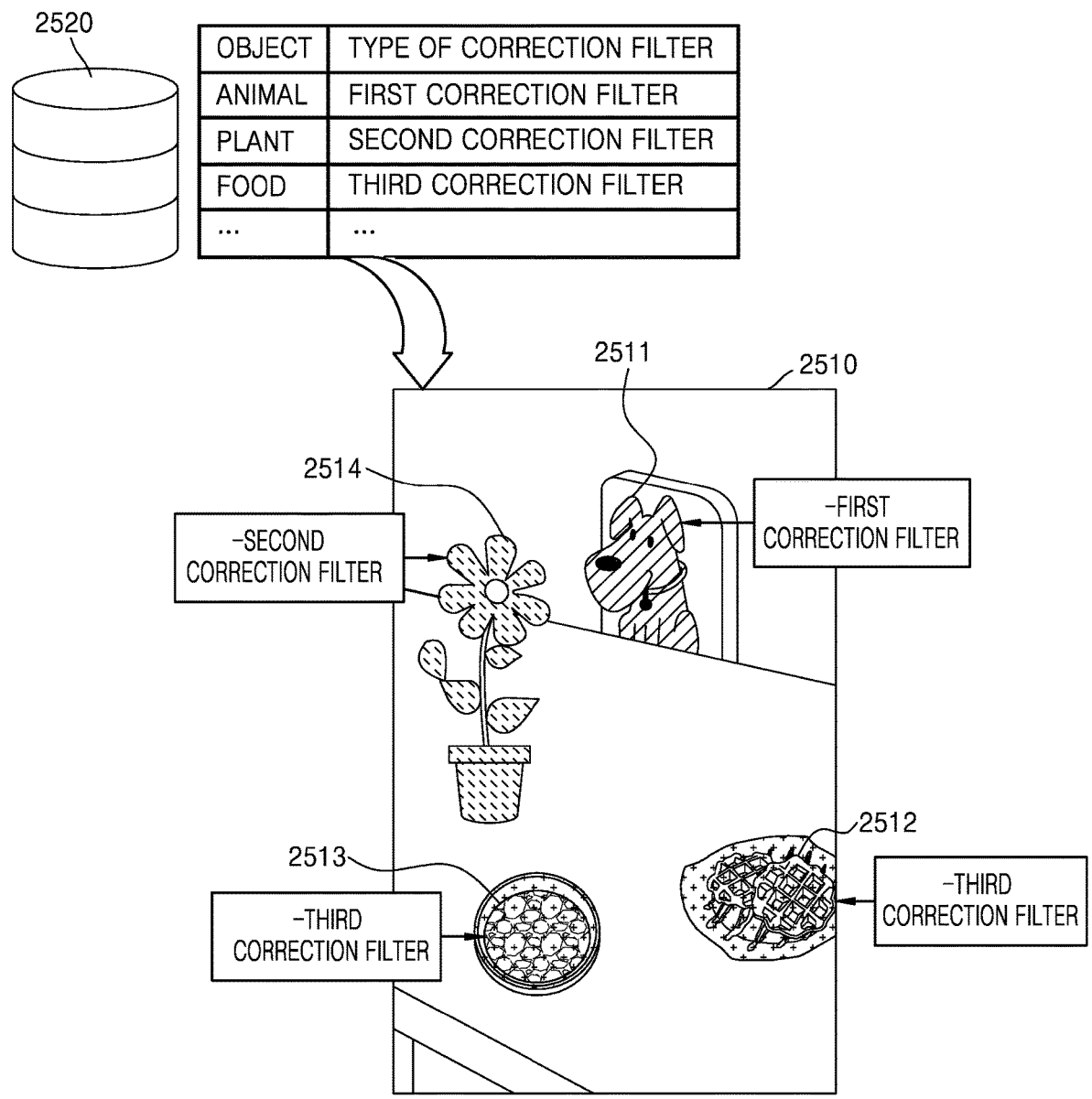
FIG. 25 is a flowchart illustrating a method, performed by a device, of determining a correction filter corresponding to an object based on history information about a correction filter of an object.

FIG. 25 is a flowchart illustrating a method, performed by the device 10, of determining a correction filter corresponding to an object based on history information about a correction filter of an object.

Referring to FIG. 25, the device 10 may obtain history information 2520 in an image 2510 to determine the correction filter corresponding to each of a plurality of identified objects based on a neural network. Here, the history information 2520 may be generated from a correction result of at least one image that has been processed before an image correction. Specifically, the history information 2520 may include information of a correction filter set by a user with respect to each of the plurality of objects included in the at least one image processed before the image correction.

For example, the history information 2520 may include information indicating that a first correction filter, a second correction filter, and a third correction filter are set to animal 2511, plant 2514, and food 2512 and 2513, respectively. Accordingly, the device 10 may determine correction filters of the animal 2511, the food 2512 and 2513, and the plant 2514 included in the image 2510 as the first correction filter, the third correction filter, and a second correction filter.

Figure 26:
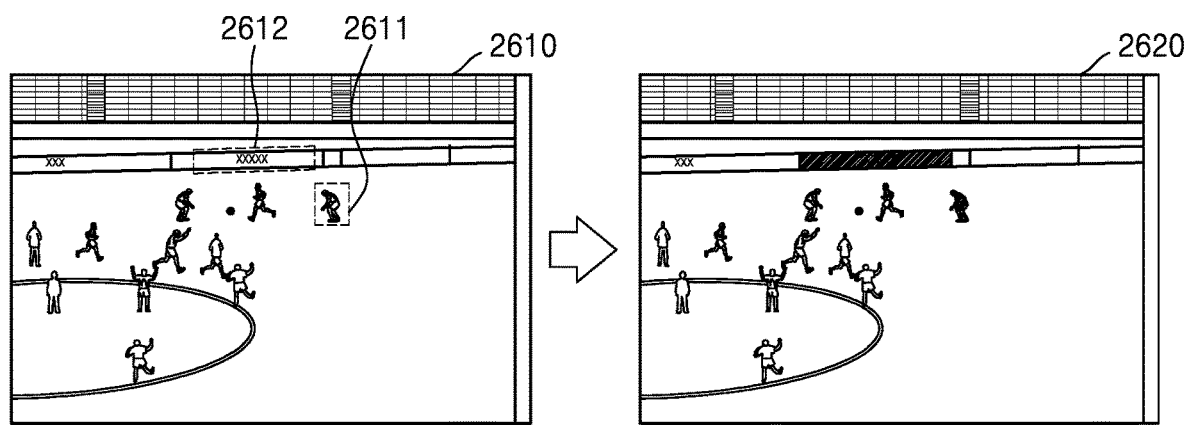
FIG. 26 is a diagram for illustrating a method, performed by a device, of applying a correction filter to each of a plurality of objects included in an image using a subject of content including the image.

FIG. 26 is a diagram for illustrating a method, performed by the device 10, of applying a correction filter to each of a plurality of objects 2611 and 2612 included in an image 2610 using a subject of content including the image 2610.

Referring to FIG. 26, the device 10 may identify the subject of the content in which the image 2610 is included. Here, the content may include moving images, photos, and the like, but a type of the content is not limited to the above-described examples.

The device 10 may use the image 2610 or metadata of the content to identify a title of the content, a channel providing the content, or the like. Also, the device 10 may identify the subject of the content based on at least one of the identified title of the content and channel providing the content. For example, the subject of the content may include sports, food, and beauty, but this is merely an example, and the subject of the content is not limited to the example described above. In an embodiment of FIG. 26, the device 10 may identify the subject of the content as a football game moving image including the image 2610.

Meanwhile, the device 10 may identify the plurality of objects 2611 and 2612 included in the image 2610 using the neural network. For example, the device 10 may verify that the athlete 2611 and the billboard 2612 are included in the image 2610.

The device 10 may determine the correction filter applied to each of the plurality of objects 2611 and 2612 based on the identified subject of the content and plurality of objects 2611 and 2612. For example, the device 10 may select a correction filter A that clarifies an edge of the athlete 2611 as the image 2610 is identified as a scene of the football game moving image. Also, according to another example, the device 10 may select a correction filter B that increases the contrast of the billboard 2612.

The device 10 may generate a corrected image 2620 by correcting the athlete 2611 and the billboard 2612 included in the image 2610 respectively using the selected correction filter A and the selected correction filter B.

Figure 27:
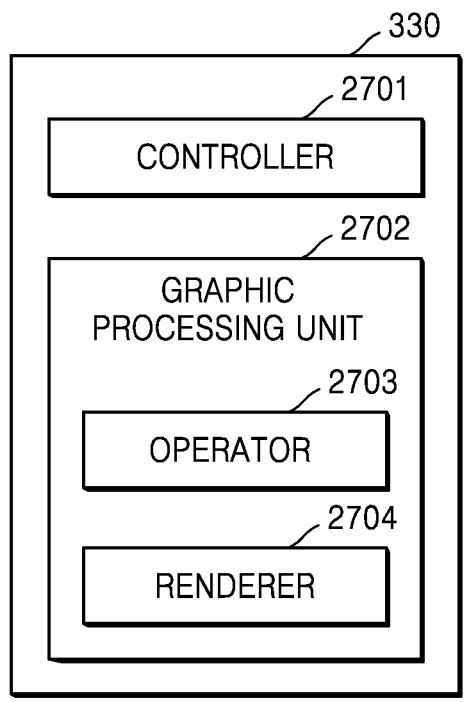
FIG. 27 is a detailed diagram of a processor of FIG. 3, according to an embodiment.

FIG. 27 is a detailed diagram of the processor 330 of FIG. 3 according to an embodiment.

Referring to FIG. 27, the processor 330 of FIG. 3 may include a controller 2701 and a graphic processing unit 2702.

The controller 2701 may perform an operation for controlling the graphic processing unit 2702. The controller 2701 may include one or more cores (not shown) and a connection path (e.g., a bus) for transmitting and receiving signals with the graphics processing unit 2702 and/or other components.

The graphic processing unit 2702 may include an operator 2703 and a renderer 2704. The operator 2703 may include a plurality of processors that perform operations in parallel. According to an embodiment, the operator 2703 may process one or more instructions included in layers in a neural network module in parallel, under the control of the controller 2701. This will be described later in more detail with reference to FIG. 31. Also, the operator 2703 may provide a processing result (i.e., correction filter information corresponding to each of objects in an image) to the controller 2710.

Also, the operator 2703 may correct attribute values such as coordinate values, shapes, sizes, colors, etc. by which the respective objects are to be displayed according to a layout of a screen. The renderer 2704 may output a result corrected by the operator 2703 to a display region of the display 310.

Meanwhile, the processor 330 may further include a random access memory (RAM) (not shown) and a read-only memory (ROM) temporarily and/or permanently storing signals (or data) processed inside the processor 330. The processor 330 may also be implemented as a system-on-chip (SoC) including at least one of the controller 2701, the graphic processing unit 2702, the RAM, and the ROM described above.

Figure 28:
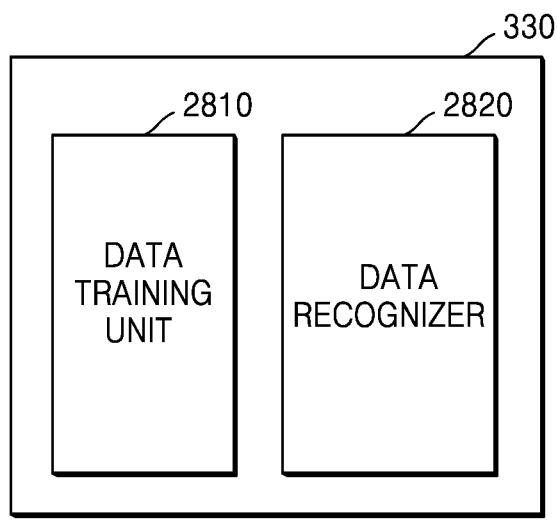
FIG. 28 is a detailed diagram of the processor of FIG. 3, according to another embodiment.

FIG. 28 is a detailed diagram of the processor 330 of FIG. 3 according to another embodiment.

Referring to FIG. 28, the processor 330 according to some embodiments may include a data training unit 2810 and a data recognizer 2820.

The data training unit 2810 may obtain data to be used for training and apply the obtained data to a data recognition model that will be described later, thereby learning a determination criterion for identification of an object or determination of a correction filter regarding the object included in an image.

The data training unit 2810 may learn to have the determination criterion for the data recognition model to identify the object included in the image. For example, the data training unit 2810 may learn an image attribute used to identify the object and a category according to a type of the object.

The data training unit 2810 may also train a display attribute of the object such that the data recognition model has the determination criterion for determining a correction filter suitable for the object.

The data recognizer 2820 may identify the object based on the data or determine the correction filter of the object included in the image. For example, the data recognizer 2820 may use a training result regarding the image attribute to identify the object included in the image.

According to another example, the data recognizer 2820 may use a training result regarding the display attribute of the object to determine the correction filter of the identified object. Further, the data recognizer 2820 may use a result value output by the data recognition model having the obtained data as an input value to update the data recognition model.

At least one of the data training unit 2810 and the data recognizer 2820 may be manufactured in the form of at least one hardware chip and mounted on the device 10. For example, at least one of the data training unit 2810 and the data recognizer 2820 may be manufactured in the form of a dedicated hardware chip for artificial intelligence (AI) or may be manufactured in a part of an existing general-purpose processor (e.g. a CPU or an application processor) or a graphic-only processor (e.g., a GPU) and mounted on the various devices 10 described above.

In this case, the data training unit 2810 and the data recognizer 2820 may be mounted on one device 10, or may be mounted on separate devices. For example, one of the data training unit 2810 and the data recognizer 2820 may be included in the device 10, and the other may be included in a server. The data training unit 2810 and the data recognizer 2820 may provide model information constructed by the data training unit 2810 to the data recognizer 2820 by wired or wirelessly. Data input to the data recognizer 2820 may be provided to the data training unit 2810 as additional training data.

Meanwhile, at least one of the data training unit 2810 and the data recognizer 2820 may be implemented as a software module. When at least one of the data training unit 2810 and the data recognizer 2820 is implemented as a software module (or a program module including an instruction), the software module may be stored in non-transitory computer-readable media. Also, in this case, at least one software module may be provided by an operating system (OS) or by a predetermined application. Alternatively, some of the at least one software module may be provided by an operating system (OS), and the others may be provided by a predetermined application.

Figure 29:
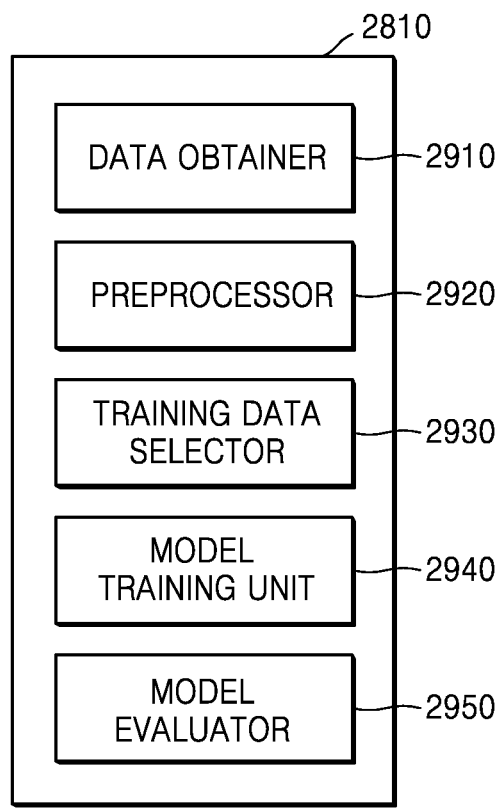
FIG. 29 is a block diagram of a data training unit according to an embodiment.

FIG. 29 is a block diagram of the data training unit 2810 according to an embodiment.

Referring to FIG. 29, the data training unit 2810 according to an embodiment may include a data obtainer 2910, a preprocessor 2920, a training data selector 2930, a model training unit 2940, and a model evaluator 2950. However, this is only an embodiment, and the data training unit 2810 may include some of the above-described components or may further include other components in addition to the above-described components.

The data obtainer 2910 may obtain data necessary for identification of an object or determination of a correction filter. For example, the data obtainer 2910 may obtain data by sensing a peripheral situation of the device 10. According to another example, the data obtainer 2910 may obtain data from an external server such as a social network server, a cloud server, or a content providing server.

The data obtainer 2910 may obtain at least one of an image and a moving image. Here, the moving image may include a plurality of images. For example, the data obtainer 2910 may receive the moving image through a camera of the device 10 including the data training unit 2810 or an external camera (e.g. a CCTV, a black box, or the like) capable of communicating with the device 10 including the data training unit 2810. Here, the camera may include one or more image sensors (e.g., a front sensor or a rear sensor), a lens, an image signal processor (ISP), or a flash (e.g., LED or xenon lamp, etc.)

The preprocessor 2920 may preprocess obtained data such that the obtained data may be used for training for identification of the object or determination of the correction filter. The preprocessor 2920 may process the obtained data to a predetermined format such that the model training unit 2940, which will be described later, may use the data obtained for training for identification of the object or determination of the correction filter.

For example, the preprocessor 2920 may divide an input image into a plurality of images and may detect an R attribute, a G attribute, and a B attribute from each of the divided images. Also, the preprocessor 2920 may determine a representative attribute value with respect to attributes detected for each region of a predetermined size, from each of the divided images. The representative attribute value may include a maximum attribute value, a minimum attribute value, and an average attribute value.

The training data selector 2930 may select data required for training from the preprocessed data. The selected data may be provided to the model training unit 2940. The training data selector 2930 may select data necessary for training from among the preprocessed data according to a predetermined selection criterion for identification of the object or determination of the correction filter. The training data selector 2930 may also select data according to a predetermined selection criterion by training by the model training unit 2940, which will be described later.

For example, the training data selector 2930 may determine, based on the preprocessed data, types of image attributes having a relatively high correlation (for example, a high density of a probability distribution), the number, a level, etc. as data included in a criterion for identifying an object.

The model training unit 2940 may learn to have a determination criterion as to how a data recognition model determines identification of the object or determination of the correction filter based on training data. Also, the model training unit 2940 may learn a selection criterion as to which training data should be used for identification of the object or determination of the correction filter.

For example, the model training unit 2940 may learn to have a first criterion as a determination criterion for identifying objects in a training image. Here, the first criterion may include types, number or levels of image attributes used by the device 10 to identify an object in the training image from the training image, using the neural network.

According to another example, the model training unit 2940 may use a neural network to learn to have a second criterion as a criterion for determining the correction filter corresponding to each of the objects in the training image. Here, the second criterion may include types, number or levels of display attributes of the object, etc., that the device 10 uses to determine the correction filters respectively corresponding to the objects in the training image using the neural network.

Also, the model training unit 2940 may train the data recognition model used for identification of the object or determination of the correction filter using the training data. In this case, the data recognition model may be a previously constructed model. For example, the data recognition model may be a previously constructed model by receiving basic training data (e.g., a sample image, etc.).

The data recognition model may be constructed considering an application field of a recognition model, the purpose of training, or the computer performance of a device. The data recognition model may be, for example, a model based on a neural network. For example, a model such as Deep Neural Network (DNN), Recurrent Neural Network (RNN), or Bidirectional Recurrent Deep Neural Network (BRDNN) may be used as the data recognition model, but is not limited thereto.

According to various embodiments, when a plurality of previously constructed data recognition models are present, the model training unit 2940 may determine a data recognition model having a large relation between input training data and basic training data as a data recognition model to learn. In this case, the basic training data may be previously classified according to a type of data, and the data recognition model may be previously constructed for each type of data. For example, the basic training data may be previously classified by various criteria such as a region where the training data is generated, a time at which the training data is generated, a size of the training data, a genre of the training data, a creator of the training data, a type of an object in the training data, etc.

Also, the model training unit 2940 may train the data recognition model by using, for example, a training algorithm including an error back-propagation method or a gradient descent method.

Also, the model training unit 2940 may train the data recognition model through, for example, supervised learning using, as an input value, training data for training of the determination criterion. Also, the model training unit 2940 train the data recognition model through, for example, unsupervised learning that finds the determination criteria for identification of the object or determination of the correction filter by self-learning using the data necessary for identification of the object or determination of the correction filter without any supervising.

Further, the model training unit 2940 may train the data recognition model through, for example, reinforcement learning using feedback on whether a result of identification of the object or determination of the correction filter is correct based on training.

Further, when the data recognition model is trained, the model training unit 2940 may store the trained data recognition model. In this case, the model training unit 2940 may store the trained data recognition model in a memory of the device 10 including the data training unit 2810. Alternatively, the model training unit 2940 may store the trained data recognition model in a memory of the device 10 including the data recognizer 2820 that will be described later. Alternatively, the model training unit 2940 may store the trained data recognition model in a memory of a server connected to the device 10 over a wired or wireless network.

In this case, the memory in which the trained data recognition model is stored may also store, for example, commands or data associated with at least one other component of the device 10. The memory may also store software and/or program. The program may include, for example, kernel, middleware, an application programming interface (API), and/or an application program (or application), etc.

The model evaluator 2950 may input evaluation data to the data recognition model, and when a recognition result output from the evaluation data does not satisfy a predetermined criterion, the model evaluator 2950 may cause the model training unit 2940 to learn again. In this case, the evaluation data may be predetermined data for evaluating the data recognition model. Here, the evaluation data may include a matching ratio between an object identified based on the data recognition model and an actual object, the image quality of the image after the correction filter is applied, etc.

For example, when the number or the ratio of evaluation data whose recognition result is not correct among recognition results of the trained data recognition model with respect to the evaluation data exceeds a predetermined threshold value, the model evaluator 2950 may evaluate the trained data recognition model not to satisfy the predetermined criterion. For example, in case where the predetermined criterion is defined as a ratio of 2%, when the trained data recognition model outputs an incorrect recognition result with respect to the evaluation data exceeding 20 among a total of 1000 evaluation data, the model evaluator 2950 may evaluate the trained data recognition model not to be suitable.

On the other hand, when a plurality of trained data recognition models are present, the model evaluator 2950 may evaluate whether each of trained moving image recognition models satisfies a predetermined criterion, and may determine a model satisfying the predetermined criterion as a final data recognition model. In this case, when a plurality of models satisfying the predetermined criterion are present, the model evaluator 2950 may determine any one or a predetermined number of models previously set in the order of higher evaluation scores as the final data recognition model.

Meanwhile, at least one of the data obtainer 2910, the preprocessor 2920, the training data selector 2930, the model training unit 2940, and the model evaluator 2950 in the data training unit 2810 may be manufactured in the form of at least one hardware chip and mounted on the device 10. For example, at least one of the data obtainer 2910, the preprocessor 2920, the training data selector 2930, the model training unit 2940, and the model evaluator 2950 may be manufactured in the form of a dedicated hardware chip for artificial intelligence (AI) or may be manufactured in a part of an existing general-purpose processor (e.g. a CPU or an application processor) or a graphic-only processor (e.g., a GPU) and mounted on the various devices 10 described above.

In this case, the data obtainer 2910, the preprocessor 2920, the training data selector 2930, the model training unit 2940, and the model evaluator 2950 may be mounted on one device 10, or may be mounted on the separate devices 10. For example, some of the data obtainer 2910, the preprocessor 2920, the training data selector 2930, the model training unit 2940, and the model evaluator 2950 may be included in the device 10, and the others may be included in a server.

Also, at least one of the data the data obtainer 2910, the preprocessor 2920, the training data selector 2930, the model training unit 2940, and the model evaluator 2950 may be implemented as a software module. When at least one of the data obtainer 2910, the preprocessor 2920, the training data selector 2930, the model training unit 2940, and the model evaluator 2950 is implemented as a software module (or a program module including an instruction), the software module may be a stored in non-transitory computer-readable media. Also, in this case, at least one software module may be provided by an operating system (OS) or by a predetermined application. Alternatively, some of the at least one software module may be provided by an operating system (OS), and the others may be provided by a predetermined application.

Figure 30:
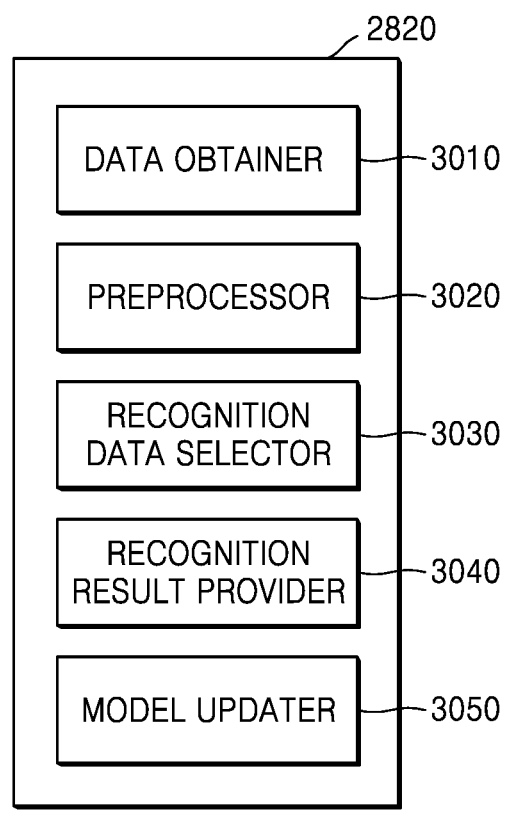
FIG. 30 is a block diagram of a data recognizer according to an embodiment.

FIG. 30 is a block diagram of the data recognizer 2820 according to an embodiment.

Referring to FIG. 30, the data recognizer 2820 according to an embodiment may include a data obtainer 3010, a preprocessor 3020, a recognition data selector 3030, a recognition result provider 3040, and a model updater 3050. However, this is only an embodiment, and the data recognizer 2820 may include some of the above-described components or may further include other components in addition to the above-described components.

The data obtainer 3010 may obtain data necessary for identification of an object or determination of a correction filter. The preprocessor 3020 may preprocess the obtained data such that the obtained data may be used for identification of the object or determination of the correction filter. The preprocessor 3020 may process the obtained data to a predetermined format such that the recognition result provider 3040, which will be described later, may use the obtained data for identification of the object or determination of the correction filter.

The recognition data selector 3030 may select recognition data necessary for identification of the object or determination of the correction filter among the preprocessed data. The selected recognition data may be provided to the recognition result provider 3040. The recognition data selector 3030 may select partly or wholly the preprocessed recognition data according to a predetermined selection criterion for identification of the object or determination of the correction filter.

The recognition result provider 3040 may apply the selected data to a data recognition model to determine a situation. The recognition result provider 3040 may provide a recognition result according to a recognition purpose of data. The recognition result provider 3040 may apply the selected recognition data to the data recognition model by using the recognition data selected by the recognition data selecting unit 3030 as an input value. Also, the recognition result may be determined by the data recognition model.

The recognition result provider 3040 may provide identification information of at least one object included in an image. For example, the recognition result provider 3040 may provide information about a category to which the identified object belongs, a name of the identified object, location information of the object, and the like.

Also, the recognition result provider 3040 may provide correction filter information suitable for the identified object as the object included in the image is identified. For example, the recognition result provider 3040 may provide information indicating that correction filters suitable for an object identified as a dog is a first correction filter, a second correction filter, and a sixth correction filter in the form of text or image, etc. The recognition result provider 3040 may apply the correction filter determined to be suitable for the identified object to a region including the object in the image to provide a corrected image.

The model updater 3050 may control the data recognition model to be updated based on evaluation of the recognition result provided by the recognition result provider 3040. For example, the model updater 3050 may provide the model training unit 2440 with the recognition result provided by the recognition result provider 3040 to control the model training unit 2440 to update the data recognition model.

Meanwhile, at least one of the data obtainer 3010, the preprocessor 3020, the recognition data selector 3030, the recognition result provider 3040, and the model updater 3050 in the data recognizer 2820 may be manufactured in the form of at least one hardware chip and mounted on the device 10. For example, at least one of the data obtainer 3010, the preprocessor 3020, the recognition data selector 3030, the recognition result provider 3040, and the model updater 3050 may be manufactured in the form of a dedicated hardware chip for artificial intelligence (AI) or may be manufactured in a part of an existing general-purpose processor (e.g. a CPU or an application processor) or a graphic-only processor (e.g., a GPU) and mounted on the various devices 10 described above.

In this case, the data obtainer 3010, the preprocessor 3020, the recognition data selector 3030, the recognition result provider 3040, and the model updater 3050 may be mounted on one device 10, or may be mounted on the separate devices 10. For example, some of the data obtainer 3010, the preprocessor 3020, the recognition data selector 3030, the recognition result provider 3040, and the model updater 3050 may be included in the device 10, and the others may be included in a server.

Also, at least one of the data obtainer 3010, the preprocessor 3020, the recognition data selector 3030, the recognition result provider 3040, and the model updater 3050 may be implemented as a software module. When at least one of the data obtainer 3010, the preprocessor 3020, the recognition data selector 3030, the recognition result provider 3040, and the model updater 3050 is implemented as a software module (or a program module including an instruction), the software module may be a stored in non-transitory computer-readable media. Also, in this case, at least one software module may be provided by an operating system (OS) or by a predetermined application. Alternatively, some of the at least one software module may be provided by an operating system (OS), and the others may be provided by a predetermined application.

Figure 31:
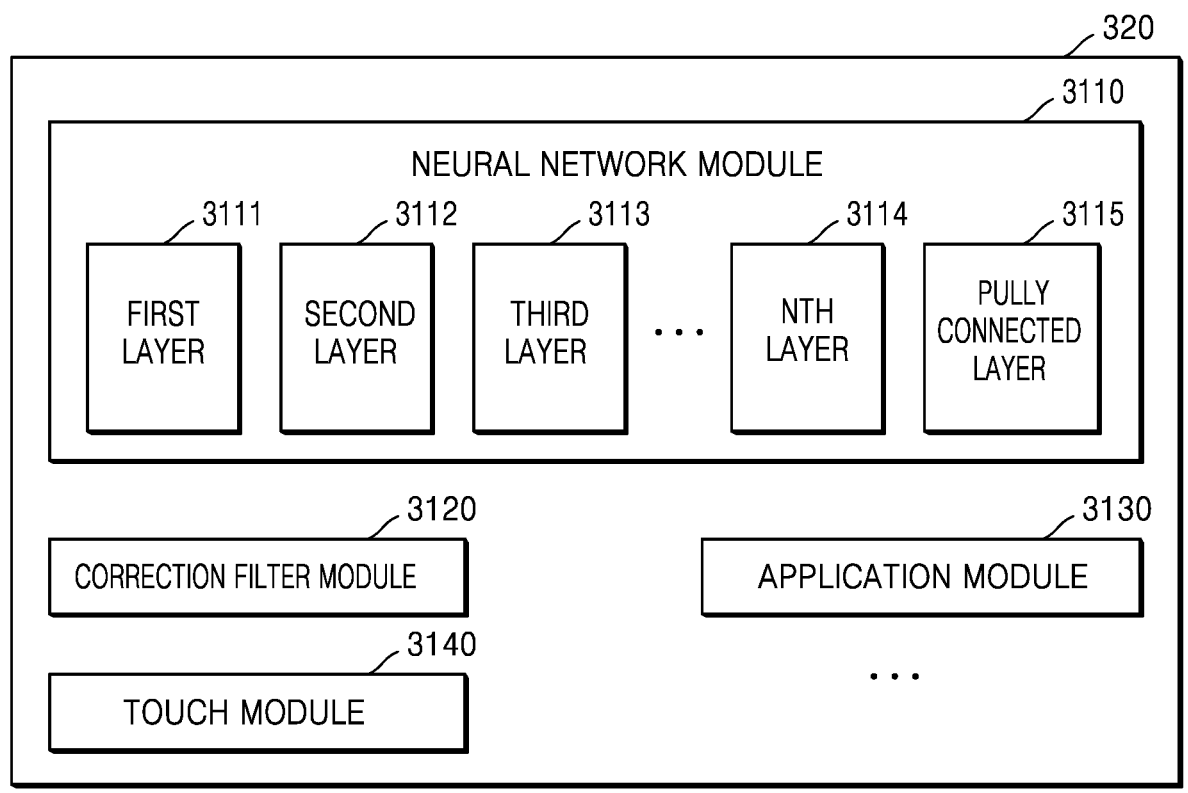
FIG. 31 is a diagram for explaining a software configuration stored in a memory of FIG. 3.

FIG. 31 is a diagram for explaining a software configuration stored in the memory 320 of FIG. 3.

Referring to FIG. 31, the memory 320 may store programs (one or more instructions) for processing and control of the processor 330. The programs stored in the memory 320 may be classified into a plurality of modules according to functions. According to an embodiment, the memory 320 may include a neural network module 3110, a correction filter module 3120, an application module 3130, and a touch module 3140.

The neural network module 3110 may include N layers 3111 through 3114 and a pulley connected layer 3115. Each of the first through Nth layers 3111 through 3114 may include one or more instructions that detect at least one image attribute and/or a display attribute of an object from an image and abstract the detected at least one image attribute and/or display attribute of the object.

For example, each of the first through Nth layers 3111 through 3114 may include a convolutional layer including one or more instructions that detect the image attribute and/or the display attribute of the object from the image, and/or a pooling layer including one or more instructions that extract a representative value from the detected image attribute and/or display attribute of the object.

Also, the pulley connected layer 3115 may one or more instructions that to identify objects in the image and determine a correction filter corresponding to each of the identified objects, by using the image attribute and/or display attributes of the object detected from the N layers 3111 through 3114.

At this time, according to an embodiment, the memory 320 may include a first pulley connected layer that uses image attributes to identify the objects in the image, and a second pulley connected layer that uses the display attributes of the object to determine the correction filter corresponding to each of the objects.

The neural network module 3110 may also store training result data (e.g., a probability distribution (correlation) between image attributes and categories of objects and a probability distribution (correlation) between display attributes of objects and categories of objects).

The correction filter module 3120 may include one or more instructions for correcting the image. The processor 330 may use the one or more instructions stored in the correction filter module 3120 to perform image correction corresponding to each of the objects in the image. Alternatively, the processor 330 may use the one or more instructions stored in the correction filter module 3120 to transfer a signal to correct each of the objects in the image to a correction filter component (not shown).

The application module 3130 may include one or more instructions, images, sound, etc., that the processor 330 uses to execute an application. For example, the application module 3130 may include various program modules such as a photo album application module, a messenger application module, an SNS application module, and the like.

The touch module 3140 may include one or more instructions that sense a touch event of a user input through the display 310 and transmit a signal corresponding to the sensed event to the processor 330. According to an embodiment, the touch module 3140 may be configured as separate hardware including a controller.

Although various program modules are shown in FIG. 31, some of the program modules may be omitted, modified or added depending on a type and characteristics of the device 10. For example, the memory 320 may further include a base module that stores signals transmitted from the respective hardware included in the device 10 to the processor 330 and/or signals transmitted from the processor 330 to the respective hardware, and a network module for supporting a network connection between the device 10 and an external device.

Figure 32:
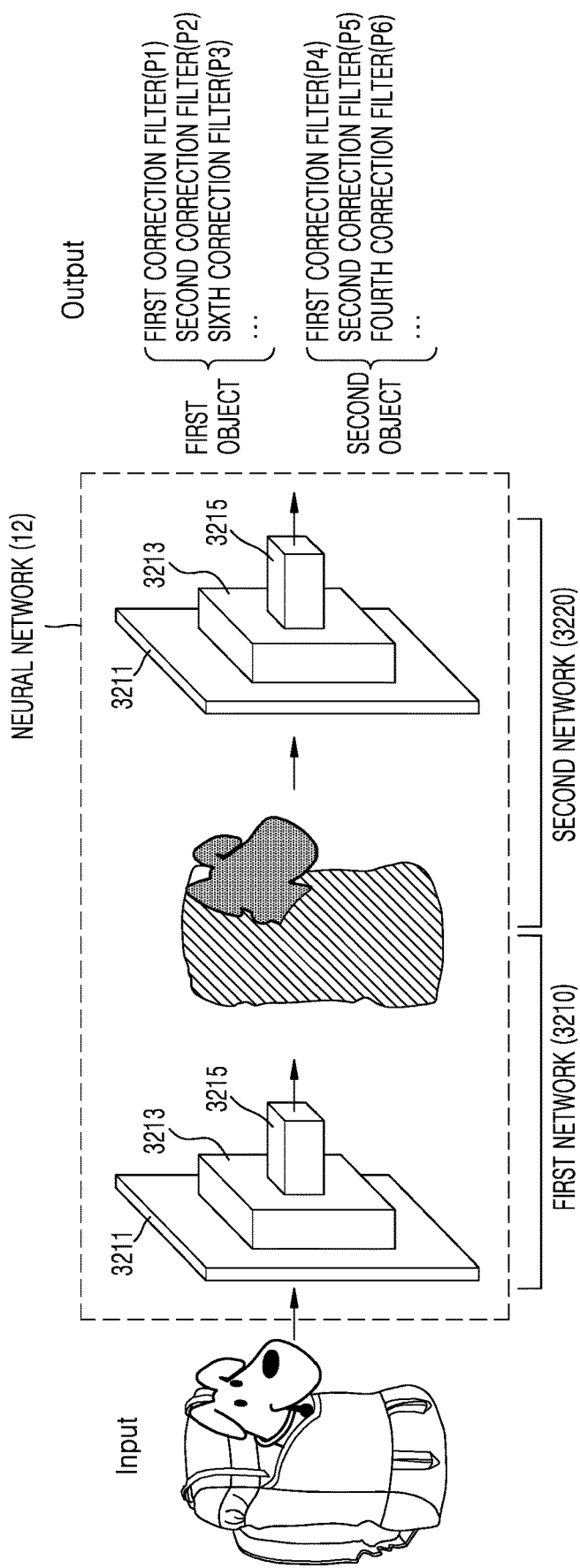
FIG. 32 is an example of a neural network that a device uses to correct an image.

FIG. 32 is an example of the neural network 12 that a device uses to correct an image.

Referring to FIG. 32, the neural network 12 may include a first network 3210 that includes first through third layers 3211, 3213, and 3215 for identifying objects from an image, and a second network 3220 that includes fourth through sixth layers 3221, 3223, and 3225 for determining information related to a correction filter corresponding to each of the identified objects.

According to an embodiment, the device 10 may detect at least one image attribute from the image using the first through third layers 3211, 3213, and 3215. At this time, the image attributes detected in the respective layers may be different from each other, but are not limited thereto.

For example, the device 10 may use the first through third layers 3211, 3213, and 3215 to detect at least one of a color, an edge, a polygon, a saturation, a brightness, a color temperature, blur, sharpness, and contrast from the image. In this case, the device 10 may differentiate a detection level of at least one of the color, edge, polygon, saturation, brightness, color temperature, blur, sharpness, and contrast detected from each layer.

The device 10 may combine (or connect) result images (or result vectors) using the first through third layers 3211, 3213, and 3215 of the first network 3210 to identify the objects in the image using a previously stored training result. Also, the device 10 may verify the identified objects.

According to an embodiment, the device 10 may use the first network 3210 to detect a display attribute of the object corresponding to each of the identified objects. Also, the device 10 may determine, for each of the objects in the image, based on a result of using the second network 3220, determine at least one correction filter according to the display attribute of the object corresponding to each of the identified objects. Also, the device 10 may verify the determined correction filter.

According to an embodiment, the device 10 may select the image attribute or the display attribute of the object detected using the neural network 12 in association with each other. For example, based on the result of using the neural network 12, the device 10 may select an image attribute or a display attribute of the object to be detected in a next layer according to a result image (or a result vector) of a previous layer.

On the other hand, the device 10 may abstract the image using the first to sixth layers 3211 to 3225. For example, the device 10 divides the image into regions of a predetermined size and extract a maximum value (or a minimum value or an average value) of an image attribute (or a display attribute of the object) detected from the divided regions to identify and/or determine objects (or correction filters respectively corresponding to the objects) in the image. This will be described with reference to FIG. 33.

Meanwhile, in FIG. 32, each of the first and second networks 3210 and 3220 include three layers, but is not limited thereto. For example, each network may include three or less or more layers.

Also, in FIG. 32, the device 10 divides the layers included in the first and second networks 3210 and 3220, but is not limited thereto. According to an embodiment, the device 10 may identify the objects in the image from the image using the first layer 3211, the second layer 3213 and the third layer 3215, and determine the correction filter corresponding to each of the identified objects using the fourth layer 3221, the fifth layer 3223 and the sixth layer 3225.

Figure 33:
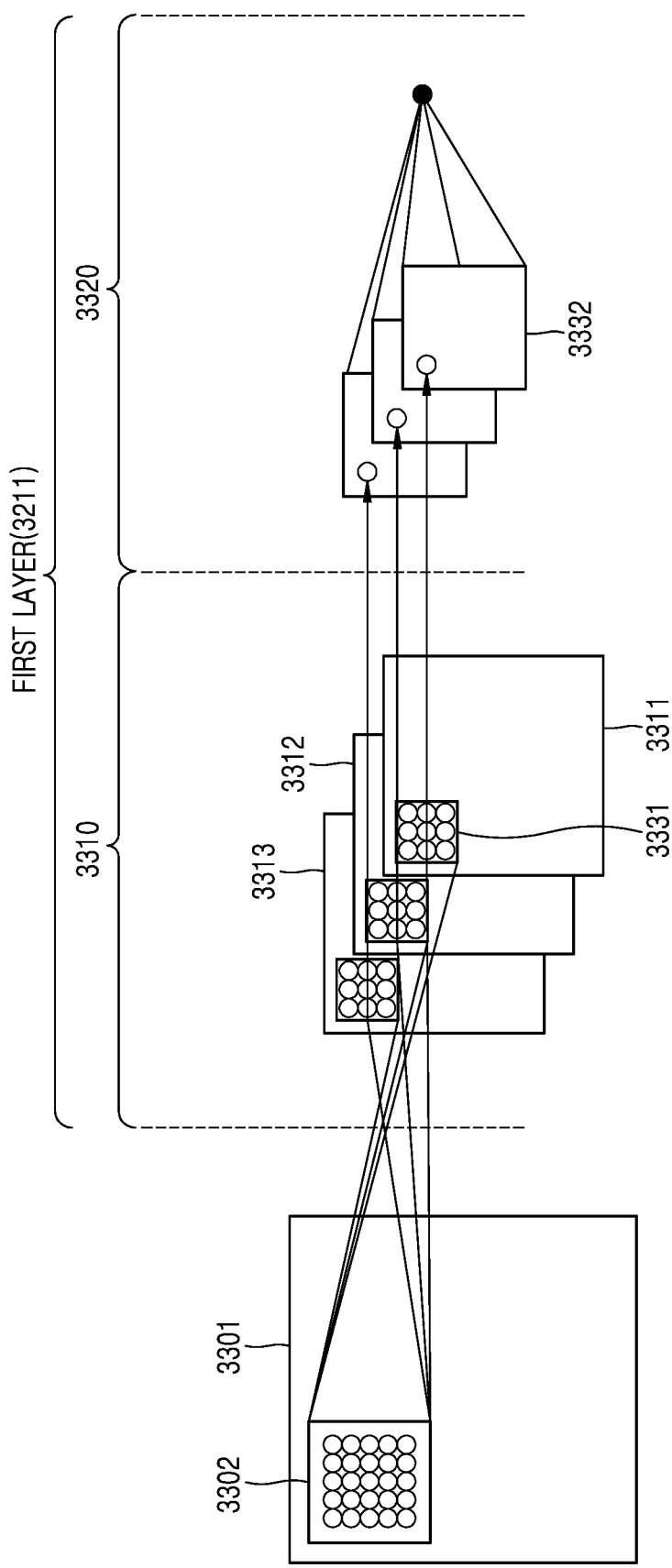
FIG. 33 is a detailed diagram of a first layer of a first network of FIG. 32.

FIG. 33 is a detailed diagram of the first layer 3211 of the first network 3210 of FIG. 32.

Referring to FIG. 33, the first layer 3211 includes a convolutional layer 3310 and a pooling layer 3320 according to a deep convolutional neural network method.

According to an embodiment, the convolutional layer 3310 may be used by the device 10 to detect at least one predetermined image attribute from at least a partial region 3302 of an input image 3301, using the first layer 3211. At this time, the convolutional layer 3310 may be configured to divide the input image 3301 into a plurality of images. For example, the device 10 may divide the input image 3301 into three images 3311, 3312, and 3313 using the convolutional layer 3310 and detect an R attribute, a G attribute, and a B attribute from the images 3311, 3312, and 3313 respectively.

According to an embodiment, the device 10 may use the convolutional layer 3310 to give a weighted value to the attribute detected from the image. The device 10 may also perform non-linear transform according to a sigmoid algorithm on the attribute detected from the image using the convolutional layer 3310.

According to an embodiment, the pooling layer 3320 may be used by the device 10 to determine a representative attribute value indicating a predetermined L×L size region 3331 (e.g., a 5×5 pixel size, etc.) among detected image attributes while moving the L×L size region 3331 in each of the images 3311, 3312, and 3313. For example, the pooling layer 3320 may be configured to extract a maximum attribute value or a minimum attribute value or an average attribute value in the L×L size region 3331. This may allow the device 10 to abstract the image while reducing a size of an image 3332 that is input to the next layer (e.g., the second layer 3213).

Meanwhile, in FIG. 33, an example of the first layer 3211 of FIG. 32 is described, but the example of FIG. 33 may be applied to other layers constituting the neural network 12.

Also, according to an embodiment, the second layer 3213 or the fifth layer 3223 constituting the neural network 12 may not include a pooling layer. In this case, the device 10 may transmit a resultant image of a convolutional layer included in the second layer 3213 and the fifth layer 3223 to a next layer.

Figure 34:
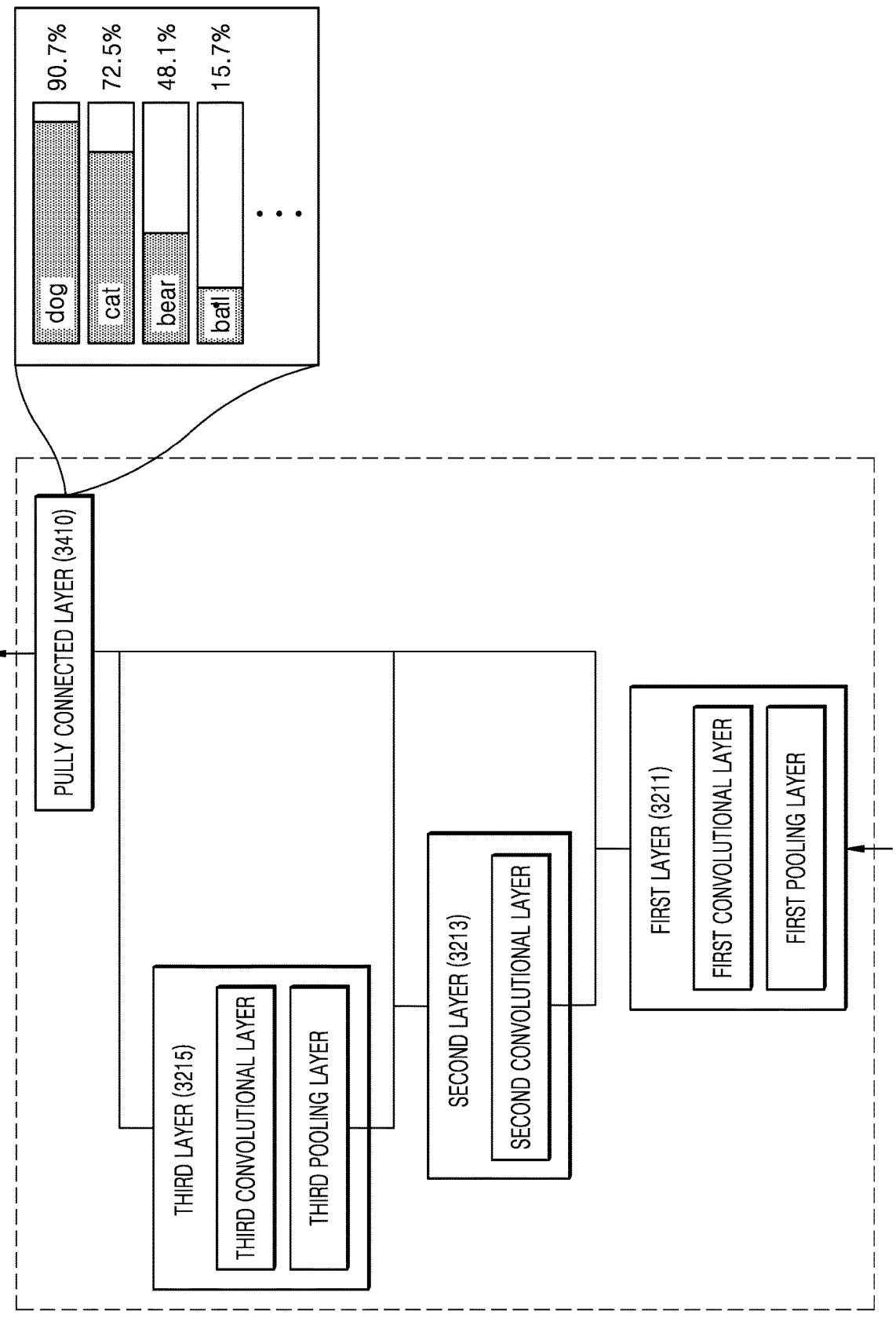
FIG. 34 is a detailed diagram of a first network of FIG. 32.

FIG. 34 is a detailed diagram of the first network 3210 of FIG. 32.

Referring to FIG. 34, the first network 3210 of FIG. 32 may further include a full connection layer 3410 that identifies and/or determines an object in an image based on attributes detected from the image. The full connection layer 3410 may correspond to the pulley connected layer 3115 of FIG. 31.

According to an embodiment, the device 10 may use the full connection layer 3410 to connect (or combine) image attributes detected using the first to third layers 3211, 3213 and 3215 in the first network 3210. Also, the device 10 may use the full connection layer 3410 to determine a category of an object probabilistically similar to the connected image attributes.

For example, the device 10 may use the full connection layer 3410 to obtain a result value that an object in an input image of FIG. 3 is most probabilistically similar to a 'dog' and a location of the object in the image.

Meanwhile, the examples described in FIGS. 33 and 34 may also be applied to the second network 3220. Accordingly, the second network 3220 may further include a full connection layer, and may be connected to the fourth to sixth layers 3221, 3223, and 3225 included in the second network 3220.

Alternatively, the neural network 12 may include one full connection layer. In this case, the full connection layer may be connected to the first to sixth layers 3211 to 3225 of the first and second networks 3210 and 3220. The device 10 may dynamically adjust connection between the full connection layer and the first through sixth layers 3211 through 3225 to identify objects in the image from the input image and determine a correction filter corresponding to the identified objects.

Figure 35:
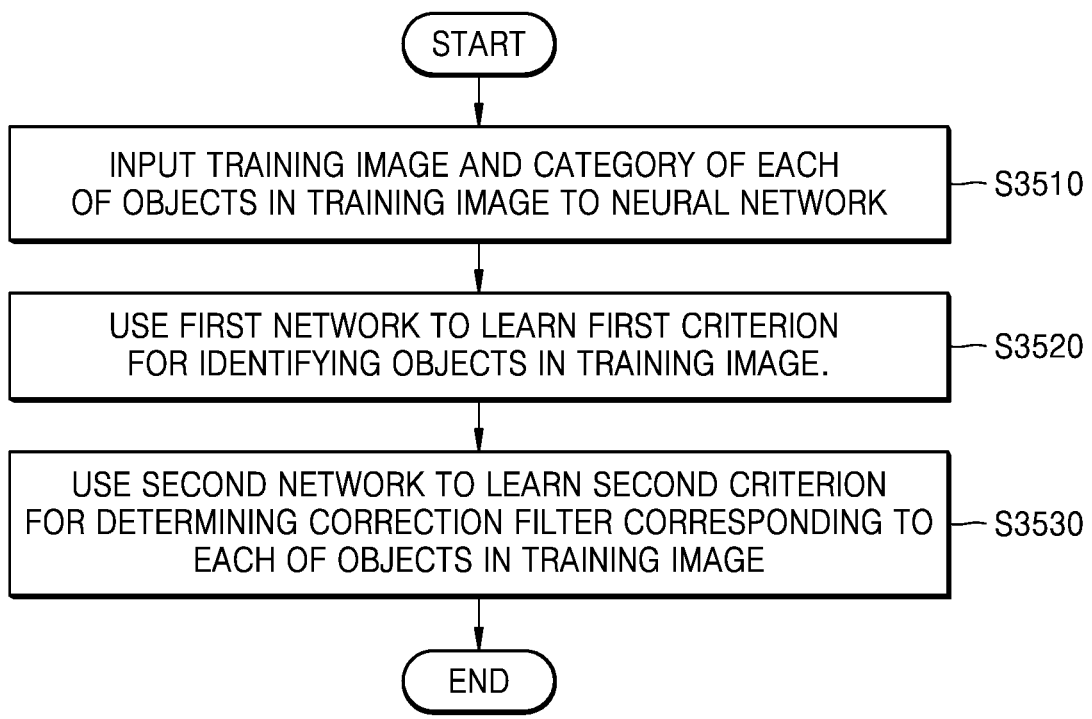
FIG. 35 is a flowchart illustrating a method, performed by a device, of learning criteria for identifying an object and determining a correction filter by using a first network and a second network.

FIG. 35 is a flowchart illustrating a method, performed by the device 10, of learning criteria for identifying an object and determining a correction filter by using a first network and a second network.

Referring to FIG. 35, in operation S3510, the device 10 may input a training image and a category of each of objects in the training image to the neural network 12. The device 10 may input the training image and the category of each of the objects in the training image to the neural network 12 based on a supervising learning method.

For example, the device 10 may input a label indicating a category of a first object in the training image to the neural network 12 along with the training image. Further, the device 10 may further input a location of the first object in the training image to the neural network 12.

On the other hand, according to an embodiment, the device 10 may input a training image generated by a user of the device 10 to the neural network 12. The training image generated by the user may include a captured image, a corrected image, or an image received from an external server, etc., in response to a user input by the device 10. The device 10 may train the neural network 12 more appropriately to the user by inputting the training image generated by the user to the neural network 12.

However, this is merely an embodiment. According to another example, the device 10 may train the neural network 12 by repeatedly performing an operation of analyzing and/or evaluating not only supervised learning but also unsupervised leaning (or autonomous learning or active learning) on an image attribute for each object in the neural network 12.

In operation S3520, the device 10 may use the first network in the neural network 12 to learn to have a first criterion as a determination criterion for identifying objects in the training image. Here, the first criterion may include a type, number or a level, etc. of image attributes used by the device 10 to identify the object in the training image from the training image, using the neural network 12.

The device 10 may learn to have the first criterion by analyzing correlation between the image attributes detected from the training image and the objects in the learning image.

For example, the device 10 may use the first network to analyze correlation between the first object and image attributes detected from X training images including the first object. The device 10 may use the first network to analyze correlation between the image attributes and the first object using a probability distribution between each of the image attributes detected from the X training images and a category corresponding to the first object.

The device 10 may determine, as the first criterion, the type, the number or the level, etc. of image attributes with a relatively high correlation (i.e., a high density of the probability distribution) with respect to the category corresponding to the first object.

Also, the device 10 may remove, from the first criterion, the type, the number or the level, etc. of image attributes with a relatively low correlation (i.e., a low density of the probability distribution) with respect to the category corresponding to the first object.

Specifically, the device 10 may use the first network to determine the first object included in the X training images and a brightness, an edge, a color, a sharpness, and the like among the image attributes extracted from the X training images and derive a brightness value, a shape of the edge, a set value of the color, a sharpness value, and the like to obtain a probability distribution of a face category to which the first object belongs and the derived image attributes. Accordingly, the device 10 may determine a brightness value, a shape of an edge, a set value of a color, a sharpness value, etc., with a relatively high correlation to an image including the face category.

The device 10 may use the first network to remove a type of an image attribute with a relatively low correlation to the image including the face category. Also, the device 10 may use the first network to determine a shape of an edge, a set value of a color, etc. with the relatively low correlation to the image including the face category.

The device 10 may sequentially apply a hierarchical network in the neural network 12 to remove criterions with a low correlation to the image, thereby reducing an amount of computation required to identify objects in the image.

In operation S3530, the device 10 may use the second network in the neural network 12 to learn to have a second criterion as a determination criterion for determining the correction filter corresponding to each of the objects in the training image. Here, the second criterion may include a type, number or a level, etc. of display attributes used by the device 10 to determine the correction filter corresponding to each of the objects in the training image, using the neural network 12.

The device 10 may learn to have the second criterion by analyzing correlation between the display attributes of the object detected from an image region corresponding to the objects included in the training image and the objects.

For example, the device 10 may use the second network to a probability distribution between the first object and display attributes detected from a partial region of the training image corresponding to the first object. The device 10 may use the obtained to probability distribution to analyze correlation between the display attributes of the object and the category corresponding to the first object.

The device 10 may determine, as the second criterion, the type, the number or the level, etc. of display attributes with a relatively high correlation (i.e., a high density of the probability distribution) with respect to the category corresponding to the first object.

Also, the device 10 may remove, from the second criterion, the type, the number or the level, etc. of display attributes with a relatively low correlation (i.e., a low density of the probability distribution) with respect to the category corresponding to the first object.

Specifically, when the category corresponding to the first object corresponds to a face, the device 10 may derive set values such as a brightness, an edge, a color, a sharpness, and the like among the display attributes of the object. The device 10 may use the second network to obtain a probability distribution between the face category and the set values such as a brightness value, a shape of the edge, a set value of the color, a sharpness value, and the like. Accordingly, the device 10 may determine the correction filter having a brightness value, a shape of an edge, a set value of a color, a sharpness value, etc., with a relatively high correlation to the face category.

Also, the device 10 may use the second network to remove a type of a display attribute of the object with a relatively low correlation to the face category. The device 10 may also use the second network to determine a correction filter having a brightness value, a shape of an edge, a set value of a color, a sharpness value, etc. with a relatively low correlation to the face category.

Figure 36:
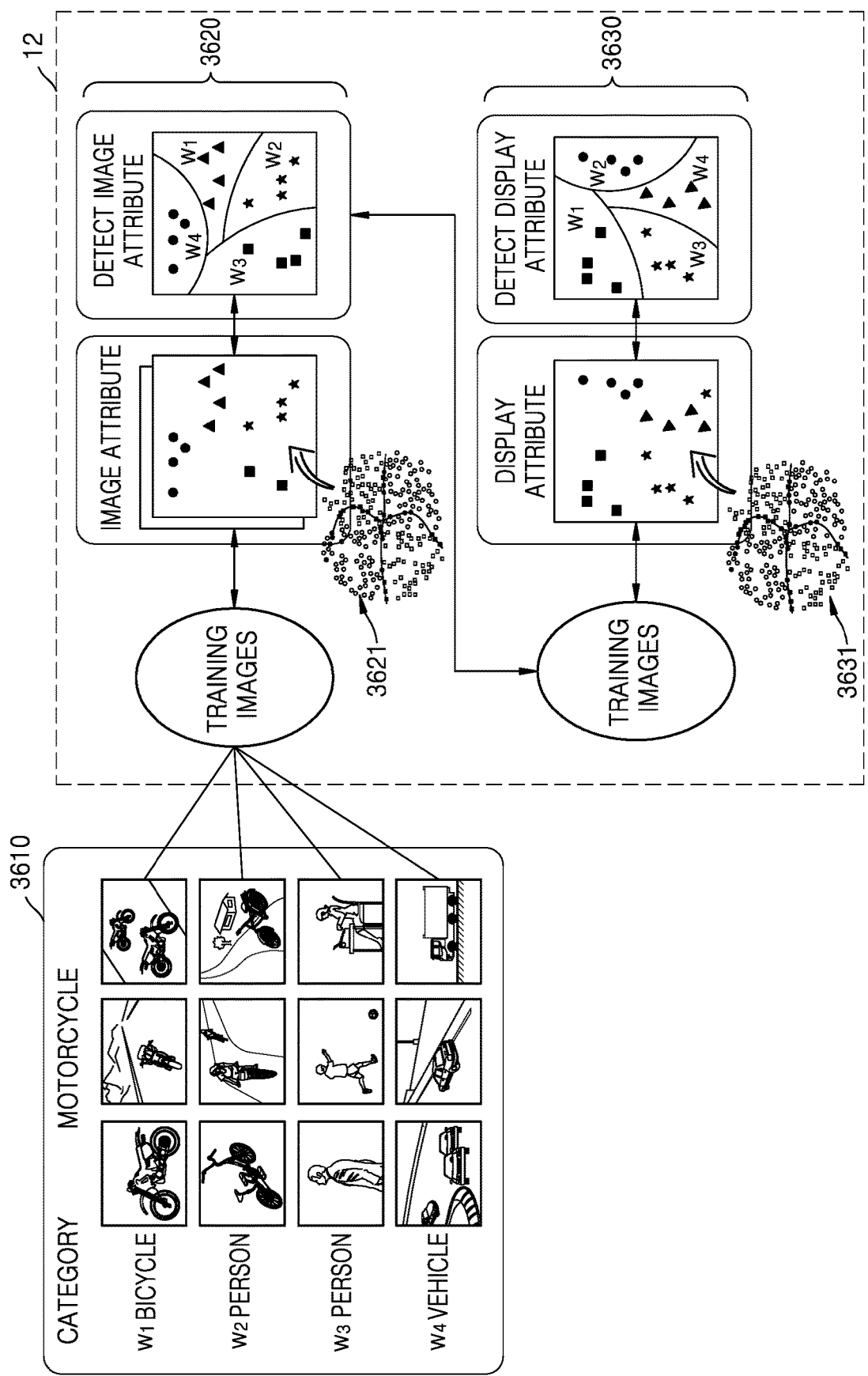
FIG. 36 is an example in which a device learns a neural network.

FIG. 36 is an example in which the device 10 learns the neural network 12.

Referring to FIG. 36, the device 10 may input training images 3610 in which categories of objects are determined to the neural network 12.

The device 10 according to an embodiment may use a first network 3620 of the neural network 12 to detect image attributes from the training images 3610 and obtain a probability distribution 3621 between the detected image attributes and the categories of the objects included in the training images 3610.

According to an embodiment, the device 10 may normalize (or abstract) the obtained probability distribution 3621 using the first network 3620.

The device 10 may learn to have a first criterion 3662 by analyzing correlation between image attributes of the training images 3610 and the categories of the objects included in the training images 3610 using the first network 3620.

According to an embodiment, the device 10 may use a second network 3630 of the neural network 12 to detect display attributes of the object from a partial region of the training images 3610 corresponding to the objects. Also, the device 10 may obtain a probability distribution 3631 between the detected display attributes of the object and the categories of the objects included in the training images 3610.

According to an embodiment, the device 10 may normalize (or abstract) the obtained probability distribution 3631 using the second network 3630.

The device 10 may learn to have a second criterion 3632 by analyzing correlation between the display attributes of the object corresponding to the objects included in the training images 3610 and the categories of the objects included in the training images 3610 using the second network 3630.

Figure 37:
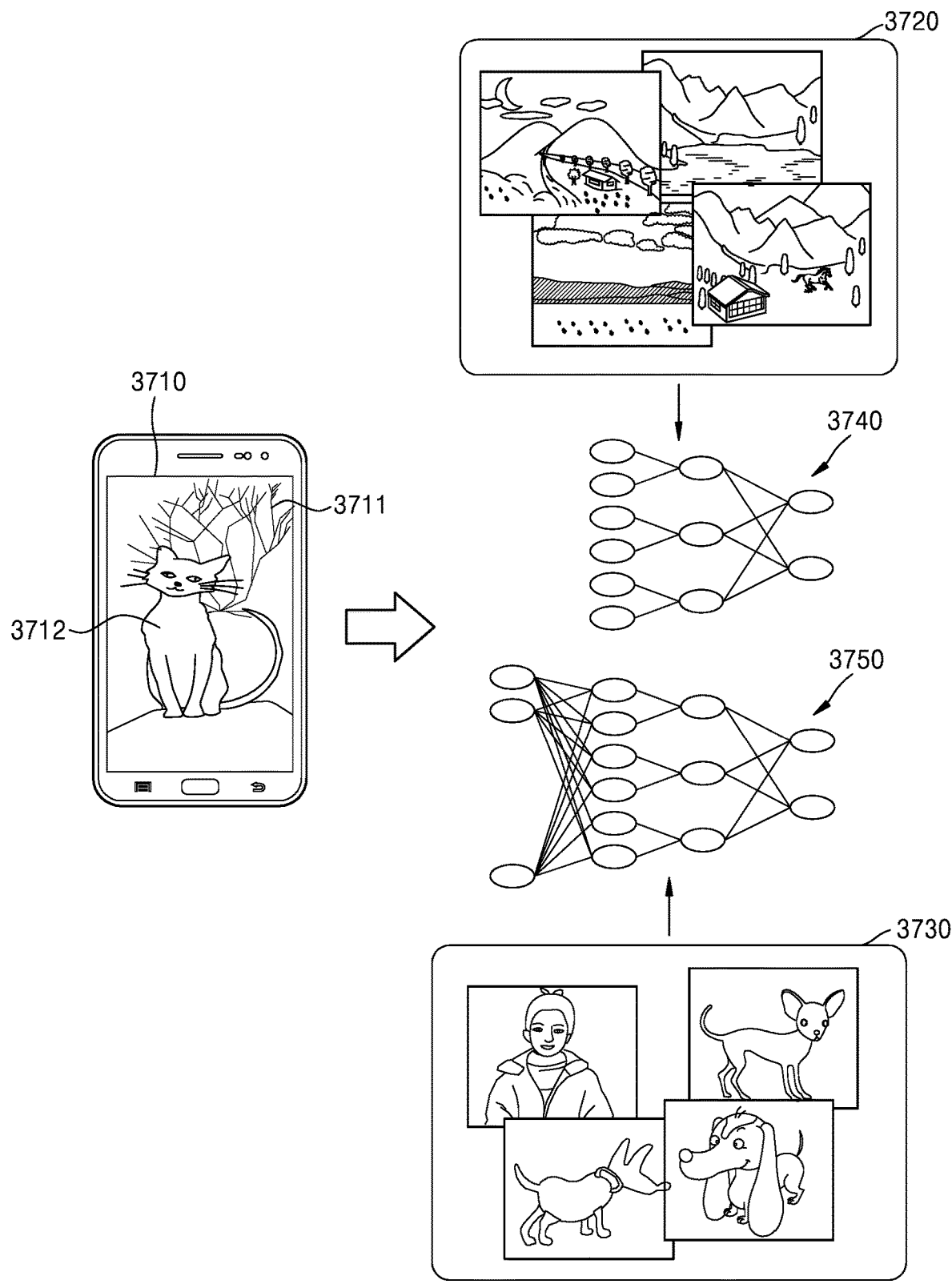
FIG. 37 is a diagram for explaining a method, performed by a device, of selecting an image attribute to identify a plurality of objects included in an image.

FIG. 37 is a diagram for explaining a method, performed by the device 10, of selecting an image attribute to identify a plurality of objects 3711 and 3712 included in an image 3710.

Referring to FIG. 37, the device 10 may train neural networks 3740 and 1550 using different data sets 3720 and 3730 according to types of the plurality of objects 3711 and 3712 to be identified in the image 3710. The device 10 may also differently train the first neural network 3740 for identifying an object 3711 corresponding to a background among the plurality of objects 3711 and 3712 and a second neural network 3750 for identifying an object 3712 other than the background.

Specifically, the device 10 may train the first neural network 3740 including at least one layer using the data set 3720 relating to the background such as mountain, sea, river, lake, and the like. Here, each of the plurality of layers included in the first neural network 3740 may be trained to detect an image attribute suitable for identifying the background.

Also, the device 10 may train the second neural network 3750 including at least one layer using the data set 3730 relating to an object such as dogs, cats, people, etc. other than the background. Here, each of the plurality of layers included in the second neural network 3750 may be trained to detect an image attribute suitable for identifying the object other than the background.

However, this is merely an embodiment, and a neural network for identifying an object corresponding to a background and an object other than the background among a plurality of objects may be trained as one neural network.

The device 10 may identify the plurality of objects 3711 and 3712 as forest and cat respectively as a result of identifying the plurality of objects 3711 and 3712 included in the image 3710 using the first neural network 3740 and the second neural network 3750, respectively.

Figure 38:
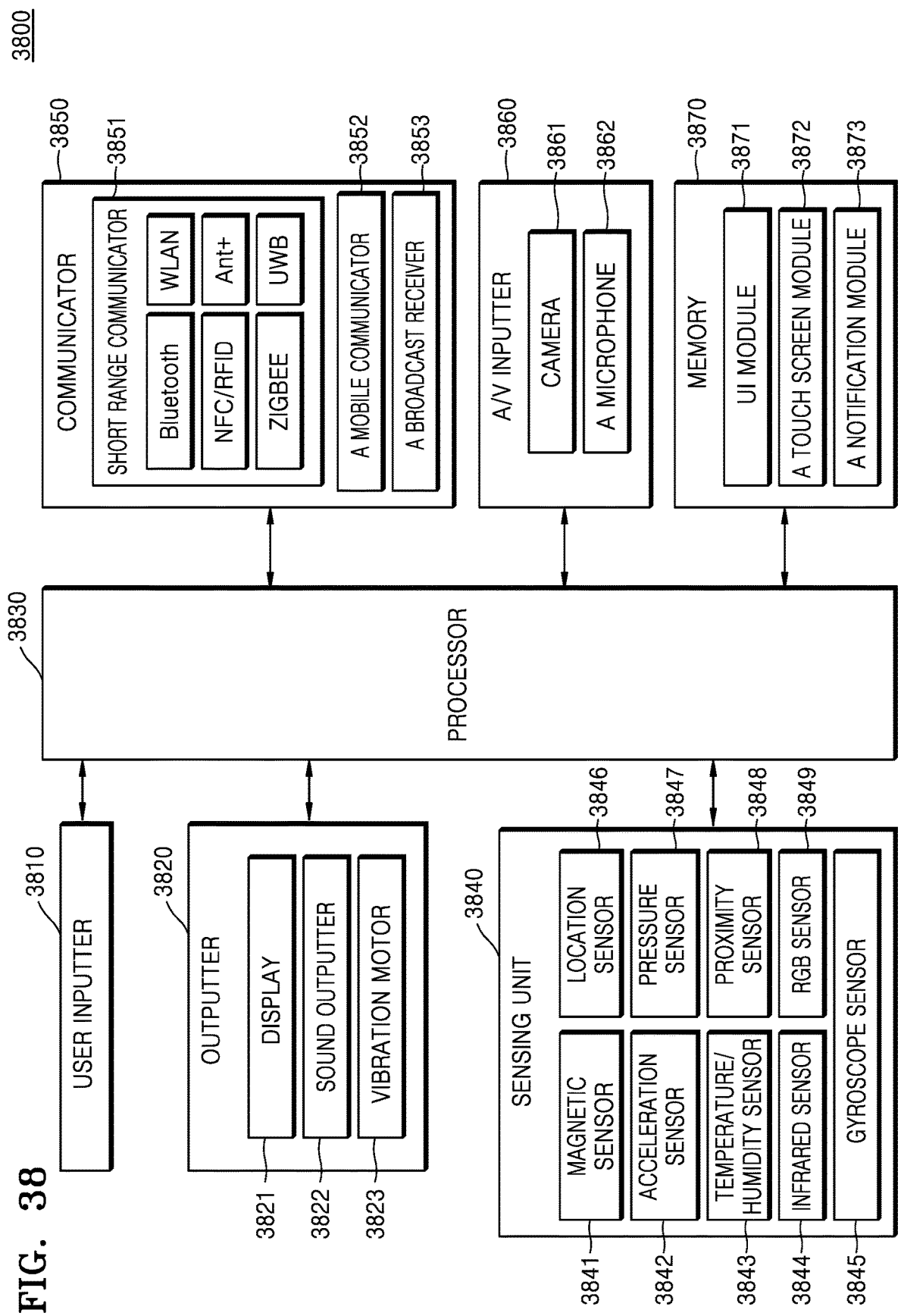
FIG. 38 is a detailed diagram showing a configuration of a device according to an embodiment.

FIG. 38 is a detailed diagram showing a configuration of a device 3800 according to an embodiment.

Referring to FIG. 38, the device 3800 according to an embodiment may include a user inputter 3810, a sensing unit 3840, a communicator 3850, and an A/V inputter 3860, in addition to an outputter 3820, a memory 3870, and a processor 3830 corresponding to the display 310, the memory 320 and the processor 330 of FIG. 3 respectively.

The user inputter 3810 means a means for a user to input data for controlling the device 3800. For example, the user inputter 3810 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but is not limited thereto.

According to an embodiment, the user inputter 3810 may receive a user input to touch one of objects in an image displayed on a screen using the touch pad.

The outputter 3820 may output an audio signal, a video signal, or a vibration signal, and may include a display 3821, a sound outputter 3822, and a vibration motor 3823.

The display 3821 may display and output information processed in the device 3800. When the display 3821 and the touch pad are configured as a touch screen in a layer structure, the display 3821 may be used as an input device in addition to as an output device. The display 3821 may include at least one of a liquid crystal display, a thin film transistor-liquid crystal display, an organic light-emitting diode display, a flexible display, a three-dimensional (3D) display, an electrophoretic display, and a transparent display.

The sound outputter 3822 may output audio data received from the communicator 3850 or stored in the memory 3870. The vibration motor 3823 may output a vibration signal.

The processor 3830 typically controls the overall operation of the device 3800 and the signal flow between the internal components of the device 3800 and performs a function of processing the data. For example, the processor 3830 may generally control the user inputter 3810, the outputter 3820, the sensing unit 3840, a communicator 3850, the A/V inputter 3860, etc., by executing programs (one or more instructions) stored in the memory 3870.

According to an embodiment, to perform the above described function of the device 3800, the processor 3830 may use a neural network to identify objects in an image from the image and determine correction filters respectively corresponding to the identified objects, thereby controlling the components of the device 10 to correct each of the objects in the image. The processor 3830 corresponds to the processor 330 of FIG. 3, and thus a detailed description thereof is omitted.

The sensing unit 3840 may sense a state of the device 3800 or a state around the device 3800 and may transmit sensed information to the controller 1300. The sensing unit 3840 may include at least one among a geomagnetic sensor 3841, an acceleration sensor 3842, a temperature/humidity sensor 3843, an infrared sensor 3844, a gyroscope sensor 3845, a location sensor (e.g. a GPS) 3846, a pressure sensor 3847, a proximity sensor 3848, and an RGB (illuminance) sensor 3849, but is not limited thereto. Functions of respective sensors may be intuitively inferred by one of ordinary skill in the art and thus, detailed descriptions thereof will be omitted.

The communicator 3850 may include one or more components for communicating with an external server (e.g., an SNS server, a cloud server, a content providing server, etc.) and other external devices. For example, the communicator 3850 may include a short range wireless communicator 3851, a mobile communicator 3852, and a broadcast receiver 3853.

The short range wireless communicator 3851 includes a Bluetooth communicator, a Bluetooth low energy (BLE) communicator, a near field communicator, a WLAN (WiFi) communicator, a Zigbee communicator, an infrared data association (IrDA) communicator, a WFD (Wi-Fi Direct) communicator, an UWB (ultra wideband) communicator, an Ant+communicator, and the like, but is not limited thereto.

The mobile communicator 3852 may transceive wireless signals to and from at least one of a base station, an external terminal, and a server on a mobile communication network. The wireless signals herein may include various types of data per transceiving audio call signals, video communication call signals or text/multimedia messages.

The broadcast receiver 3853 may receive broadcasting signals and/or information related to broadcasting from the outside via broadcasting channels. Depending on a type of implementation, the device 3800 may not include the broadcast receiver 3853.

The A/V inputter 3860 is to input audio signals or video signals, and may include a camera 3861, a microphone 3862, etc.

The camera 3861 may capture an image in a camera recognition range. The image captured by the camera 3861 may be image processed by the processor 3830 and displayed and output through the display 3821.

The memory 3870 may store programs (one or more instructions) for processing and controlling of the processor 3830 and store data input to and output from the device 3800.

The programs stored in the memory 3870 may be classified into a plurality of modules per function and may be, for example, the UI module 3871, a touch screen module 3872, a notification module 3873, etc.

The UI module 3871 may provide specialized UI, graphical UI (GUI), etc., which are linked to the device 3800 per application. The touch screen module 3872 may sense a user's touch gesture on the touch screen and transmit information about the touch gesture to the processor 3830. According to an embodiment, the touch screen module 3872 may recognize and analyze touch code. The touch screen module 3872 may be configured as separate hardware including a controller.

Various sensors may be arranged inside or near the touch screen for detecting the touch on the touch screen or a close touch. A tactile sensor is an example of a sensor for detecting the touch on the touch screen. The tactile sensor may sense the touch of a particular object at a level of human feeling or at a higher level than that. The tactile sensor may detect various information such as roughness of a contact surface, hardness of a contact material, and temperature of a contact point.

Also, the proximity sensor is another example of sensors for detecting the touch on the touch screen.

The proximity sensor is a sensor which detects an existence of an object approaching a certain detection surface or an object in the vicinity, without a mechanical contact, via an electromagnetic force or infrared rays. Examples of the proximity sensors are a transparence-type photoelectric sensor, a direct reflection-type photoelectric sensor, a mirror reflection-type photoelectric sensor, a high-frequency oscillation-type proximity sensor, a capacitance-type proximity sensor, a magnet-type proximity sensor, and an infrared ray proximity sensor. Various touch gestures of the user may include a tap, a touch and hold, a double tap, a drag, a fanning, a flick, a drag and drop, a swipe, etc.

The notification module 3873 may generate a signal to notify an event occurrence of the device 3800. An example of an event occurred in the device 3800 may include call signal reception, message reception, key signal input, schedule notification, etc. The notification module 3873 may output the notification signal in a video signal-type via the display 3821 or in an audio signal-type via the sound outputter 3822, or in a vibration signal-type via the vibration motor 3823.

The memory 3870 may include at least one type of storage media such as a flash memory, a hard disk, a multimedia micro-card, a card type memory (for example, secure digital (SD) or extreme digital (XD) memory), random access memory (RAM), static random access memory (SRAM), read-only memory (ROM), electrically erasable programmable read-only memory (EEPROM), programmable read-only memory (PROM), a magnetic memory, a magnetic disk, and an optical disk.

Meanwhile, the configuration of the devices 10, 400, and 3800 shown in FIGS. 1 to 38 is an embodiment, and each component of the devices 10, 400, and 3800 may be integrated, added, or omitted according to the specification of the devices 10, 400, and 3800. That is, two or more components may be combined into one component, or one component may be divided into two or more components when necessary. Also, a function performed in each configuration (or module) is intended to describe the embodiments, and a specific operation or device thereof does not limit the scope of the present disclosure.

Figure 39:
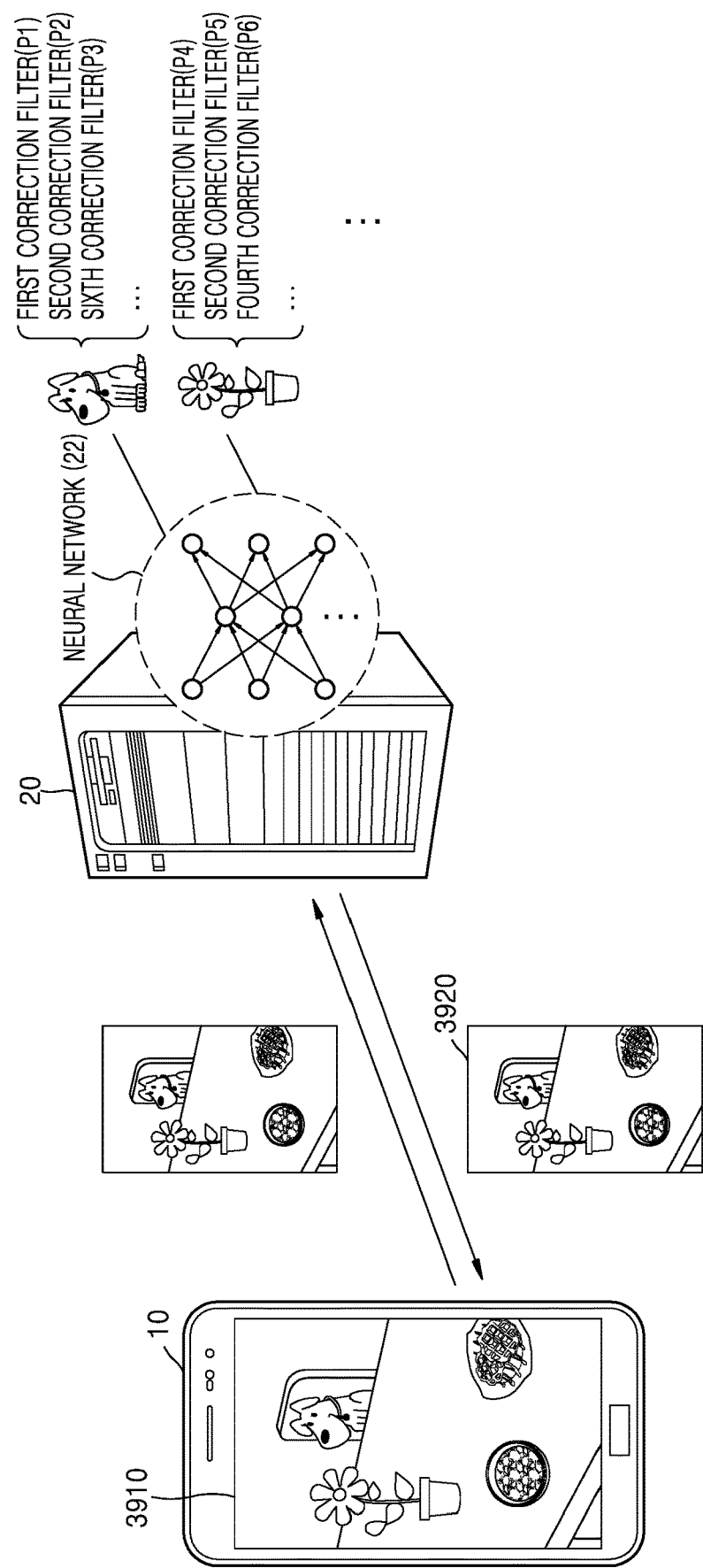
FIG. 39 is a schematic diagram illustrating an example in which a device corrects an image, according to another embodiment.

FIG. 39 is a schematic diagram illustrating an example in which the device 10 corrects an image 3910 according to another embodiment.

Referring to FIG. 39, according to another embodiment, the device 10 may correct the image 3910 using the neural network 22 provided in the server 20.

According to another embodiment, the device 10 may transmit the image 3910 to the server 20 and receive a corrected image 3920. The server 20 may use the neural network 22 to identify objects in the image 3910 received from the device 10 and determine correction filters respectively corresponding to the identified objects. The server 20 may also use the determined correction filters to correct each of the objects in the image 3910 and then transmit the corrected image 3920 to the device 10.

Alternatively, the server 20 may transmit information about the determined correction filters to the device 10 using the neural network 22. In this case, the device 10 may use the information about the correction filters received from the server 20 to correct each of the objects in the image 3910, thereby generating the corrected image 3920.

Meanwhile, the server 20 may be a computing device that provides services to client devices and may be, for example, a PC, a laptop, a mobile phone, a micro server, a global positioning system (GPS), an e-book terminal, consumer electronics, an electronic device in a vehicle, another mobile or non-mobile computing device, but is not limited thereto. The server 20 may include all types of devices having a communication function and a data processing function.

Also, the device 10 may be communicatively coupled to the server 20 over a network. In this case, the network may include a local region network (LAN), a wide region network (WAN), a value added network (VAN), a mobile radio communication network, a satellite communication network, and a mutual combination thereof, may be a data communication network in a comprehensive sense that enables the device 10 and the server 20 to communicate smoothly with each other, and may include a wired Internet, a wireless Internet, and a mobile wireless communication network.

Figure 40:
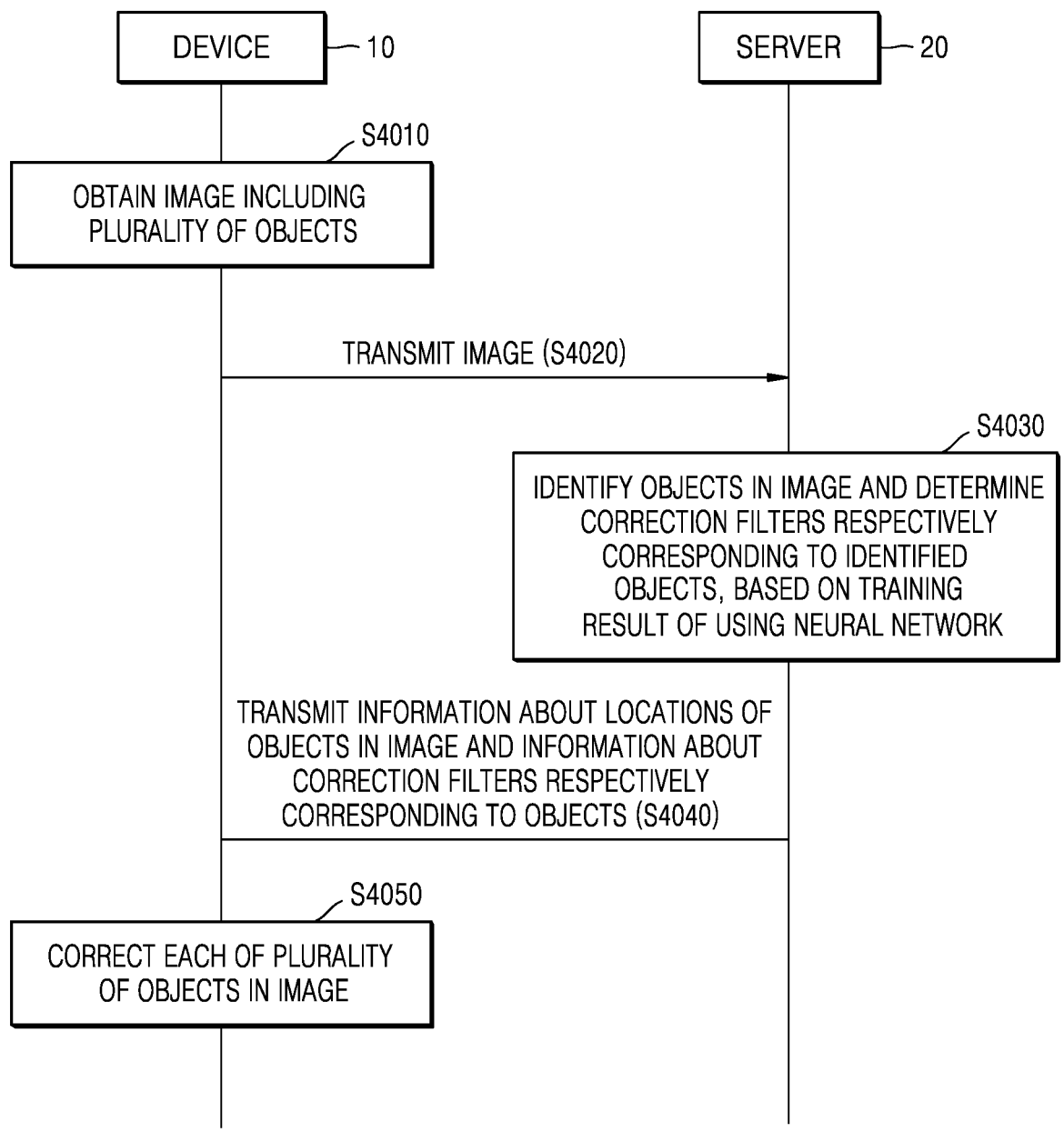
FIG. 40 is a flowchart illustrating a method, performed by a device and a server, of applying a correction filter to at least one object included in an image, according to an embodiment.

FIG. 40 is a flowchart illustrating a method, performed by the device 10 and the server 20, of applying a correction filter to at least one object included in an image, according to an embodiment.

In operation S4010, the device 10 obtains the image including a plurality of objects. For example, the device 10 may read a stored image as a photo album application, an image editing application, and the like are executed in the device 10. Further, according to another example, the device 100 may download an image from an external server (e.g., an SNS server, a cloud server, a content providing server, or the like), or may capture an image using a camera.

In operation S4020, the device 10 transmits the obtained image to the server 20 including the neural network 22.

In operation S4030, the server 20 may identify the objects in the image and determine correction filters respectively corresponding to the identified objects, based on a training result of using the neural network 22.

The server 20 may detect at least one image attribute from the image by inputting the image to the neural network 22 and may determine a location of each of the objects in the image and/or a category of each of the objects based on the detected image attributes. The server 20 may also use the neural network 22 to detect display attributes of the object from an image region corresponding to the identified objects and determine correction filters respectively corresponding to the objects based on the detected display attributes of the object. With regard to a structure and function of the neural network 22, the embodiments shown in FIGS. 31 to 35 may be applied, and thus detailed descriptions thereof are omitted.

In operation S4040, the device 10 receives, from the server 20, information about the identified objects from the image and information about the correction filters respectively corresponding to the objects.

In operation S4050, the device 10 corrects each of the plurality of objects in the image, based on the information received from the server 20. The device 10 may correct the image using the correction filters respectively corresponding to the objects in the image.

For example, the device 10 may apply a first correction filter to a first object in the image and a second correction filter to a second object in the image. Alternatively, the device 10 may apply the first correction filter to the first and second objects in the image. In this case, parameters of the first correction filter applied to each of the first and second objects in the image may be different.

Figure 41:
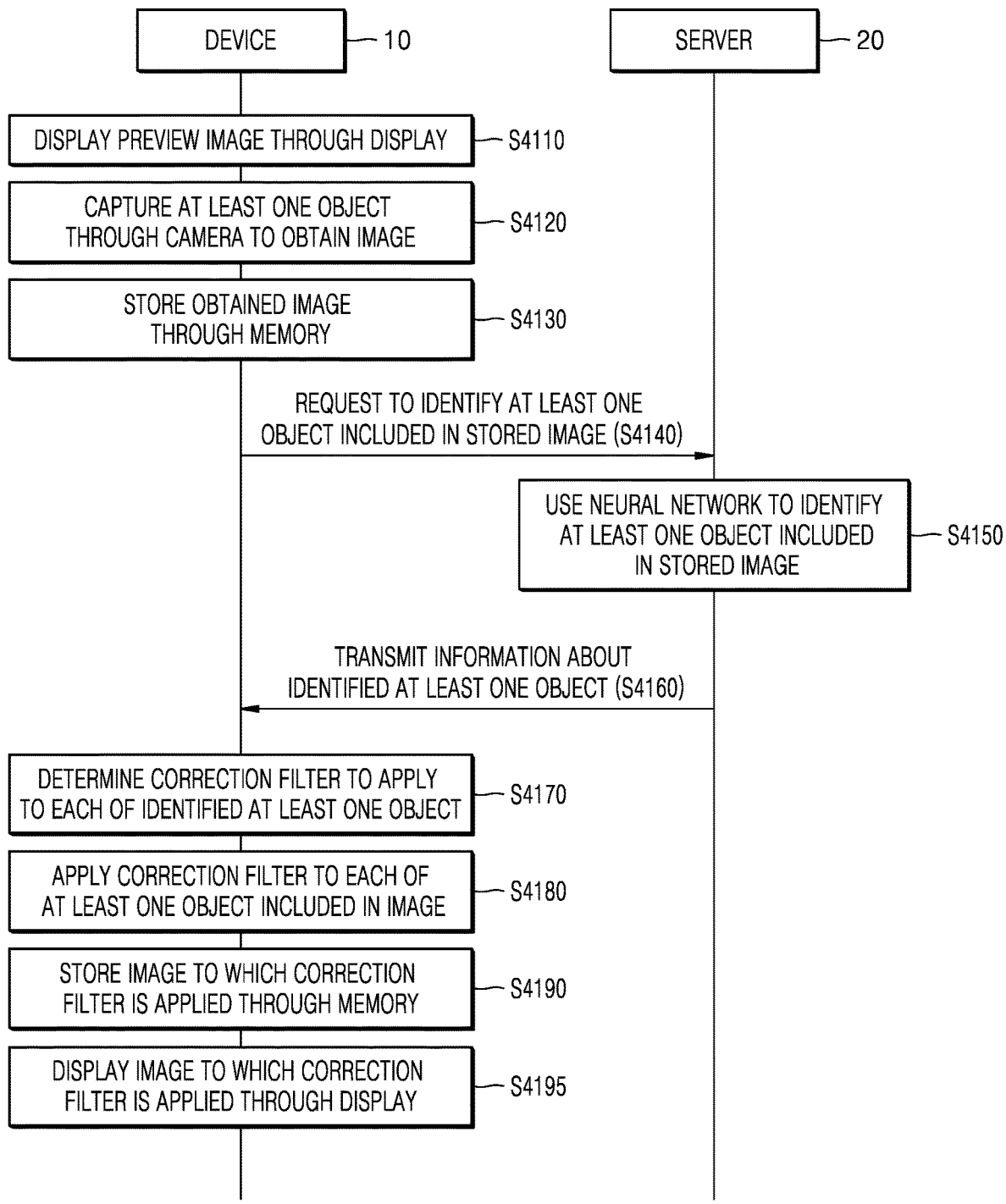
FIG. 41 is a flowchart for explaining a method, performed by a device and a server, of correcting an object in an image obtained upon capturing, according to an embodiment.

FIG. 41 is a flowchart for explaining a method, performed by the device 10 and the server 20, of correcting an object in an image obtained upon capturing, according to an embodiment.

In operation S4110, the device 10 may display a preview image through the display 420.

The device 10 may display the preview image including at least one object sensed by the device 400 through the display 420 as a camera application is executed.

In operation S4120, the device 10 may capture at least one object through a camera (not shown) to obtain an image.

The device 10 may capture the at least one object detected at a time when a capturing request is received through the camera (not shown) when the capturing request is received.

In operation S4130, the device 10 may store the obtained image through the memory 430.

In operation S4140, the device 10 may request the server 20 to identify the at least one object included in the stored image.

For example, the device 10 may transmit an object identification request signal including the stored image to the server 20. According to another example, the device 10 may transmit an object identification request signal including an identifier of a location of the memory 430 in which the image is stored to the server 20.

In operation S4150, the server 20 may use a neural network to identify the at least one object included in the stored image.

On the other hand, operation S4140 may correspond to a method of identifying at least one object included in an image of operation S220 described above with reference to FIG. 2.

In operation S4160, the server 20 may transmit information about the identified at least one object to the device 10.

In operation S4170, the device 10 may determine a correction filter to apply to each identified at least one object included in the image.

On the other hand, operation S4170 may correspond to a method of determining a correction filter with respect to each of objects of operation S230 described above with reference to FIG. 2.

In operation S4180, the device 10 may apply the correction filter to each of the at least one object included in the image. Here, operation S4180 may correspond to operation S240 described above with reference to FIG. 2.

In operation S4190, the device 10 may store the image to which the correction filter is applied through the memory 430.

In operation S4195, the device 10 may display the image to which the correction filter is applied through the display 420. For example, the device 10 may display the image to which the correction filter is applied, through the display 420, as the photo album application that displays images captured or stored based on a user input is executed.

Figure 42:
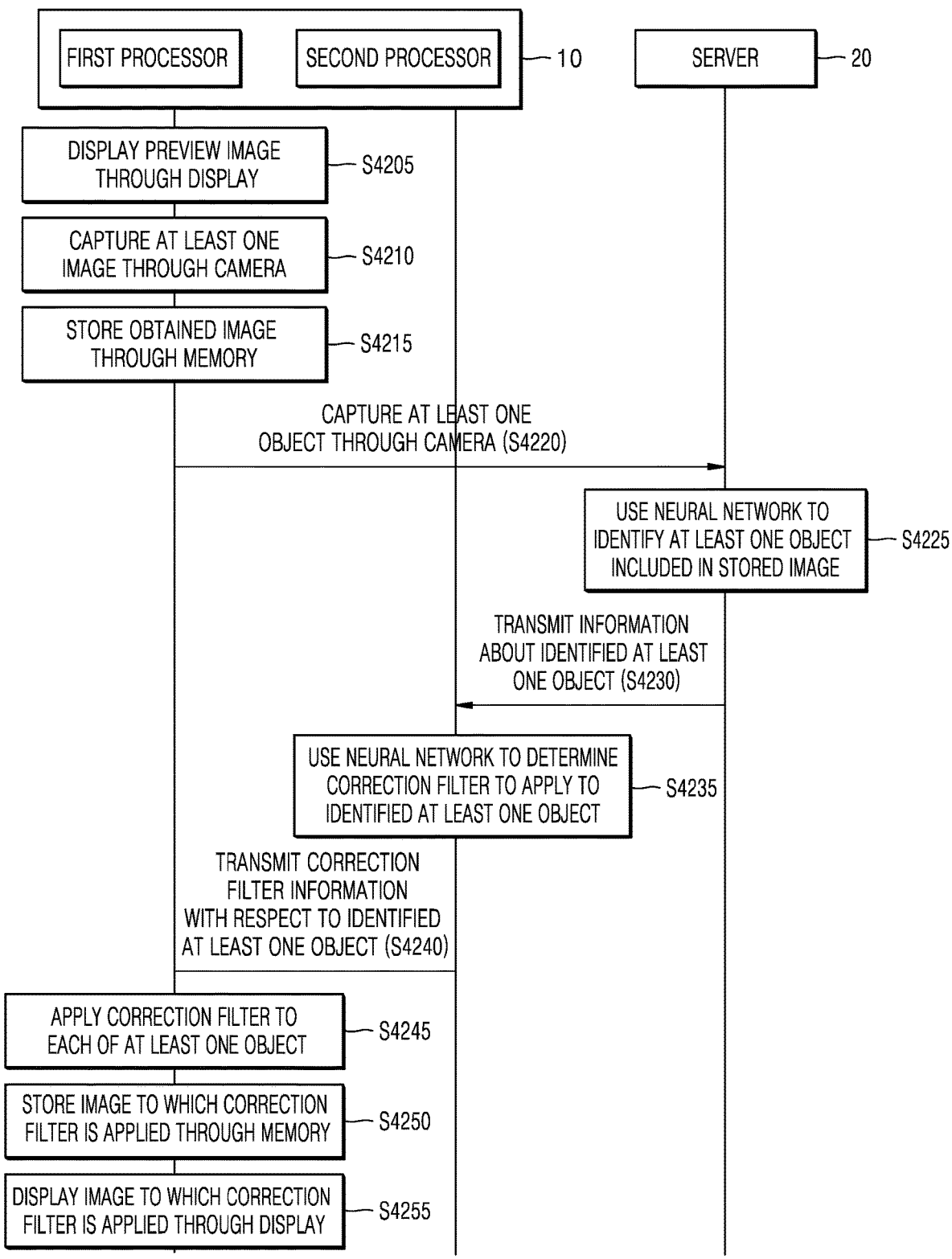
FIG. 42 is a flowchart for explaining a method, performed by a device and a server, of correcting an object in an image obtained upon capturing, according to another embodiment.

FIG. 42 is a flowchart for explaining a method, performed by the device 10 and the server 20, of correcting an object in an image obtained upon capturing, according to another embodiment.

In the embodiment, a first processor and a second processor included in the device 10 may correspond to the first processor 410 and the second processor 420 described above with reference to FIG. 4, respectively.

In operation S4205, the first processor may display a preview image through a display. The first processor may display the preview image including at least one object sensed by the device 10 through the display as a camera application is executed.

In operation S4210, the first processor may capture the at least one object through a camera (not shown) to obtain the image.

In operation S4215, the first processor may store the obtained image through a memory.

In operation S4220, the first processor may request the server 20 to identify the at least one object included in the stored image.

In operation S4225, the server 20 may use a neural network to identify the at least one object included in the stored image.

On the other hand, operation S4225 may correspond to a method of identifying at least one object included in an image of operation S220 described above with reference to FIG. 2.

In operation S4230, the server 20 may transmit information about the identified at least one object to the second processor.

In operation S4235, the second processor may use the neural network to determine a correction filter to apply to each of the identified at least one object in the image.

On the other hand, operation S4235 may correspond to a method of determining a correction filter to an identified object of operation S230 described above with reference to FIG. 2.

In operation S4240, the second processor may transmit information about the determined correction filter with respect to each of the identified at least one object to the first processor.

In operation S4245, the first processor may apply the correction filter determined with respect to each of the identified at least one object in the image.

In operation S4250, the first processor may store the image to which the correction filter is applied through the memory.

In operation S4255, the first processor may display the image to which the correction filter is applied through the display 420. For example, the first processor may display the image to which the correction filter is applied through the display 420, as a photo album application that displays images captured or stored based on a user input is executed.

Figure 43:
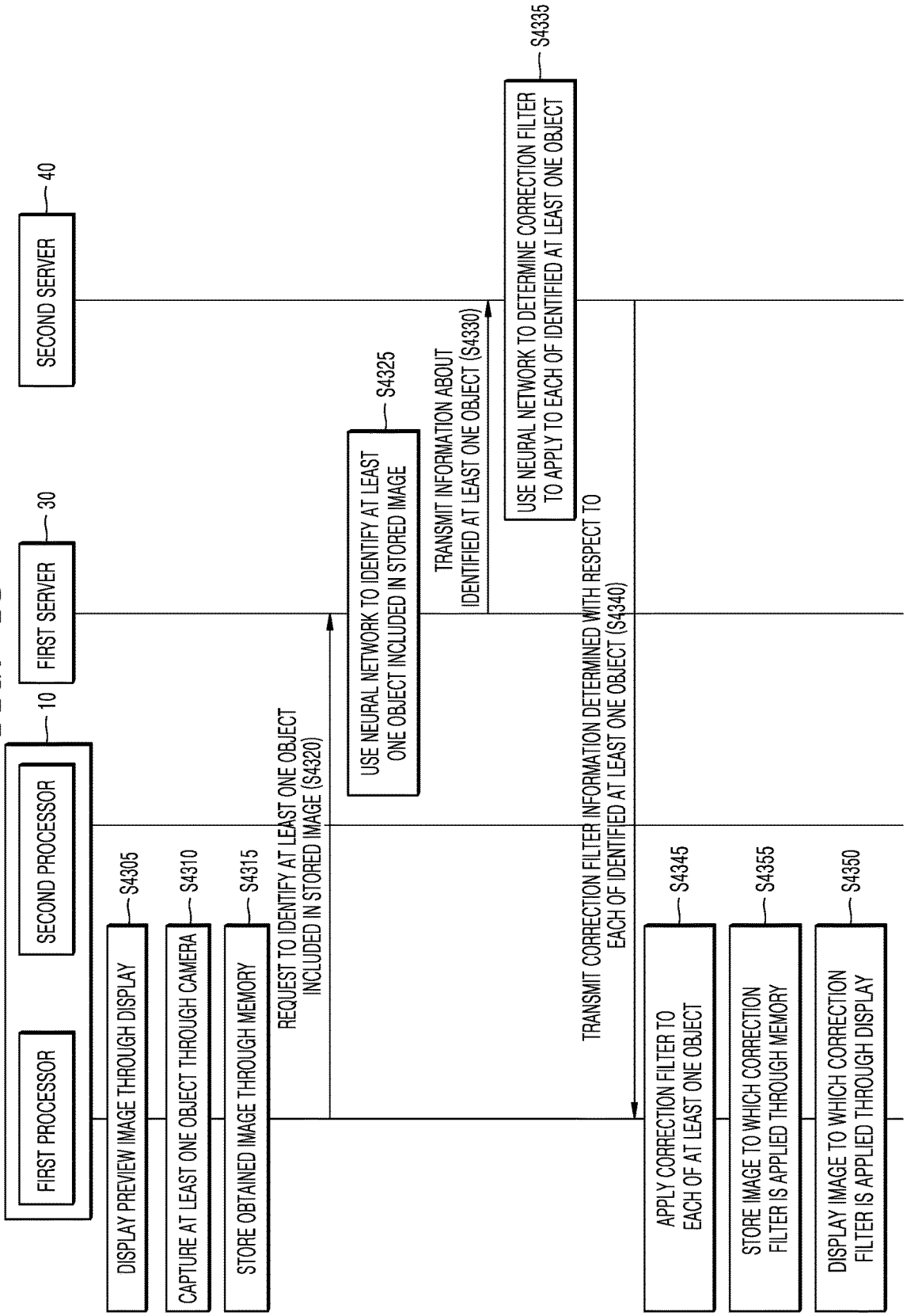
FIG. 43 is a flowchart for explaining a method, performed by a device, a first server, and a second server, of correcting an object in an image obtained upon capturing, according to another embodiment.

FIG. 43 is a flowchart for explaining a method, performed by the device 10, the first server 30, and the second server 40, of correcting an object in an image obtained upon capturing, according to another embodiment.

In the embodiment, a first processor and a second processor included in the device 10 may correspond to the first processor 410 and the second processor 420 described above with reference to FIG. 4, respectively.

On the other hand, operations S4305 to S4315 may correspond to operations S4205 to S4315 described above with reference to FIG. 42.

In operation S4320, the first processor may request the first server 30 to identify at least one object included in a stored image.

In operation S4325, the first server 30 may use a neural network to identify the at least one object included in the stored image.

On the other hand, operation S4325 may correspond to a method of identifying at least one object included in an image of operation S220 described above with reference to FIG. 2.

In operation S4330, the first server 30 may transmit information about the identified at least one object to the second server 40.

In operation S4335, the second server 40 may use the neural network to determine a correction filter to apply to each of the identified at least one object in the image.

In operation S4340, the second server 40 may transmit information about the correction filter determined with respect to each of the identified at least one object to the first processor.

Operations S4345 to S4355 may also correspond to operations S4245 to S4255 described above with reference to FIG. 42.

Figure 44:
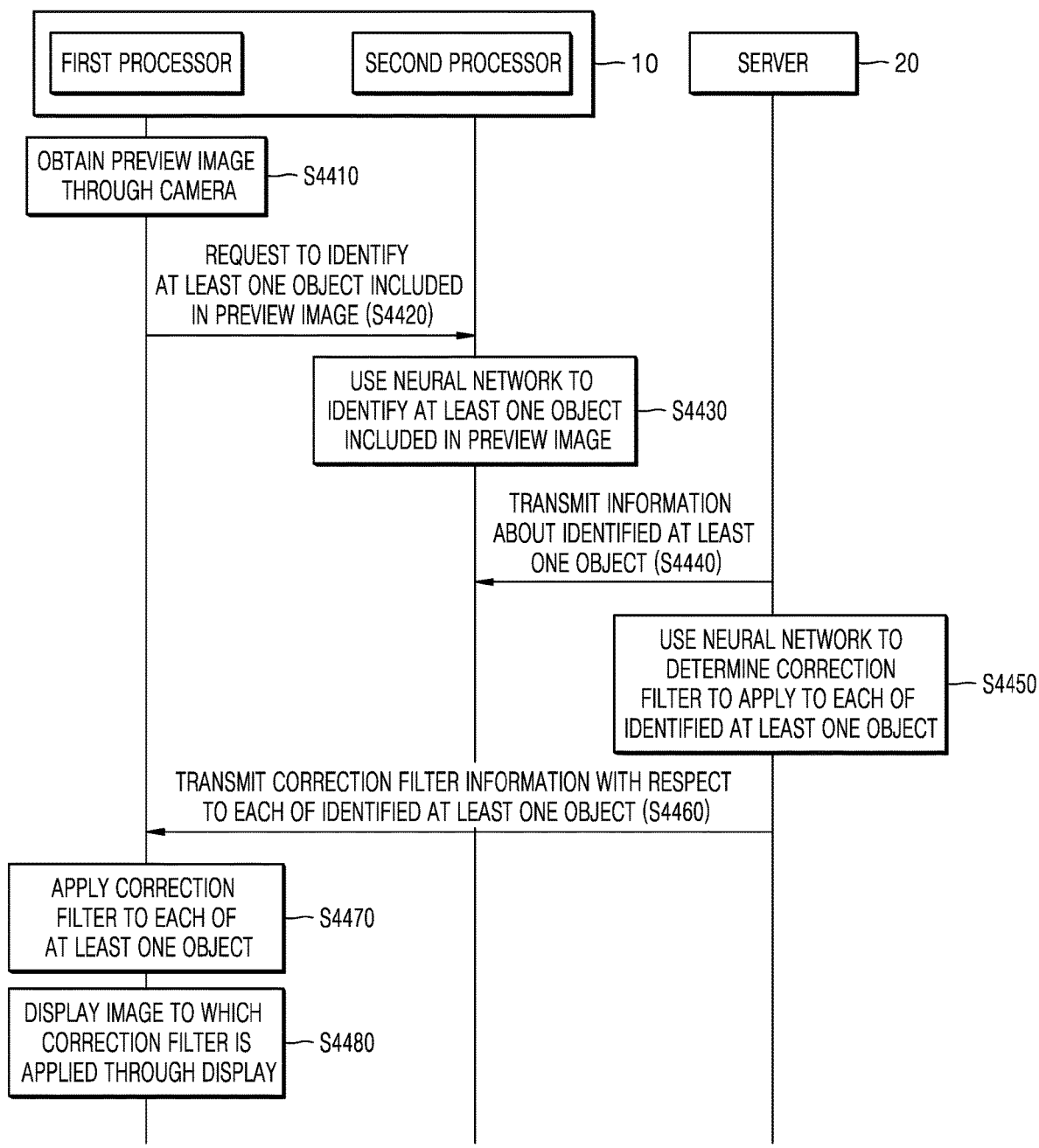
FIG. 44 is a flowchart for explaining a method, performed by a device and a server, of correcting an object in a preview image, according to an embodiment.

FIG. 44 is a flowchart for explaining a method, performed by the device 10 and the server 20, of correcting an object in a preview image, according to an embodiment.

In the embodiment, a first processor and a second processor included in the device 10 may correspond to the first processor 410 and the second processor 420 described above with reference to FIG. 4, respectively.

In operation S4410, the first processor may obtain the preview image through a camera. The first processor may obtain the preview image in real time through the camera as a camera application is executed.

In operation S4420, the first processor may transmit an identification request with respect to at least one object included in the preview image to the second processor.

In operation S4430, the second processor may use a neural network to identify the at least one object included in the preview image.

In operation S4440, the second processor may transmit information about the identified at least one object to the server 20.

In operation S4450, the server 20 may use the neural network to determine a correction filter to apply to each of the identified at least one object in the image.

In operation S4460, the server 20 may transmit information about the correction filter determined with respect to each of the identified at least one object to the first processor.

In operation S4470, the first processor may apply the determined correction filter to each of the identified at least one object in the image.

In operation S4480, the first processor may display the image to which the correction filter is applied through a display.

Figure 45:
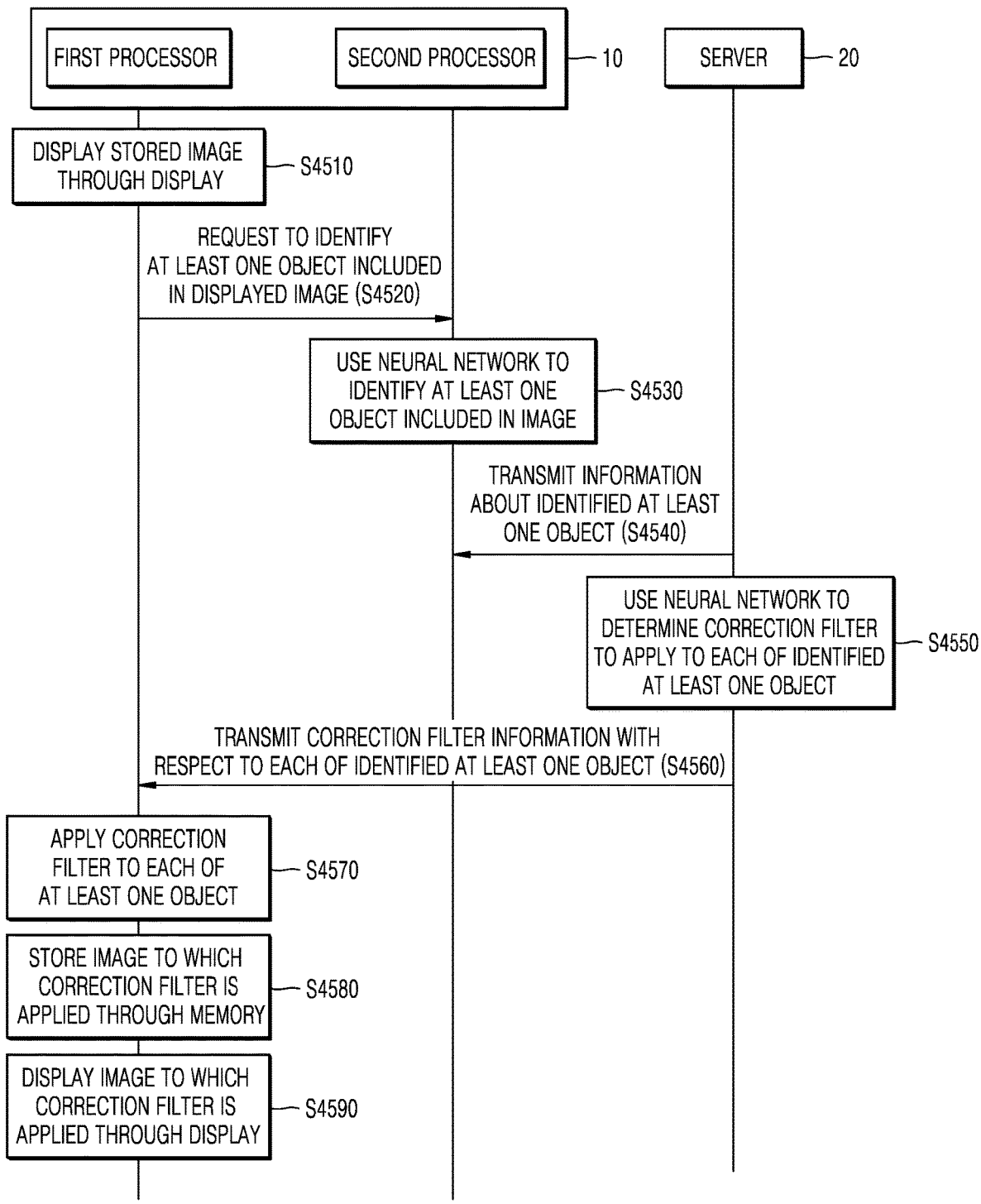
FIG. 45 is a flowchart illustrating a method, performed by a device and a server, of correcting an object in a stored image, according to an embodiment.

FIG. 45 is a flowchart illustrating a method, performed by the device 10 and the server 20, of correcting an object in a stored image, according to an embodiment.

In the embodiment, a first processor and a second processor included in the device 10 may correspond to the first processor 410 and the second processor 420 described above with reference to FIG. 4, respectively.

In operation S4510, the first processor may display a stored image through a display. For example, the first processor may display the stored image through the display as a photo album application, an image editing application, or the like is executed.

Also, operations S4520 through S4570 may correspond to operations S4420 through S4470 described above with reference to FIG. 44 respectively.

In operation S4580, the first processor may store the image to which a correction filter is applied through a memory.

In operation S4590, the first processor may display the image to which the correction filter is applied through the display. For example, the first processor may display the image to which the correction filter is applied through the display, as the photo album application that displays images captured or stored based on a user input is executed.

Figure 46:
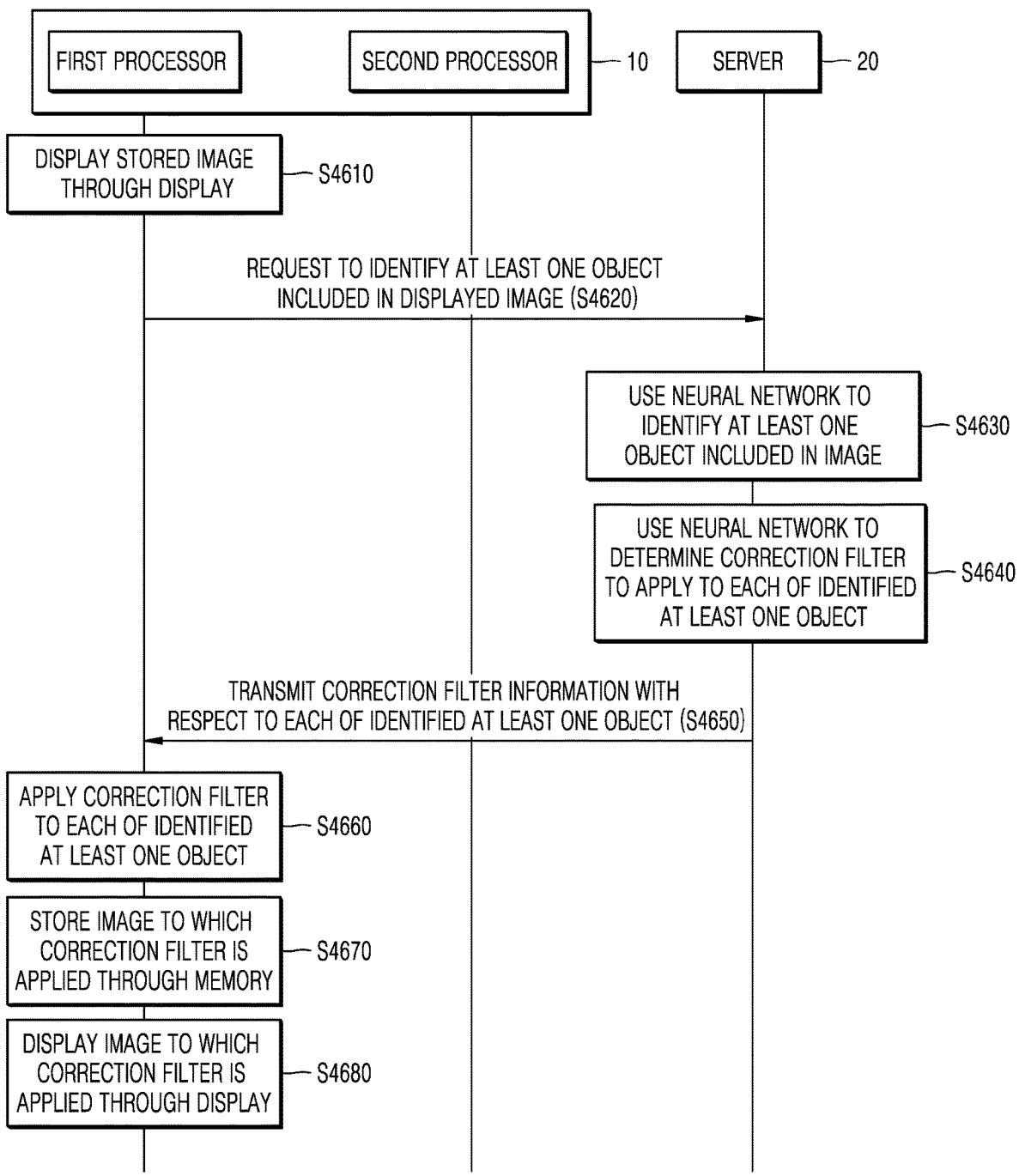
FIG. 46 is a flowchart illustrating a method, performed by a device and a server, of correcting an object in a stored image, according to another embodiment.

FIG. 46 is a flowchart illustrating a method, performed by the device 10 and the server 20, of correcting an object in a stored image, according to another embodiment.

In the embodiment, a first processor and a second processor included in the device 10 may correspond to the first processor 410 and the second processor 420 described above with reference to FIG. 4, respectively.

On the other hand, operation S4610 may correspond to operation S4510 described above with reference to FIG. 45.

In operation S4620, the first processor may transmit an identification request for at least one object included in a displayed image to the server 20.

In operation S4630, the server 20 may use a neural network to identify at least one object included in the image.

In operation S4640, the server 20 may use the neural network to determine a correction filter to apply to each of the identified at least one object in the image.

In operation S4650, the server 20 may transmit information about the correction filter determined with respect to each of the identified at least one object to the first processor.

Operations S4660 to S4680 may also correspond to operations S4570 to S4590 described above with reference to FIG. 45.

Figure 47:
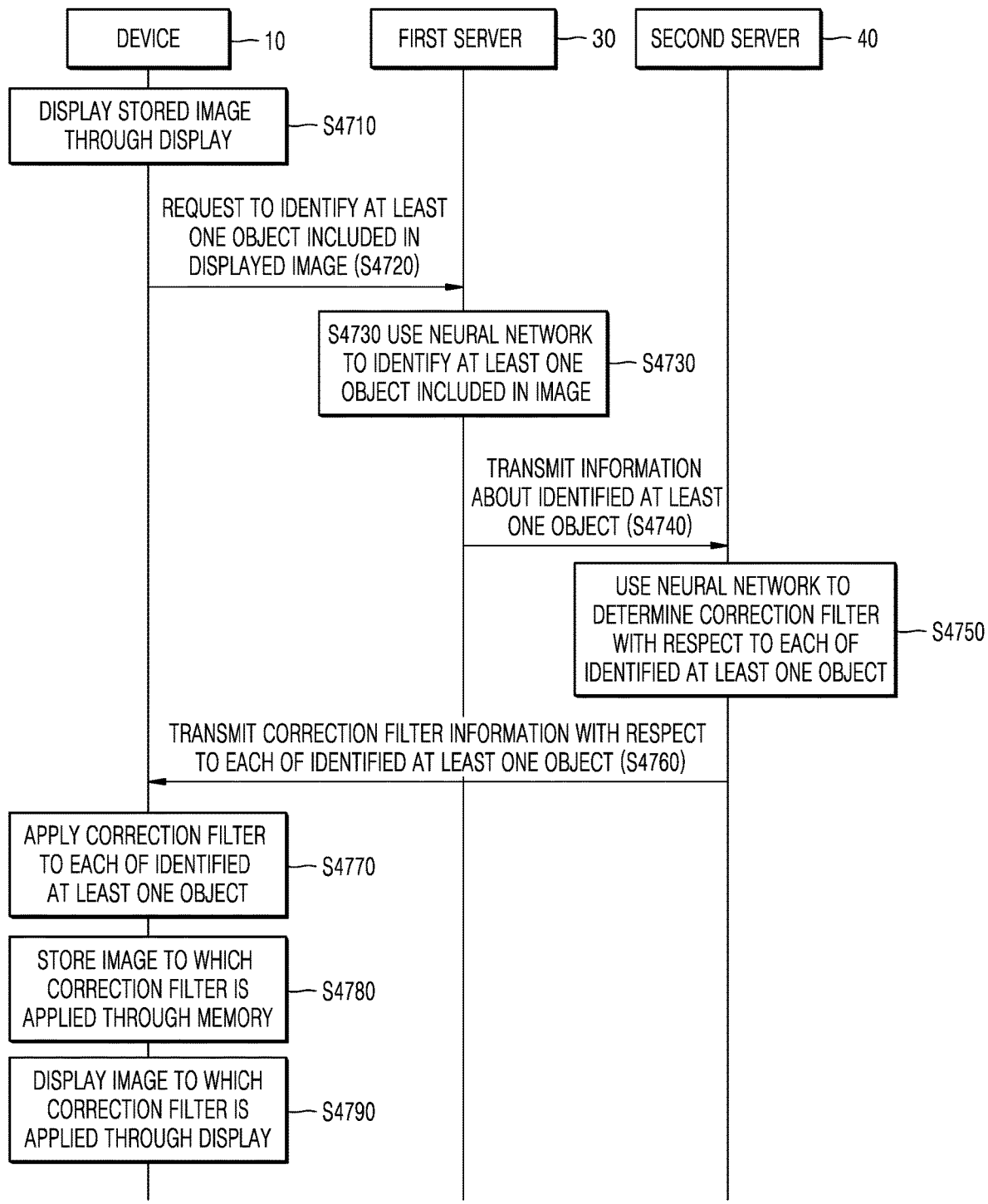
FIG. 47 is a flowchart illustrating a method, performed by a device, a first server, and a second server, of correcting an object in a stored image, according to an embodiment.

FIG. 47 is a flowchart illustrating a method, performed by the device 10, the first server 30, and the second server 40, of correcting an object in a stored image, according to an embodiment.

In operation S4710, the device 10 may display the stored image through a display. For example, the device 10 may display the stored image through the display as a photo album application, an image editing application, or the like is executed.

In operation S4720, the device 10 may transmit an identification request with respect to at least one object included in the displayed image to the first server 30.

In operation S4730, the first server 30 may use a neural network to identify at least one object included in a preview image.

In operation S4740, the first server 30 may transmit information about the identified at least one object to the second server 40.

In operation S4750, the second server 40 may use the neural network to determine a correction filter to apply to each of the identified at least one object in the image.

In operation S4760, the second server 40 may transmit information about the correction filter determined with respect to each of the identified at least one object to the device 10.

Operations S4770 to S4790 may correspond to operations S4660 to S4680 described above with reference to FIG. 46.

Figure 48:
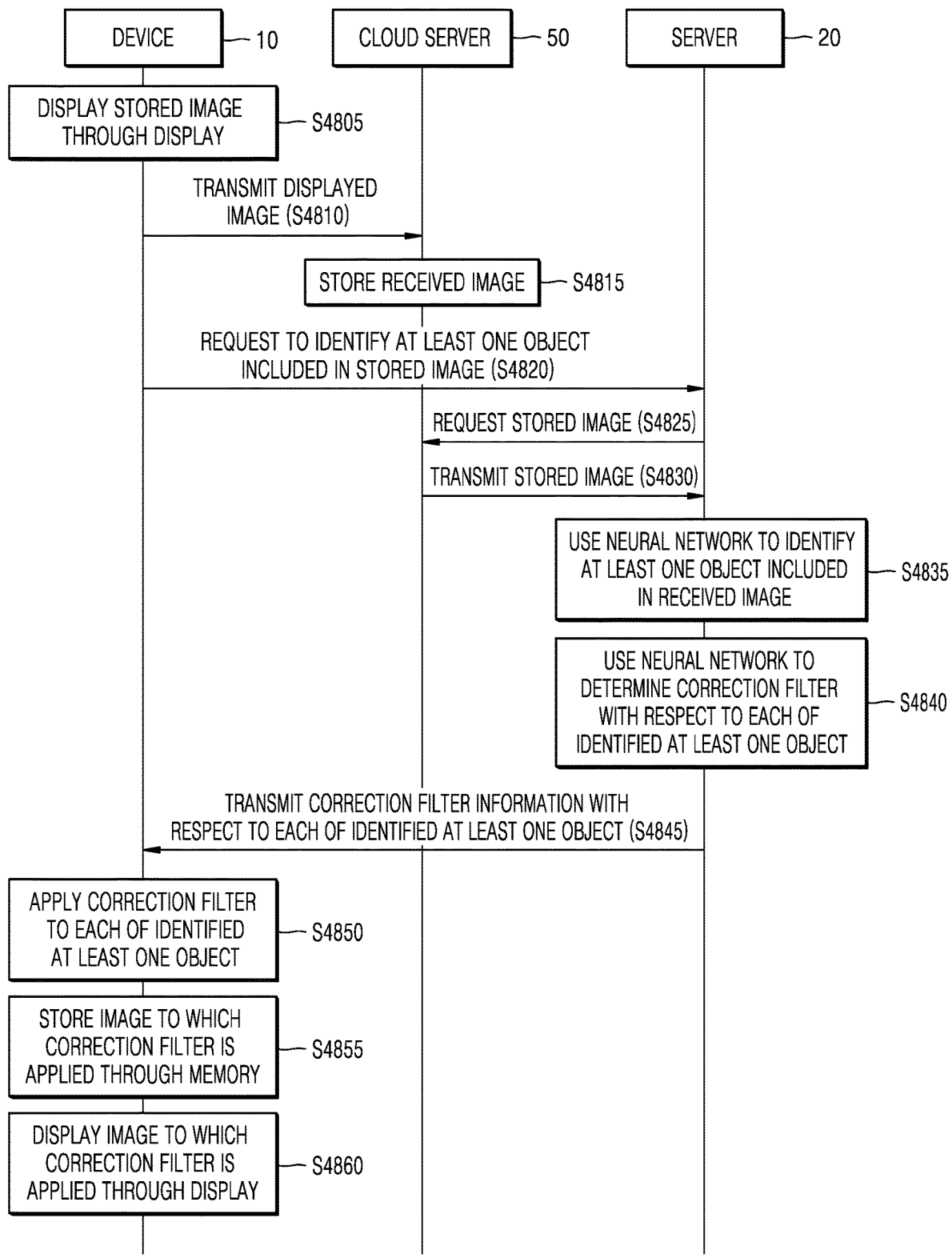
FIG. 48 is a flowchart illustrating a method, performed by a device, a cloud server, and a server, of correcting an object in an image stored in the cloud server, according to an embodiment.

FIG. 48 is a flowchart illustrating a method, performed by the device 10, the cloud server 50, and the server 20, of correcting an object in an image stored in the cloud server 50, according to an embodiment.

In operation S4805, the device 10 may display the image through a display. For example, the device 10 may display the image through the display as a camera application, a photo album application, an image editing application, or the like is executed.

In operation S4810, the device 10 may transmit the displayed image to the cloud server 50. For example, the device 10 may transmit the image to the cloud server 50 to store the image in the cloud server 50.

In operation S4815, the cloud server 50 may store the image received from the device 10.

In operation S4820, the device 10 may transmit an identification request for at least one object included in the image stored in the cloud server 50 to the server 20.

In operation S4825, the server 20 may request the cloud server 50 for an image for identification of the object.

In operation S4830, the cloud server 50 may transmit the stored image to the server 20 at a request of the server 20.

In operation S4835, the server 20 may use a neural network to identify at least one object included in a preview image.

In operation S4840, the server 20 may use the neural network to determine a correction filter to apply to each of the identified at least one object in the image.

In operation S4845, the server 20 may transmit information about the correction filter determined with respect to each of the identified at least one object to the device 10.

Also, operations S4850 to S4860 may correspond to operations S4770 to S4790 with reference to FIG. 47.

Figure 49:
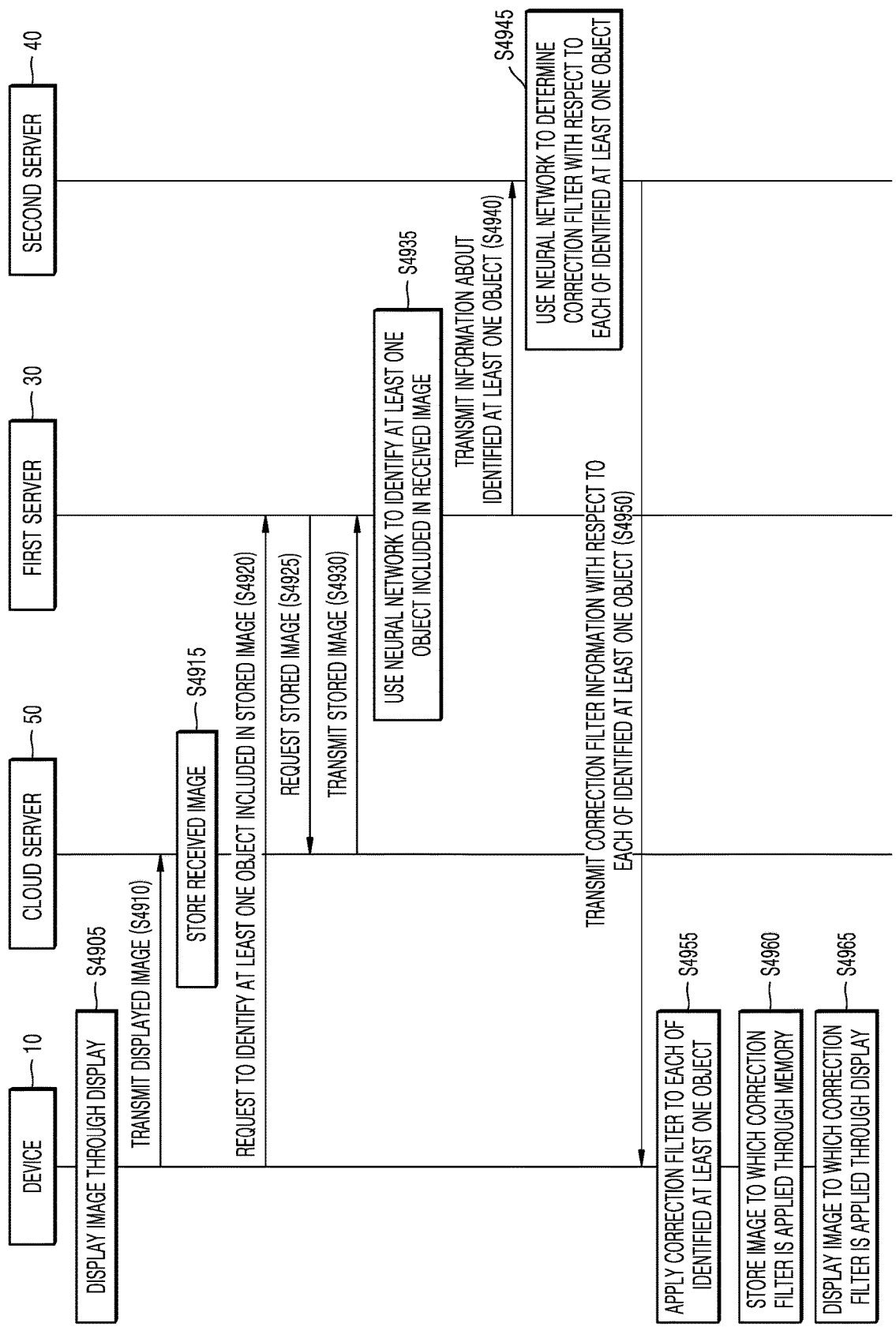
FIG. 49 is a flowchart for explaining a method, performed by a device, a first server, and a second server, of correcting an object in an image stored in a cloud server, according to an embodiment.

FIG. 49 is a flowchart for explaining a method, performed by the device 10, the first server 30, and the second server 40, of correcting an object in an image stored in the cloud server 50, according to an embodiment.

On the other hand, operations S4905 to S4915 may correspond to operations S4805 to S4815 described above with reference to FIG. 48.

In operation S4920, the device 10 may transmit an identification request for the at least one object included in the image stored in the cloud server 50 to the first server 30.

In operation S4925, the first server 30 may request the cloud server 50 for an image for identification of the object.

In operation S4930, the cloud server 50 may transmit the stored image to the server 20 at a request of the first server 30.

In operation S4935, the first server 30 may use a neural network to identify at least one object included in a preview image.

In operation S4940, the first server 30 may transmit information about the identified at least one object to the second server 40.

In operation S4945, the second server 40 may use the neural network to determine a correction filter to apply to each of the identified at least one object in the image.

In operation S4950, the second server 40 may transmit information about the correction filter determined with respect to each of the identified at least one object to the device 10.

Also, operations S4955 to S4965 may correspond to operations S4850 to S4860 described above with reference to FIG. 48.

Figure 50:
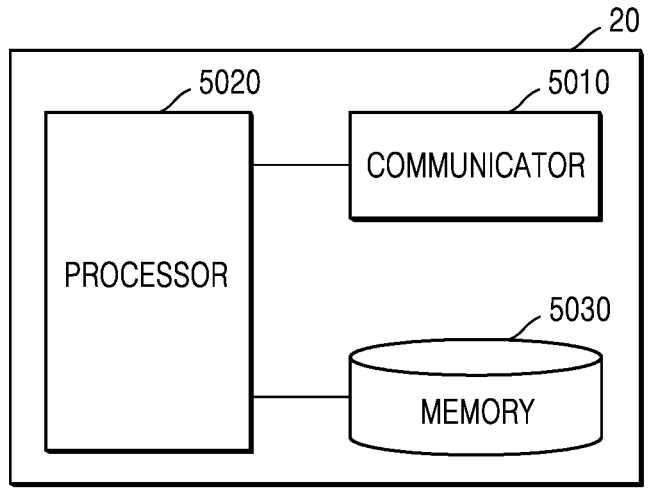
FIG. 50 is a diagram showing a configuration of a server according to another embodiment.

FIG. 50 is a diagram showing a configuration of the server 20 according to another embodiment.

Referring to FIG. 50, the server 20 may include a communicator 5010, a controller 5020, and a memory 5030.

The communicator 5010 may include at least one component to allow the server 20 to communicate with client devices such as the device 10 under the control of the controller 5020. The controller 5020 may transmit and receive data to and from the device 10 connected through the communicator 5010.

The communicator 5010 may include one of, for example, wireless LAN (e.g., Wi-Fi), Bluetooth, and wired Ethernet (Ethernet). Also, the communicator 5010 may include a combination of wireless LAN, Bluetooth, and wired Ethernet.

The controller 5020 controls the overall operation of the server 20 and the signal flow between the internal components of the server 20 and performs processing of data. The controller 5020 may include one or more processors implemented as one or more cores (not shown) and may include a RAM (not shown) and a ROM (not shown) used as a storage region storing signals or data input to the controller 5020.

The controller 5020 may execute one or more programs stored in the memory 5030. According to an embodiment, the controller 5020 may read a result of using a neural network from the memory 5030, identify objects in an image received from the device 10 through the communicator 5010, and determine a correction filter corresponding to each of the identified objects.

Specifically, the controller 5020 may detect predetermined image attributes in the image according to the result of using the neural network, and, based on the detected image attributes, determine a location of each of the objects in the image and/or a category corresponding to each of the objects.

Further, the controller 5020 may detect display attributes of the object from an image region corresponding to the identified objects, based on the result of using the neural network, and determine correction filters respectively corresponding to the objects based on the detected display attributes of the object. For example, the controller 5020 may determine a type of the correction filter to be applied to each of the objects in the image and/or a parameter to be input to the correction filter using the neural network.

The controller 5020 may control the communicator 5010 to transmit information (e.g., location information in the image and category information) about the objects in the image obtained using the neural network, and correction filter information (e.g. the type of the correction filter and parameter information) corresponding to each of the objects to the device 10.

The memory 5030 may store various data, program, or application for driving and controlling the server 20. The program stored in the memory 5030 may include one or more instructions. The program (one or more instructions) or the application stored in the memory 5030 may be executed by the controller 5020.

According to an embodiment, the memory 5030 may include one or more programs that constitute a plurality of layers in the neural network and a neural network module (not shown) in which the result of using the neural network is stored. In this regard, the embodiment of FIG. 21 may be applied, and thus a detailed description thereof will be omitted.

The memory 5030 may also include an application module (not shown) storing one or more programs for executing applications and application data, a communication module (not shown) storing one or more programs for communicating with the outside, and communication data, but is not limited thereto.

According to an embodiment, the memory 5030 may store the result of using the neural network for each client device.

On the other hand, when the server 20 further includes a correction filter (for example, a correction filter program module or a hardware component) capable of correcting the image, the controller 5020 may control the memory 5030 or a hardware component (not shown) to correct each of the objects in the image using the determined correction filters, and control the communicator 5010 to transmit the corrected image to the device 10.

Also, all of the components shown in FIG. 50 are not indispensable components of the server 20. The server 20 may be implemented by more components than the components shown in FIG. 50, and the server 20 may be implemented by fewer components than those shown in FIG. 50. For example, the server 20 may further include a user inputter (not shown) receiving a user input, and a display (not shown) displaying and outputting information processed by the server 20.

Figure 51:
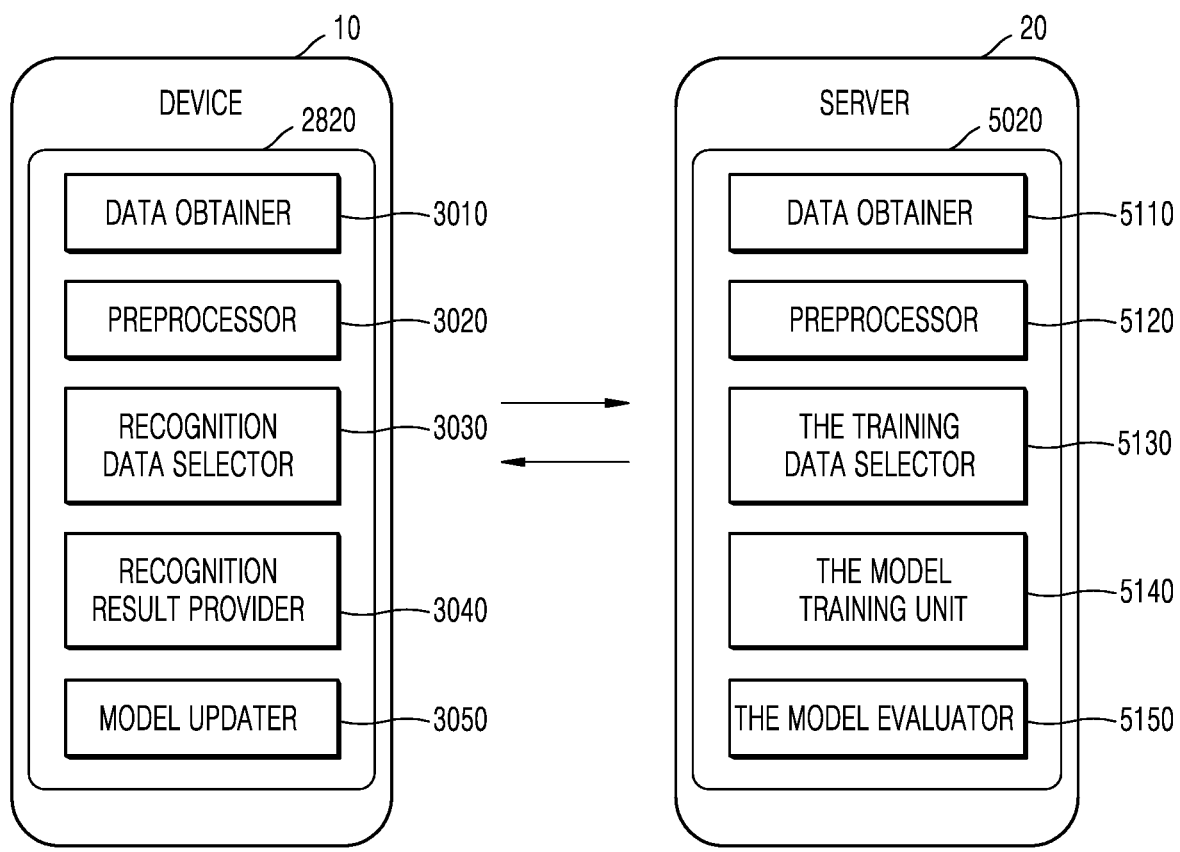
FIG. 51 is a diagram showing an example in which a device and a server learn and recognize data in association with each other, according to some embodiments.

FIG. 51 is a diagram showing an example in which the device 10 and the server 20 learn and recognize data in association with each other, according to some embodiments.

Referring to FIG. 51, the server 20 may learn a criterion for identifying an object included in an image. For example, the server 20 may learn an attribute of the object used to identify the object and an attribute of the object. Also, the server 20 may learn a display attribute that is a basis for determining a correction filter suitable for the object. The server 20 may obtain data to be used for training and apply the obtained data to a data recognition model that will be described later, thereby learning the criterion for identifying the object or determining the correction filter.

Meanwhile, the data obtainer 5110, the preprocessor 5120, the training data selector 5130, the model training unit 5140, and the model evaluator 5150 of the server 20 may perform functions of the data obtainer 2910, the preprocessor 2920, the training data selector 2930, the model training unit 2940, and the model evaluator 2950 shown in FIG. 29, respectively.

The data obtainer 5110 may obtain data necessary for identification of the object or determination of the correction filter. The preprocessor 5120 may preprocess the obtained data such that the obtained data may be used for training for identification of the object or determination of the correction filter. The training data selector 5130 may select data necessary for training from the preprocessed data. The selected data may be provided to the model training unit 5140.

The model training unit 5140 may learn a criterion as to which image attribute or display attribute to use in the input image to identify the object or determine the correction filter and how to determine a type of object or the correction filter using an image attribute or a display attribute. The model training unit 5140 may obtain data to be used for training and apply the obtained data to a data recognition model that will be described later to learn the criterion for identifying the object or determining the correction filter. The model evaluator 5150 may input evaluation data to the data recognition model and allow the model training unit 5140 to learn again when a recognition result output from the evaluation data does not satisfy a predetermined criterion.

The server 20 may provide the generated recognition model to the device 10. In this case, the device 10 may identify the object or determine the correction filter using the received recognition model.

On the other hand, according to another embodiment, the server 20 may apply the data received from the device 10 to the generated data recognition model to identify the object or determine the correction filter. For example, the device 10 may transmit data selected by the recognition data selector 3030 to the server 20, apply the data selected by the server 20 to the recognition model to identify the object or determine the correction filter.

The server 20 may also provide the device 10 with information about the object identified by or the type of the correction filter determined by the server 20. Accordingly, the device 10 may receive from the server 20 identification information of the object included in the image or the information about the type of correction filter.

Meanwhile, the above-described embodiments of the present disclosure may be embodied in a general-purpose digital computer that may be embodied as a program that may be executed by a computer and operates the program using a computer-readable recording medium.

The computer-readable recording medium may be a magnetic storage medium such as a ROM, a floppy disk, a hard disk, etc., an optical reading medium (e.g., a CD-ROM or a DVD) and a carrier wave (e.g., transmission via the Internet).

The embodiments may be implemented in a software program that includes instructions stored on a computer-readable storage medium.

The computer may include the device 10 according to the embodiments, which is a device capable of calling stored instructions from a storage medium and operating according to the embodiments in accordance with the called instructions.

The computer-readable storage medium may be provided in the form of a non-transitory storage medium. Here, 'non-transitory' means that the storage medium does not include a signal and is tangible, but does not distinguish whether data is stored semi-permanently or temporarily on the storage medium.

Further, the control method according to the embodiments may be provided in a computer program product. The computer program product may be traded between a seller and a buyer as a product.

The computer program product may include a software program and a computer-readable storage medium having stored thereon the software program. For example, the computer program product may include a product (e.g., a downloadable application) in the form of S/W program that is electronically distributed through a manufacturer of the device 10 or an electronic marketplace (e.g. Google Play Store and App Store). For electronic distribution, at least a part of the S/W program may be stored on a storage medium or may be generated temporarily. In this case, the storage medium may be a storage medium of a server of the manufacturer, a server of the electronic market, or a relay temporarily storing the SW program.

The computer program product may include a server storage medium of a server or a storage medium of the device 10 in a system including the server and the device 10. Alternatively, when a third device (e.g., a smart phone) in communication with the server or the device 10 is present, the computer program product may include a storage medium of the third device. Alternatively, the computer program product may include S/W program itself transmitted from the server to the device 10 or the third device, or transmitted from the third device to the device 10.

In this case, one of the server, the device 10 and the third device may execute the computer program product to perform the method according to the embodiments. Alternatively, two or more of the server, the device 10 and the third device may execute the computer program product to distribute the method according to the embodiments.

For example, the server (e.g., a cloud server or an artificial intelligence server, etc.) may execute the computer program product stored in the server to control the device 10 in communication with the server to perform the method according to the embodiments.

As another example, the third device may execute the computer program product to control the device 10 in communication with the third device to perform the method according to the embodiment. When the third device executes the computer program product, the third device may download the computer program product from the server and execute the downloaded computer program product. Alternatively, the third device may execute the provided computer program product provided in a preloaded manner to perform the method according to the embodiments.

While embodiments of the present disclosure have been particularly shown and described with reference to the accompanying drawings, it will be understood by those of ordinary skill in the art that various changes in form and details may be made therein without departing from the spirit and scope of the disclosure as defined by the appended claims. Thus, the embodiments described above should be considered in descriptive sense only and not for purposes of limitation.

What is claimed is:

1. A device comprising:
   a memory storing one or more instructions; and
   at least one processor configured to execute the one or more instructions stored in the memory, wherein the at least one processor, by executing the one or more instructions, is further configured to:
   display a preview image of an image to be captured comprising a plurality of objects,
   identify the plurality of objects in the preview image based on a result of using one or more neural networks, display with the preview image a plurality of filtered images respectively depicting a plurality of filters selectable to be applied to the plurality of objects,
determine a filter, from among the plurality of filters and corresponding to a selection from among the plurality of filtered images, to be applied to an object among the plurality of objects,
apply the filter to the object in the preview image of the image to be captured; and
capture the image in which the filter is applied to the object.

2. The device of claim 1, wherein the at least one processor is further configured to:
detect at least one display attribute of each object among the plurality of objects using the one or more neural networks, and
determine one or more filters applicable for each object among the plurality of objects according to the at least one display attribute of each object among the plurality of objects.

3. The device of claim 2, wherein the at least one processor is further configured to:
determine first filters applicable for first object based on the display attribute of first object indicating a foreground object, and determining second filters applicable for second object based on the display attribute of the second object indicating a background object.

4. The device of claim 1, wherein the at least one processor is further configured to:
obtain location information in which each object among the plurality of objects is located in the preview image; and
modify, based on the location information, each object among the plurality of objects in the image by applying a corresponding filter from among the plurality of filters.

5. The device of claim 1, further comprising:
a camera configured to capture the image, wherein the captured image is obtained through the camera.

6. The device of claim 1, wherein the determined filter is not applied to another object, from among the plurality of objects, in the preview image.

7. The device of claim 1, wherein the determined filter is applied to a first object in the preview image, based on the first object determined to be one of a foreground object and a background object, and is not applied to a second object in the preview image, based on the second object determined to be another one of the foreground object and the background object.

8. The device of claim 1, wherein the at least one processor is further configured to:
display a first filter image depicting a first filter selectable to be applied to a first object and not a second object among the plurality of objects; and
display a second filter image depicting a second filter selectable to be applied to the second object and not the first object among the plurality of objects.

9. The device of claim 8, wherein the first object is determined as a foreground object and the second object is determined as a background object.

10. The device of claim 1, wherein the at least one processor comprises a first processor and a second processor,
wherein the first processor is configured to:
obtain the preview image comprising the plurality of objects,
determine the plurality of filters selectable to be applied to the plurality of objects, each object among the plurality of objects in the image being identified by using the second processor, and
modify each object among the plurality of objects in the preview image by applying a corresponding filter from among the plurality of filters, and
wherein the second processor is configured to identify the plurality of objects in the preview image based on a result of using the one or more neural networks.

11. A method of capturing an image, the method comprising:
displaying a preview image of the image to be captured comprising a plurality of objects;
identifying the plurality of objects in the preview image based on a result of using one or more neural networks;
displaying with the preview image a plurality of filtered images respectively depicting a plurality of filters selectable to be applied to the plurality of objects,
determining a filter, from among the plurality of filters and corresponding to a selection from among the plurality of filtered images, to be applied to an object among the plurality of objects;
applying the filter to the object in the preview image of the image to be captured; and
capturing the image in which the filter is applied to the object.

12. The method of claim 11, further comprising:
detecting at least one display attribute of each object among the plurality of objects using the one or more neural networks, and
determining one or more filters applicable for each object among the plurality of objects according to the at least one display attribute of each object among the plurality of objects.

13. The method of claim 11, wherein the determining one or more filters comprises:
determine first filters applicable for first object based on the display attribute of first object indicating a foreground object, and determining second filters applicable for second object based on the display attribute of the second object indicating a background object.

14. The method of claim 11, further comprising:
obtaining location information in which each object among the plurality of objects is located in the preview image; and
modifying, based on the location information, each object among the plurality of objects in the preview image by applying a corresponding filter from among the plurality of filters.

15. The method of claim 11, wherein the captured image is obtained through a camera.

16. The method of claim 11, wherein each filtered image among the plurality of filtered images respectively depicts an effect when at least two filters are applied.

17. The method of claim 16, further comprising:
receiving a touch input selecting a filtered image from among the plurality of filtered images; and
modifying at least two objects among the plurality of objects in the preview image by applying the at least two filters corresponding to the filtered image.

18. The method of claim 11, wherein the displaying with the preview image the plurality of filtered images comprises:
displaying a first filter image depicting a first filter selectable to be applied to a first object and not a second object among the plurality of objects; and displaying a second filter image depicting a second filter selectable to be applied to the second object and not the first object among the plurality of objects.

19. The method of claim 18, wherein the first object is determined as a foreground object and the second object is determined as a background object.

20. A non-transitory computer-readable recording medium, the non-transitory computer-readable recording medium storing instructions which when executed by a device control the device to perform a method comprising:
- displaying a preview image of an image to be captured comprising a plurality of objects;
- identifying the plurality of objects in the preview image based on a result of using one or more neural networks;
- displaying with the preview image a plurality of filtered images respectively depicting a plurality of filters selectable to be applied to the plurality of objects,
- determining a filter, from among the plurality of filters and corresponding to a selection from among the plurality of filtered images, to be applied to an object among the plurality of objects;
- applying the filter to the object in the preview image of the image to be captured; and
- capturing the image in which the filter is applied to the object.

* * * * *